United States Patent [19]

Kadashevich et al.

[11] Patent Number: 5,323,316
[45] Date of Patent: Jun. 21, 1994

[54] MORPHOLOGICAL ANALYZER

[75] Inventors: A. Julie Kadashevich, Tyngsboro; Mary F. Harvey, Reading; Cheryl Clark, Arlington, all of Mass.

[73] Assignee: Wang Laboratories, Inc., Lowell, Mass.

[21] Appl. No.: 649,779

[22] Filed: Feb. 1, 1991

[51] Int. Cl.⁵ .............................................. G06F 15/38
[52] U.S. Cl. ................................................. 364/419.01
[58] Field of Search ............ 364/419, 419.01, 419, 10 364/419.11, 419.16

[56] References Cited

U.S. PATENT DOCUMENTS 4,775,956 10/1988 Kaji et al. ............................ 364/900
4,864,501 9/1989 Kucera et al. ....................... 364/419

Primary Examiner—Roy N. Envall, Jr.
Assistant Examiner—Ari M. Bai
Attorney, Agent, or Firm—Kenneth L. Milik

[57] ABSTRACT

A morphological analyzer for analyzing the morphology of an input word, the analyzer including a recognition engine which includes means for finding a stem within the input word; and means for identifying suffixes attached to the stem, wherein the finding means and suffix identifying means cooperate to conduct morphological analysis of the input word from the root to the affix and wherein the recognition engine performs inflectional and derivational analysis, the derivational analysis using more than two derivational suffixes.

27 Claims, 68 Drawing Sheets (130) Check to see if current word has alphabetic characters.

(131) If it has no alphabetic characters (132)     Do not index. End processing current word and begin processing next word.

(133) Else continue processing current word.

(134) If current word is a quoted string (has quotation marks around it)

(136)     Index the word. End processing current word and begin processing next word.

(137) Else continue processing the current word.

(138) If current word is on the KEEP list (140)     Index the word. End processing current word and begin processing next word.

(141) Else continue processing the current word.

(142) If current word is on the STOP list (144)     Do not index. End processing current word and begin processing next word.

(145) Else continue processing current word.

(146) Call WFSrecognize on current word.

(147) If WFSrecognize returns an indication that word was not recognized

FIG. 4a (148) Index the word. End processing current word and begin processing next word.

(149) Else if WFSrecognize returns an indication that word has character that can't be processed (150) Index the word. End processing current word and begin processing next word.

(151) Else if WFSrecognize returns success (word is recognized)

(152) If current word has 1 part of speech (153) If current word is a noun (154) Index the word. End processing current word and begin processing next word.

(155) Else if current word is an adjective (156) Get the base of current word.

(158) If base is a noun (160) Index the base. End processing current word and begin processing next word.

(162) Else if base is an adjective (164) Get base of the base (166) If base of base is noun

FIG. 4b (168) Index the base. End processing current word and begin processing next word.

(170) Else do not index word. End processing current word and begin processing next word.

(172) Else do not index word. End processing current word and begin processing next word.

(174) Else if current word is an adverb (176) Get the base of current word.

(178) If base is a noun (180) Index the base. End processing current word and begin processing next word.

(182) Else if base is an adjective (184) Get the base of the base (186) If the base of base is noun (188) Index the base of the base. End processing current word and begin processing next word.

(190) Else if base of base is adjective (192) Get the base of base of the base of current word

FIG. 4c

- (194) If it is a noun
- (196) Index the base of the base. End processing current word and begin processing next word.
- (198) Else do not index word. End processing current word and begin processing next word.
- (200) Else do not index word. End processing current word and begin processing next word.
- (202) Else do not index word. End processing current word and begin processing next word.
- (204) Else do not index word. End processing current word and begin processing next word.
- (206) Else if current word has 2 parts of speech
- (208) If one part of speech is a noun and the other part of speech is not an adverb
- (210) Index current word. End processing current word and begin processing next word.
- (212) Else do not index word. End processing current word and begin processing next word.
- (214) Else if current word has 3 parts of speech
- (216) If one of the parts of speech is a noun
- (218) Index current word. End processing current word and begin processing next word.

FIG. 4d (220) Else do not index word. End processing current word and begin processing next word.

(222) Else if current word has more than 3 parts of speech (224) Do not index word. End processing current word and begin processing next word.

FIG. 4e

INITIALIZE TEXT ANALYSIS PROGRAM (225)

PASS A BUFFER OF TEXT TO TEXT (229)
ANALYSIS PROGRAM

TOKENIZE TEXT (231)

CALL FILTERING PROCEDURE FOR (233)
EACH WORD

RETRIEVE INDIVIDUAL TOPIC STRUCTURES (235)
IN TOPIC STRUCTURE ARRAY

CHECK TOPIC WORD AGAINST OTHER (237)
WORDS IDENTIFIED FOR TEXT

WHEN FINISHED PROCESSING BUFFER (239)
OF TEXT OBTAIN NEXT BLOCK OF TEXT

IF NO MORE TEXT, FREE UP (241)
DATA STRUCTURES

FIG. 6

SESrecword:

(230) Recognize the input word with WFSrecognize.

(232) For each definition (path in history) of recognized word:

(234) Skip if the part of speech is the same as the last path since any expansion would be the same for this path.

(236) Check if the current part of speech is inflected:

(238) If Inflected:

(240) Check that the base has not already been found for a previous path.

(242) Skip path if base already in information list (244) Otherwise, build a word information object for base.

(246) Check if input word is in the thesaurus as an inflection.

(248) If inflected form is in the thesaurus, also build a word information object for the input word with its data.

(250) If not Inflected:

(252) Check if the word is in the thesaurus data base:

(254) If the word is in the thesaurus:

FIG. 9a (256) Build a word information structure for word.

(258) If the word is not in the thesaurus:

(260) See if the suffix can be stripped and, if so, if base is in the thesaurus, build a word information object for base. If base is not in the thesaurus, build an information structure for input word with no thesaurus data.

(262) Return list of information objects

FIG. 9b

Suffixes Which May be Stripped or Added by Subject Expansion
Without Changing the Meaning of the Word

| Added | Stripped |
|---|---|
| Inflections | Inflections |
| #ful | #ful |
| #ish | #ish |
| +ous | +ous |
| +ic | +ic |
| +al | +al |
| #ar | #ar |
| #er | #er |
| #or | #or |
| +ive | +ive |
| +ory | +ory |
| #able, +able, +ible | #able, +able, +ible |
| #ment | #ment |
| #ness | #ness |
| +ity, +ety, +ty | +ity, +ety, +ty |
| #ly | #ly |
|  | #ize |
|  | +ify, +fy |
| #y | #y |

FIG. 11

SESexplist (270) Loop through the list of information objects.

(272) Add statistics about the current word for evaluation of how many words are to be generated.

(274) Determine how many entries to generate from each category for each word based on how many words are expected to be generated and the amount of available heap space.

(276) Loop through the list of information object again.

(278) If object is selected to be skipped, go to next object.

(280) If object has been sampled and selections made, call SESgen on those selections.

(282) Otherwise, call SESgen on all of data.

(284) Free any space associated with object (286) Return the results of expansion.

FIG. 13

SESgen:

(290) Generate using the input word with the current part of speech:

(292) Inflections and Derivations.

(294) Add entries to result list for inflections and any derivations that have a suffix than can be attached to the current part of speech (296) Loop for synonyms from thesaurus:

(298) If synonym has the same part of speech as the input word:

(300) Generate inflections and derivations.

(302) Add entries to result list for inflections and any derivations that have a suffix that can be attached to the current part of speech.

(304) Go to the next synonym (306) Return list.

FIG. 14

| #. | Cont. Class | Suffix: |
|---|---|---|
| 1. | ABLE#ADJ, | +able |
| 2. | E*, | +e |
| 3. | ED, | +ed |
| 4. | VPPT, | +ed |
| 5. | VPAST, | +ed |
| 6. | ER, | +er |
| 7. | ADJC, | +er |
| 8. | ERY, | +ery |
| 9. | ADJS, | +est |
| 10. | VING, | +ing |
| 11. | LESS, | +less |
| 12. | LIKE, | +like |
| 13. | LY#ADV, | +ly |
| 14. | LY#ADJ, | +ly |
| 15. | NESS, | +ness |
| 16. | NPLUR, | +s |
| 17. | VPR3, | +s |
| 18. | S*, | +s |
| 19. | Y#ADJ, | +y |
| 20. | Y+N, | +y |
| 21. | GEN1, | +'s |
| 22. | GEN2, | +' |

The parse tree for 'satisfy':
Stem_node:
{Stem:             satis,
 Base Info:        NULL,
 Top CC_nodes:     CC_node 1}

CC_node 1:
{CC_symbol:        ABS,
 POS:              v.,
 Suffix:           +fy,
 Suffix Rating:    0,
 Children:         None}

FIG. 21a

The parse tree for 'satisfaction':
Stem_node:
{Stem:             satis,
 Base Info:        None,
 Top CC_nodes:     CC_node 1}

CC_node 1:
{CC_symbol:        ABS,
 POS:              v.,
 Suffix:           +fy,
 Suffix Rating:    0,
 Children:         CC_node 2}

CC_node 2:
{CC_symbol:        FAC*,
 POS:              empty,
 Suffix:           +fac,
 Suffix Rating:    5,
 Children:         CC_node 3}

CC_node 3:
{CC_symbol:        T*,
 POS:              empty,
 Suffix:           +t,
 Suffix Rating:    5,
 Children:         CC_node 4}

CC_node 4:
{CC_symbol:        ION,
 POS:              n.,
 Suffix:           +ion,
 Suffix Rating:    2,
 Children:         None}

FIG. 21b

The parse tree for 'revolution':
Stem_node:
{Stem: revol,
 Base Info: <BAS>: revolt, v.,
                <SUF>:empty
            <BAS>: revolve, v.,
                <SUF>:empty
 Top CC_nodes: CC_node 1}

CC_node 1:
{CC_symbol: ABS,
 POS: empty,
 Suffix: +0,
 Suffix Rating: 0,
 Children: CC_node 2}

CC_node 2:
{CC_symbol: UT*,
 POS: empty,
 Suffix: +ut,
 Suffix Rating: 5,
 Children: CC_node 3}

CC_node 3:
{CC_symbol: ION,
 POS: n.,
 Suffix: +ion,
 Suffix Rating: 2,
 Children: None}

FIG. 21c

WFSrecognize(input_word, WFS_info)

(500)  If the input word contains a space:

(502)  Return indication that not a single word.

(504)  If the input word contains any illegal characters:

(506)  Return indication that it contains an invalid character.

(508)  If there are any uppercase characters or periods in input_word, check to see if input_word is an abbreviation.

(510)  If so, create a base record for each the interpretations of that abbreviation and return.

(512)  Initialize the stem_lexicon.

(514)  For the interpretation of the first character(s) of input_word as itself (allowing no spelling changes on the first character):

(515)  If the automaton blocks on the first character(s):

(516)  Return indication that the word was not found.

(518)  Otherwise, call Lookup_stems with:
    a. input_word,
    b. interpretation,
    c. a string containing the lexical interpetation(s) of the input character(s),
    d. the current state of the automaton resulting from accepting this

FIG. 22a interpretation,
e. stem_lexicon.

(519) If no stems are found in call to Lookup_stems:

(520) Return indication that the word was not found.

(521) For each stem_record returned from Lookup_stems:

(522) If there are no more characters after the stem form:

(524) If the stem is abstract: Return indication that the word was not found.

(525) For each continuation class on the first level:

(526) Make a CC_node with:
    CC symbol: This level 1 class symbol,
    POS: The part of speech of this level 1 class looked up in suf_lexicon,
    Suffix: A null suffix,
    Suffix Rating: 0,
    Children: An empty set of pointers.

(528) If the current stem of step 521 has more than 1 level 1 continuation class and it also has <BAS> fields:

(529) For each top CC_node created in step 526:

(529A) Look up each <BAS> field associated with the current stem. Each base that has no <MAP> fields or that has a <MAP> that matches the current

FIG. 22b (530) top level class of step 525, save it to add to the stem_node created below.

Create a stem node with:
  Stem: The current stem of step 521.
  Base Info: Any <BAS> fields that map to the current level 1 class of step 525,
  Top CC_nodes: A pointer to this CC_node.

(531) Add on all the stem_nodes created in step 530 to the list of nodes being formed in step 521

Otherwise, since there is only 1 level 1 cont. class that is not abstract or there are no <BAS> fields:

(532) Build a stem node with:
  Stem: The current stem of step 521.
  Base Info: Any <BAS> fields associated with this stem,
  Top CC_nodes: Pointers to each CC_node created in step ***.

(534) Add this node to list of nodes for step 521.

(536) Go on to the next stem_record in step 521.

(538) If there are more characters in input_word after the current stem:

(540) If there is a gemination mark associated with the current stem:

(542) Move the automaton from the state listed in the current stem_record to a new state by accepting a stress mark.

FIG. 22c (544) If the automaton blocks, go on to the next stem in step 521.

(546) Otherwise, add a stress mark to the end of the current stem.

(548) For each continuation class on level 1 that has children classes:

(550) If this level 1 cont. class in step 548 is the abstract stem class:

(552) Save the symbol of its first child class.

(554) For each interpretation of a surface null character as a boundary symbol that does not block the automaton:

FIG. 22d (556) Call Lookup suffixes with:
a. A pointer into CC_lexicon where the children of the current level 1 class of step 548 are located,
b. Pointer to next character in input-word after stem,
c. A pointer to suf lexicon,
d. The state of the automaton resulting from moving over the interpretation,
e. The current interpretation of step 554,
f. A string containing the current interpretation.

(558) Move the automaton to accept the next character after the stem paired with a lexical null interpretation:

(560) Repeat step 554 to insert a boundary character, starting with the new state resulting from moving the automaton.

(562) If any child class of the current level 1 continuation class of step 548 resulted in a valid parse of input_word in steps 554 or 558:

(564) If the current level 1 cont. class of step 548 is not abstract:

(568) Create a CC_node with the following:
CC_symbol: This level 1 class symbol,
POS: The part of speech of the current level 1 class,
Suffix: A null suffix,
Suffix Rating: 0,
Children: CC_nodes returned in steps 554 and 558

(570) If the current level 1 cont. class of step 548 is the ABS class and there are no

FIG. 22e

<BAS> fields:

(571) If one of the child CC_nodes returned in steps 554 or 558 has the root suffix symbol stored in step 552:

(572) Create a CC_node with the following:
CC_symbol: The ABS class symbol,
POS: The part of speech from the root suffix CC_node,
Suffix: The root suffix,
Suffix Rating: 0,
Children: Pointers to the nodes returned in steps 554 and 558

(574) Replace the suffix and POS in the root suffix CC_node with blanks and leave the CC_node as a place holder.

(576) If no CC_node has the root suffix symbol stored in step 550:

(578) Use the root suffix symbol to locate the root suffix symbol in suf_lexicon.

(580) Create a CC_node with:
CC_symbol: The ABS class symbol,
POS: The part of speech found in step 578,
Suffix: The suffix found in step 578,
Suffix Rating: 0,
Children: A pointer to each CC_node returned in steps 554 and 558

FIG. 22f (582) If the current level 1 cont. class is the ABS class and there are <BAS> fields:

(583) Create a CC_node with:
CC_symbol: The ABS class symbol,
POS: No part of speech,
Suffix: A null suffix,
Suffix Rating: 0,
Children: A pointer to each CC_node returned in steps 554 and 558

(584) Collect the level 1 CC_nodes created in step 548

(586) If no level 1 continuation class had any children or if no child of a level 1 cont. class succeeded:

(588) Go on to the next stem_record in step 521.

(590) If the current stem of step 521 has more than 1 level 1 continuation class and also has <BAS> fields:

(592) For each successful level 1 cont. class:

(594) Look up each <BAS> field associated with the current stem. Each base that has no <MAP> fields or a <MAP> that matches the current top level class of step 592, save it to add to the stem_node created below.

(596) Create a stem_node with:
Stem: The current stem of step 521.
Base Info: Any <BAS> fields that map to the current level 1 class of step 592,

FIG. 22g (598) Top CC_nodes: A pointer to this CC_node.

(600) Add on all the stem_nodes created in step 592 to the list of nodes being formed in step 521.

(602) Go on to the next stem_record in step 521.

(604) Otherwise, if the current stem of step 524 has only one level 1 cont. class or no <BAS> fields:

Build a stem_node with:
Stem: The stem form from the current stem_record,
Base Info: Any <BAS>,<SUF> fields, etc.,
Top CC_nodes: Pointers to level 1 nodes constructed in step 548

(606) Combine this stem_node with any others formed in step 521.

(608) Go on to the next stem_record in step 521.

(610) Call Make_history with:
a. The list of stem_nodes created in step 521, (612) Return the history created in step 610.

End WFSrecognize

FIG. 22h

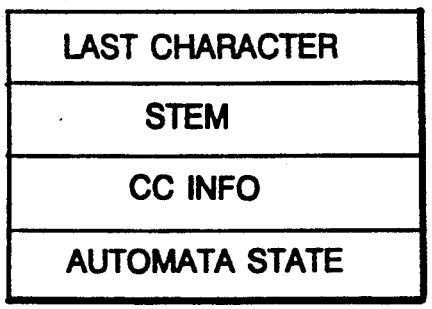
FIG. 23
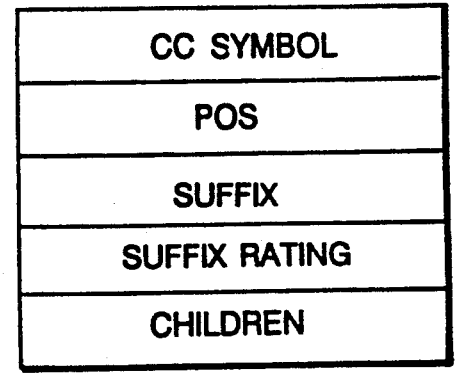
FIG. 24
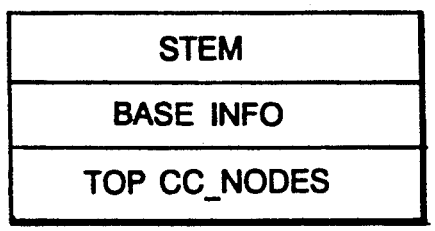
FIG. 25
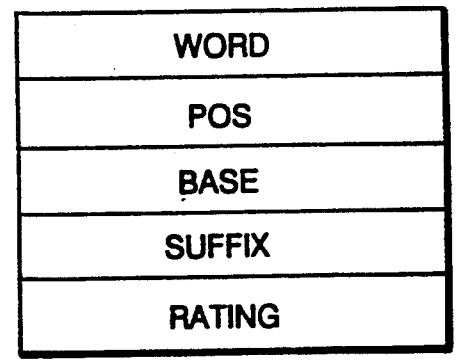
FIG. 28
Record 0:
  {Word:    fish,
  POS:     n,
  Base:    Record 0,
  Suffix:  +0,
  Rating:  0}
Record 1:
  {Word:    fishiness,
  POS:     n.,
  Base:    Record -1,
  Suffix:  #ness,
  Rating:  2}
FIG. 29

Lookup stems(input string, current interp, current-stem, automaton state, stem lexicon variables)

(620) If current_interp is not a lexical null, try to move by the lexical character in current_interp to that location in the stem lexicon.

(622) If there is no such location: Return without making records.

(624) Otherwise, let stem_lexicon_location be that new location.

(626) If there is only one character in input_string and there is no end_of_stem flag at stem_lexicon_location:

(628) Return without creating any new stem_records.

(630) If there are no more characters in input_string, but there is an end_of_stem flag at stem_lexicon_location:

(632) If a surface null can be inserted at the end of a word:

(634) For each interpretation of a surface null character:

(636) Call Lookup_stems with:
    a. The input_string,
    b. The current interpretation in step 634,
    c. current_stem plus the current interpretation,
    d. the automaton state resulting from accepting the current interpretation,
    e. stem_lexicon variables.

(638) Move the automaton to accept the end-of-word character.

(640) If the automaton is not in a final state or if current_interp is a lexical null character:

(642) Return with only any stem_records from step 634.

FIG. 26a (644) Otherwise, create a stem_record with the following:
Last_char: A pointer to the first character in input_string
Stem: current_stem,
CC_info: The pointer to the continuation class information associated with this stem,
Automaton_state: automaton_state.

(646) Return this stem_record as an output parameter.

(648) If there is an end_of_stem flag at stem_lexicon_location, and there are more characters in input_string:

(650) For each interpretation of the next (the 2nd) character in input_string that does not cause the automaton to block:

(654) Call Lookup_stems with:
 a. The rest of input_string after the first character,
 b. The current interpretation of the next character,
 c. A copy of current_stem with the lexical character of the current interpretation appended.
 d. the automaton_state after accepting that interpretation,
 e. stem_lexicon_variables.

(656) For each possible interpretation of a surface null character if nulls can be inserted:

(660) Call Lookup_stems with:
 a. input_string,
 b. The current interpretation in step 656,
 c. A copy of the current_stem with the lexical character of that interpretation appended,
 d. The automaton_state resulting from accepting that

FIG. 26b (662) interpretation
e. stem_lexicon_variables.

If the lexical character of current_interp is not null:

(664) Create a stem_record with:
Last_char: A pointer to the first character in input_string,
Stem: current_stem,
CC_info: A pointer to the continuation class information associated with this stem,
Automaton_state: automaton_state.

(666) Append this record to any stem_records returned in steps 650 or 656.

(668) Return the combined list of records.

(670) If there is no end-of-stem flag at stem_lexicon_location:

(672) For each interpretation of the next (the 2nd) character in input_string that does not block the automaton:

(676) Call Lookup_stems with:
a. The rest of input_string after the first character,
b. The current interpretation of the next character,
c. current_stem,
d. automaton_state,
e. stem_lexicon_variables.

(678) For each possible interpretation of a surface null character as a lexical character if nulls can be inserted:

FIG. 26c (682) Call Lookup_stems with:
 a. input_string,
 b. The current interpretation in step 678.
 c. current_stem,
 d. automaton_state,
 e. stem_lexicon_variables.

(684) Append the lists of stem_records returned in steps 672 and 678.

(686) Return the combined list of step 684.
end Lookup_Stems

FIG. 26d

Lookup_suffixes (700) If the lexical character of current_interp is not null:

(702) Move to current_interp in the continuation class lexicon and let suffix_lexicon_ location be that new location.

(704) If there is no branch corresponding to current_interp:

(706) Return failure.

(708) If there are no more characters left in input_string:

(710) If current_interp is a lexical null:

(712) Currently failure is returned in this case. This is an English specific feature and must be examined to see if applicable for other languages.

(714) If a surface null can be inserted at the end of a word:

(716) For each interpretation of a surface null character:

(718) Call Lookup_suffixes with:
    a. The current cont_class_list,
    b. The input_string,
    c. Suffix_lexicon_location,
    d. The automaton state resulting from accepting the current interpretation,
    e. The current interpretation in step 718,
    f. Current_suffix plus the current interpretation.

FIG. 27a (720) Move the automaton to accept the end-of-word (EOW) character.

(722) If the automaton is not in a final state:

(724) Return with any CC_nodes formed in step 714
(726) Compare cont_class_list with the classes that end at suf_lexicon_location. For each class in cont_class_list that ends at suf_lexicon_location and is not a formative ending:

(728) Create a CC_node with:
  CC symbol: The cont. class symbol of the current class
  POS: The part of speech of this cont. class,
  Suffix: current_suffix,
  Suffix Rating: The rating of that suffix,
  Children: An empty set of pointers.

(730) Return the list of CC_nodes created.

(732) If the input character is a boundary character or a lexical null character:

(734) For each interpretation of the next character in the input word:

(736) Call Lookup_suffixes with:
  a. The current cont_class_list,
  b. The rest of the input string after the first character,
  c. suf_lexicon_location,
  d. The automaton state resulting from accepting the current interpretation,
  e. The current interpretation in step 734,
  f. Current_suffix plus the current interpretation.

FIG. 27b (738) For each lexical character (except special symbols) that can surface as a null character if null characters can be inserted here:

(740) Call Lookup_suffixes with:
    a. The current cont_class_list,
    b. input_string,
    c. suf_lexicon_location
    d. The automaton_state after accepting the current interpretation
    e. The current interpretation in step 738,
    f. current_suffix plus the current interpretation.

(742) Append the lists of CC_nodes returned in steps 734 and 738.

(744) Return the combined list of step 742.

(746) Since the input_string is not empty:

(748) For each continuation class in cont_class_list:

(750) If the current continuation class represents a set of classes, replace it with its set and go through the set.

(752) Compare the current continuation class of step 748 with the cont. class vector located at suf_lexicon_location.

(754) If the current cont. class is not in the vector of classes that end here or continue from here:

(756) Skip to the next cont. class in step 748

FIG. 27c (758) If the current cont. class of 748 ends at suf_lexicon_location and it has children classes:

(760) For each lexical boundary symbol interpreted as a surface null character:

(762) Call Lookup_suffixes with:
    a. The list of the classes that are children of the current cont. class in step 748,
    b. input_string,
    c. A pointer to the top of the suffix lexicon
    d. The new automaton state resulting from accepting the current interpretation,
    e. The current boundary interpretation of step 760,
    f. a string containing the boundary char.

(764) Move the automaton to accept the next character after the stem paired with a lexical null interpretation:

(766) Repeat step 760 to insert a boundary char, starting with the new state resulting from moving the automaton.

(768) If step 760 or 764 is successful:

(770) Create a CC_node with:
    CC symbol: The current cont. class symbol in step 748,
    POS: The part of speech of that class,
    Suffix: current_suffix,
    Suffix Rating: The rating of that suffix,
    Children: A pointer to each CC_node returned by steps 760 and 764

FIG. 27d (772) Append the new CC_node to the list of CC_nodes that are created in step 748

(774) If the current cont. class in step 748 continues on from suf_lexicon_location:

(776) Collect this class into the list of classes that continue from suf_lexicon_location.

(778) After looping through the cont_class_list, if no CC_nodes were created in step 748 and no classes continue from here:

(780) Return failure.

(782) If any classes do continue on from suf_lexicon_location:

(784) For each interpretation of the next character in the input word:

FIG. 27e (786) Call Lookup_suffixes with:
    a. The list of classes collected in step 748,
    b. The rest of input_string after the first character,
    c. suf_lexicon_location,
    d. automaton_state,
    e. The current interpretation in step 784,
    f. current_suffix.

(788) For each lexical character (except boundary symbols) that can surface as a null character if null characters can be inserted here:

(790) Call Lookup_suffixes with:
    a. The list of classes collected in step 748,
    b. input_string,
    c. suf_lexicon_location,
    d. automaton_state,
    e. The current interpretation in step 788,
    f. current_suffix.

(792) Append the lists of CC_nodes returned in steps 784 and 788

(794) Append this merged list with the list of CC_nodes created in step 748.

(796) Return the list of step 794.

end Lookup_suffixes

FIG. 27f

Make_base_history(stem_node_list)

(800) For each stem_node created in stem_node_list -> current-node:

(802) Loop through top level classes:

(804) If there are <BAS> fields in current node, loop through the base fields:

(806) Allocate a history.

(808) Fill in the first record with:
Word: The <BAS> field,
POS: The part of speech of <BAS> field,
Base Index: 0,
Suffix: A null suffix,
Rating: A suffix rating of 0.

(810) If Current node is not the ABS node:

(812) Fill in the next record with:
Word: The current stem,
POS: The part of speech oF the current node,
Base Index: 0,
Suffix: Suffix from the current base field,
Rating: A suffix rating determined by a comparison of the current base and node.

(814) For each 2nd level child node:

(816) If not the 1st child node, make a new history of the records formed thus far.

FIG. 30a (818) Call Base_hist_loop with:
 a. The current stem as the base to build from
 b. The current child node,
 c. A base index of 1 if the stem is not abstract, otherwise 0,
 d. The newest history allocated,
 e. The base history structure being formed.

(820) Update numbers and pointers of output base history.

(822) If every call to Base-hist loop returned an indication that a REL ending was found:

(824) Break loop for base fields.

(826) Go on to next base in step 804.

(828) If no base fields associated with this top node:

(830) Allocate space for a history.

(832) Fill in the 1st record with:
 Word: The current stem (or if that is abstract, the current stem with the suffix from this top level node attached via QUICKGEN.)
 POS: Part of speech of the current node,
 Base Index: 0,
 Suffix: A null suffix,
 Rating: 0.

(834) For each 2nd level child node:

(836) If not the 1st child node, make a new history of the records formed thus far.

FIG. 30b (838) Call Base_hist_loop with:
   a. The current stem as the base to build from,
   b. The current child node,
   c. A base index of 0,
   d. The newest history allocated,
   e. The base history structure being formed.

(840) Update numbers and pointers of output base history.

(842) Go on to next 2nd level node.

(844) Go on to next top node in step 802.

(846) Go on to next stem node in step 800.

(848) Return all the output structure formed in step 800.

end Make_base_history

FIG. 30c

Base_hist_loop(base, cur_cc_node, base_index, cur_history, output_struct)

(850)    Let new_word be the word resulting from a call to Quickgen with base and the suffix from cur_cc_node.

(852)    If cur_cc_node used to contain the root suffix:

(854)    Let new_word be the word form found in the record referenced by base_index.

(856)    For each child CC_node:

(858)    If more than one child, for each additional child, (860)    Allocate a new history -> new_history.

(862)    Copy cur_history into new_history.

(864)    Otherwise use cur_history as new_history.

(866)    Call Base_hist_loop with:
       a. new_word,
       b. current child CC_node,
       c. base_index,
       d. new_history,
       e. output_struct.

(868)    If every call to base_hist_loop returns an indication that a REL ending was found:

(870)    Return the indication that a REL ending was found and the resulting output_struct.

FIG. 31a (872) Return success and resulting output_struct.

(874) If the suffix in cur_cc_node is a formative ending (i.e., has a suffix rating of 4):

(876) For each child CC_node of cur_cc_node:

(878) If other than the first child CC_node:

(880) Allocate a new history -> new_history.

(882) Copy cur_history into new_history.

(884) Otherwise if first child CC_node, let new_history be cur_history.

(886) Call Base_hist_loop with:
 a. new_word,
 b. This child CC_node,
 c. base_index,
 d. new_history,
 e. output_struct.

(888) If every call to Base_hist_loop returns an indication that a REL ending was found:

(890) Return the indication that a REL ending was found and the resulting output_struct.

(892) Return success and resulting output_struct.

(894) If the suffix rating of cur_cc_node denotes a REL ending:

(896) Fill the base_record at the 0$^{th}$ index in cur_history with:

FIG. 31b (898) Word: new_word,
POS: The part of speech in cur_cc_node,
Base_index: 0,
Suffix: A null suffix,
Rating: The suffix rating of 0.

Otherwise: If the suffix is not a REL ending:

(900) Fill the next available base_record in cur_history with:
Word: new_word,
POS: The part of speech in cur_cc_node,
Base index: base_index,
Suffix: The suffix in cur_cc_node,
Rating: The suffix rating from cur_cc_node.

(902) If cur_cc_node has any children:

(904) For each child CC_node of cur_cc_node:

(906) For each child other than the first:

(908) Allocate a new history -> new_history.

(910) Copy cur_history into new_history.

(912) Otherwise use cur_history as new_history.

(914) Call Base_hist_loop with:
a. new_word,
b. current child CC_node,

FIG. 31c c. index of the record formed in step 894,
d. new_history,
e. output_struct.

(916) If every call to Base_hist_loop returns an indication that a REL ending was found:

(918) Return an indication that a REL ending was found and the resulting output_struct.

(920) If a REL form was built above, return an indication that a REL ending was found.

(922) Return success and resulting output_struct.

end Base_hist_loop

FIG. 31d

WFSgenerate(template, output history)

(930) If input base is a phrase (contains a space):

(932) Return an indication that there are no derivations (934) If suffix is not empty:

(936) Look up suffix in suf_lexicon and save each class symbol that suffix belongs to, each part of speech it can have, and each rating.

(938) If suffix is not in suf_lexicon:

(940) Return an indication the it is an invalid suffix (942) If suffix is only a formative ending:

(944) Return an indication that it is an invalid word (946) If output_pos is not empty:

(948) Verify that it is a proper part of speech.

(950) If output_pos is not valid:

(952) Return an indications that the part of speech is invalid (954) If suffix is not empty:

(956) If suffix cannot produce output_pos:

FIG. 32a (958) Return an indication of mismatched data (960) If base_pos is not empty:

(962) Verify that it is a proper part of speech.

(964) If suffix_rating is not between 1 and 5 inclusive or -1:

(966) Return an indication that the suffix rating is invalid (968) If output_pos does not agree with suffix_rating:

(970) Return an indication of mismatched data.

(972) Call an internal function to recognize and retrieve the possible parses of input_base that agree with base_pos, if given. For each such parse, the stem of that parse is returned along with a pointer into the continuation class tree where the parse ended.

(974) If input base is not recognized:

(976) Return an indication that the word was not found.

(978) If input_base does not have an interpretation that agrees with base_pos:

(980) Return an indication that there is a mismatch in data that was supplied.

(982) If input_base is the root form of an abstract stem, let base be that abstract stem.

(984) If suffix is not empty:

FIG. 32b (986) Collect its equivalent classes.

(990) For each valid parse of input_base found in step 972:

(992) Fill in the top record of a temporary history with:
Word: input_base,
POS: The part of speech of the current parse,
Base: An index of 0,
Suffix: No suffix,
Rating: 0.

(994) If the current parse of input_base shows that input_base is a root form:

(996) For each irregular form of the current stem:

(998) If the irregular form has no <SUF> field:

(1000) If the part of speech of the irregular form is inflectional, get the corresponding suffix.

(1002) Else, leave the irregular's suffix blank.

(1004) Compare the suffix of the irregular form with suffix and its equivalents.

(1006) If there is a match:

(1008) Copy the temporary history into the next available history in output_history.

FIG. 32c (1010) Fill the next record in the new history with:
Word: The irregular form,
POS: The irregular form's part of speech,
Base: The index of the input_base record,
Suffix: The suffix of the irregular form,
Rating: If the irregular is an inflection, the
rating is 1. If this is a <REL> form, it's 3, else, its 2.

(1012) Using the cont. class symbols saved in step 938 above, match each symbol belonging to suffix and equivalents with the children of the last continuation class in the current parse of input_base.

(1014) For each child that has a match:

FIG. 32d (1016) Copy the temporary history into the next available history in output_history.

(1018) Fill in the next record of new history with:
Word: Quickgen of input_base and the matching suffix.
POS: The part of speech suffix forms.
Base: Index of the input_base record,
Suffix: suffix or its equivalent,
Rating: The rating from suf_lexicon.

(1020) Go on to the next parse of input_base.

(1022) If no base records were formed in step 990:

(1024) Return an indication that there is no such word (1026) Return resulting output_history.

(1028) If suffix rating is 1:

(1030) For each valid parse of input_base found in step 972:

(1032) If output_pos is not the same as or an inflection of the part of speech of input_base according to its current parse:

(1034) Go on to the next parse.

(1036) Fill in the top record of a temporary history with:
Word: input_base,
POS: The part of speech of the current parse,
Base: An index of 0,

FIG. 32e (1038) Suffix: No suffix,
Rating: 0.

(1040) Copy the temporary history into the next available history to be filled in output_history.

Call Get_records with:
  a. A ratings list of 1,
  b. base,
  c. The index of the record for input_base
  d. A pointer to the children of the last class processed for input_base,
  e. output_pos.
  f. output_history.

(1042) If the current parse of input_base shows that input_base is a root form:

(1044) For each <IRR> field for the current stem:

(1046) If the current <IRR> field is an inflectional form of input_base, and it has the same part of speech as output_pos, if given, and if it has a <MAP> field that matches the current parse of input_base or no <MAP>'s at all:

(1048) Get the next available history in output_history:

(1050) Copy the temporary history into this history if it has not been done for this history.

(1052) Fill in the next base_record with:
  Word: The current irregular form,
  POS: Its <IPO> field,

FIG. 32f (1054) Base: The index of input_base record,
Suffix: The inflectional suffix corresponding to the POS field above,
Rating: 1

(1056) Go on to the next parse of input_base in step 1030.

(1058) If no records were formed in step 1030.

(1060) Return an indication that a data mismatch existed (1062) Return each record formed in step 1028.

(1064) If suffix_rating is 2 or 3:

(1066) For each valid parse of input_base found in step 972:

Fill in the top record of a temporary history with:
Word: input_base,
POS: The part of speech of the current parse,
Base: An index of 0,
Suffix: No suffix,
Rating: 0.

(1068) Copy the temporary history into the next available history in output_history.

(1070) Call Get_records with:
a. A list of suffix_rating,
b. base,
c. The index of the record for input_base
d. A pointer to the children of the last class processed for

FIG. 32g input_base,
e. output_pos.
f. output_history.

(1072) If input_base is a root form:

(1074) For each derivational <IRR> form, if suffix_rating is 2, or <REL> form, if suffix_rating is 3, whose part of speech matches output_pos, if given, and which has a <MAP> field that matches the current parse or no <MAP>'s:

(1076) Get the next available history in output_history:

FIG. 32h (1078)   Copy the temporary history into this history if it has not been done for this history.

(1080)   Fill in the next base_record with:
         Word: The current irregular form,
         POS: Its <IPO> field,
         Base: The index of the input_base record,
         Suffix: The <SUF> field,
         Rating: 2, if <IRR> form, or 3, if <REL>.

(1082)   Go on to the next parse of input_base in step 1064.

(1084)   If no records were formed in step 1064:

(1086)   Return an indication that a data mismatch existed.

(1088)   Return the base_records formed.

(1090)   If suffix_rating is 4:

(1092)   For each valid parse of input base found in step 972:

(1094)   Fill in the top record of a temporary history with:
         Word: input_base,
         POS: The part of speech of the current parse,
         Base: An index of 0,
         Suffix: No suffix,
         Rating: 0.

(1096)   Copy the temporary history into the next available history to be filled in output_history.

FIG. 32i (1098) Call Get_records with:
  a. A list of ratings 1 and 2,
  b. base,
  c. The input_base record index,
  d. A pointer to the children of the last class processed for input_base,
  e. output_pos,
  f. output_history.

(1100) If input_base is a root form:

(1102) For each <IRR> form whose part of speech is equal to output_pos, if given, and which has a <MAP> field that matches the current parse or no <MAP> fields:

(1104) Get the next available history in output_history:

(1106) Copy the temporary history into this history if it has not been done for this history.

(1108) Fill in the next record with:
  Word: The irregular form,
  POS: The irregular form's part of speech,
  Base: The index of the input_base record,
  Suffix: The <SUF> field or the suffix found by the part of speech,
  Rating: 2 if the <IRR> form is derivational, 1 if inflectional.

(1110) Go on to next parse of input_base in step 1092.

FIG. 32j (1112) If no records were formed in step 1092:

(1114) Return an indication of a data mismatch.

(1116) Return the base_records formed.

(1118) If suffix_rating is 5:

(1120) For each valid parse of input_base found in step 972:

(1122) Fill in the top record of a temporary history with:
Word: input_base,
POS: The part of speech of the current parse,
Base: An index of 0,
Suffix: No suffix,
Rating: 0.

(1124) Copy the temporary history into the next available history to be filled in output_history.

(1126) Call Get_records with:
a. A ratings list of 1, 2, and 3,
b. base,
c. Index of input_base record,
d. A pointer to the children of the last class processed for input_base,
e. output_pos,
f. output_history.

(1128) If input_base is a root form:

FIG. 32k (1130) For each <IRR> and <REL> form whose part of speech is equal to output_pos, if given, and which has no <MAP> fields or one that matches the current parse:

(1132) Get the next available history in output history:

(1134) Copy the temporary history into this history if it has not been done for this history.

FIG. 321

(1136) Fill in the next record with:
Word: The irregular form,
POS: The irregular form's part of speech,
Base: The index of the input_base record,
Suffix: The <SUF> field or the suffix found by an inflectional part of speech,
Rating: 2 if the form is <IRR> and is a derivational form, 1 if it is inflectional, and 3 if a <REL> form.

(1138) Go on to next parse of input base in 1120.

(1140) If no records were formed in step 1120:

(1142) Return an indication of a data mismatch (1144) Return the base_records formed.

(1146) If suffix_rating is -1:

(1148) For each valid parse of input_base found in step 972:

(1150) Fill in the top record of a temporary history with:
Word: input_base,
POS: The part of speech of the current parse,
Base: An index of 0,
Suffix: No suffix,
Rating: 0.

(1152) Copy the temporary history into the next available history to be filled in output_history.

FIG. 32m (1154) Call Get_records with:
a. a list of -1,
b. base,
c. index of the record for input_base,
d. Pointer to the rest of the cont. class tree for the current parse of input_base,
e. output_pos.
f. output_history.

(1156) If in the current parse of input_base, input_base is found to be a root form:

(1158) For each irregular and related form of the current parse of input_base that has the same part of speech as output_pos, if given, and which has a <MAP> field that matches the current parse or no <MAP> fields at all:

(1160) Get the next available history in output_history:

(1162) Copy the temporary history into this history if it has not been done for this history.

(1164) Fill in the next record with:
Word: The irregular or related form,
POS: The part of speech of the irregular form,
Base: Index of the record of input_base,
Suffix: The associated <SUF> field. If the <SUF> field of this form is empty, look it up with the part of speech of this form.

(1166) Go on to the next parse of input_base in step 1148.

FIG. 32n (1168) If no records were formed in step 1148:

(1170) Return an indication that there were no derivations.

(1172) Return all the records created in step 1148.

end WFSgenerate

FIG. 32o

Get_records(suffix_ratings, base, base_index, cc_list, output_pos, output_history)

(1180) For each cont. class in cc_list:

(1182) Expand the class if it is a macro.

(1184) Look up its suffix in suf_lexicon.

(1186) If the current class is the root suffix class for an abstract stems:

(1188) Call Get records with:
 a. suffix_ratings,
 b. The word field from the record at base_index in the current history,
 c. base_index,
 d. A pointer to the children of the current class,
 e. output_pos,
 f. output_history.

(1190) If the current cont. class is a formative ending:

(1192) Call Get_records with:
 a. suffix_ratings,
 b. base with the formative morpheme added,
 c. base_index,
 d. A pointer to the children of the formative class,
 e. output_pos,
 f. output_history.

FIG. 33a (1194) If this is not the first record on this level:

(1196) Get the next available history in output_history (1198) Copy the current history up to this point into the new history which becomes the current history.

(1200) If the current cont. class produces output_pos and its suffix rating is one of the ratings in suffix_ratings:

(1202) Fill the next record with:
Word: Quickgen of base with the suffix found.
POS: The part of speech of the suffix,
Base: base_index,
Suffix: The suffix added,
Rating: The rating of the suffix.

(1204) If suffix_ratings contains just -1

(1206) Call Get_records with:
a. suffix_ratings,
b. Quickgen of base and the suffix of this cont. class,
c. index of the record filled above or -1 if not done,
d. A pointer to the children of the current cont. class
e. output_pos,
f. output_history.

(1208) Else if one of the ratings in suffix ratings matches the rating of the current class and a record was filled in step 1200:

FIG. 33b (1210) Call Get_records with:
 a. a list of rating 1,
 b. Quickgen of base and the suffix of this cont. class,
 c. index of the record filled above,
 d. A pointer to the children of the current cont. class
 e. no part of speech,
 f. output_history.

(1212) Go on to the next class in step 1180.

(1214) Return the records formed in step 1180.

end Get_records

FIG. 33c

Quickgen[instring]

(1220) Reduce instring to all lower case letters so they can be input to the automaton.

(1222) Initialize automaton to its initial state.

(1224) For each interpretation of the first character in instring:

(1226) Place the interpretation in outstring.

(1228) If instring was capitalized, capitalize this character in outstring.

(1230) Call Genloop with:
   a. the string reduced in step 1220 less the first character,
   b. the state of the automaton resulting from accepting the current interpretation of step 1224.
   c. outstring.

(1232) If Genloop is successful, return outstring.

(1234) Otherwise, go on to the next interpretation in step 1224.

(1236) If no interps yield a valid parse of instring or if the automaton blocks on every interpretation of the first character of instring:

(1238) Return an indication that the word was not found.

end Quickgen

FIG. 34

Genloop (1240) If there are no more characters left in input_string:

(1242) Move the automaton over the end-of-word (EOW) character.

(1244) If the automaton is in a final state:

(1246) Place a zero-terminator at the end of outstring.

(1248) Return success.

(1250) If the automaton blocks on the EOW character or are not in a final state:

(1252) Return that the word was not found.

(1254) Since there are more characters in input_string, for each interpretation of the 1st character of input_string (that does not block the automaton):

(1256) Append that interpretation (if not null) to outstring.

(1258) Call Genloop with:
 a. The rest of input_string,
 b. The state of the automaton after accepting the current interpretation,
 c. outstring.

(1260) If Genloop is successful:

(1262) Return success.

FIG. 35a (1264)  Otherwise, go on to the next interpretation of step 1254.

(1266)  For every interpretation of a lexical null character if a null character can be inserted here:

(1268)  Append that interpretation to outstring.

(1270)  Call Genloop with:
    a. input_string,
    b. The state of the automaton resulting from accepting this interpretation,
    c. outstring.

(1272)  If Genloop is successful:

(1274)  Return success.

(1276)  Otherwise go on to the next interpretation.

(1278)  If all interps of a lexical null block the automaton, or no interp causes Genloop to succeed:

(1280)  Return that word was not found.

end Genloop

FIG. 35b

MORPHOLOGICAL ANALYZER

BACKGROUND OF THE INVENTION

The invention relates generally to morphological analyzers and to text management systems.

Each year organizations spend countless hours searching through documents and images, organizing filing systems and databases. Even with large information retrieval systems, considerable resources are needed to index documents, guess which key words will locate needed information, search through pages one query at a time, and sort through all the irrelevant data that the search actually yields.

A number of studies evaluating large information retrieval systems show that these systems are retrieving less than 20 percent of the documents relevant to a particular search, and at that the same time only 30 percent of the retrieved information is actually relevant to the intended meaning of the search request. One of the key reasons for poor retrieval results is that the people who perform retrieval only know the general topics of their interest and do not know the exact words used in the texts or in the keyword descriptors used to index the documents.

Another study analyzed how long it would take to index 5000 reports. It was assumed that each user was allowed 10 minutes to review each report, make indexing decisions by selecting the keywords, and record the information. At this rate, it would take 833 hours or 21 weeks for one full-time person (at 40 hours per week) to process the documents. The users would also need extra time to verify and correct the data. Under such an approach, the user must index incoming documents on a daily basis to keep the system from falling hopelessly behind. In addition, since the user chooses the relevant search terms, all unspecified terms are eliminated for search purposes. This creates a significant risk that documents containing pertinent information may not show up during a search because of the user's subjective judgement in selecting keywords.

Many text retrieval systems utilize index files which contain words in the documents with the location within the documents for each word. The indexes provide significant advantages in the speed of retrieval. One major disadvantage of this approach is that for most of the systems the overhead of the index is 50 to 100 percent of the document database. This means that a 100 Mbyte document database will require an index ranging from 50 to 100 Mbytes. This adds mass storage costs and overhead to the system.

SUMMARY OF THE INVENTION

In general, in one aspect, the invention is a morphological analyzer for analyzing the morphology of an input word. The analyzer includes a recognition engine which includes means for finding a stem within the input word; and means for identifying suffixes attached to the stem. The stem finding means and suffix identifying means cooperate to conduct morphological analysis of the input word from the root to the affix and the recognition engine performs inflectional and derivational analysis, the derivational analysis using more than two derivational suffixes.

Preferred embodiments include the following features. The stem finding means operates by starting near the beginning of the input word and proceeding through the input word one letter at a time to find the stem. The stem finding means starts its recognition task at the $n^{th}$ letter of the input word, skipping the first $n-1$ letters of the input word, where n is an integer variable which takes on different values depending upon the size of the input word. The suffix identifying means operates by proceeding through the portion of the input word remaining after the stem one letter at a time to find the suffixes. The recognition engine in performing its stem and suffix recognition functions proposes a surface null after at least some of the characters of the input word. The stem finding means and the suffix identifying means both employ a two-level morphological model for performing their functions. The two-level morphological model is derived from a set of spelling change rules which translate a surface string into its lexical string and it is implemented by a single automaton. The rules in the set of spelling change rules are of the following form: W . X/Y _Z, wherein W is a lexical character, X is a surface character, Y is a first pair string describing an environment preceding W . X and Z is a second pair string describing an environment following W . X.

Preferred embodiments also contain the following additional features. The morphological analyzer also includes a general lexicon which itself includes a suffix lexicon and a stem lexicon. The suffix lexicon contains formative suffixes and it contains REL suffixes wherein REL suffixes are those suffixes which when added to a root form distantly related words that are also root forms. The suffix lexicon also contains more than one boundary character. The stem lexicon contains valid words and abstract stems, it contains a plurality of irregular words and for each of at least some of the plurality of irregular words, the stem lexicon identifies a cross-reference to one or more corresponding base forms for that irregular word, wherein each of the base forms is a valid word. The stem lexicon also identifies, for certain of the stems, a cross-reference to irregular forms of that stem. In addition, the stem lexicon contains a plurality of abbreviations and, for each of the abbreviations, it identifies a cross-reference to a corresponding stem which gives an expanded form of that abbreviation.

Also in preferred embodiments, the suffix lexicon contains a plurality of suffixes and each of the plurality of suffixes is represented by a corresponding continuation class. The stem lexicon identifies, for each stem within the stem lexicon, a corresponding continuation class tree, wherein the continuation class tree for a given stem represents the valid combinations of suffixes that can be attached to that stem. The general lexicon further includes a continuation class lexicon, wherein the continuation class lexicon contains a plurality of continuation class trees, each of the continuation class trees corresponding to a different stem found within the stem lexicon and representing the valid combinations of suffixes that can be attached to that stem. The general lexicon includes only one suffix lexicon and that suffix lexicon is shared by all continuation classes. For each of at least some of the suffixes, the suffix lexicon identifies a corresponding suffix rating indicating the closeness in meaning between a first word and a second word formed by adding that suffix to the first word. More specifically, the suffix rating indicates whether that suffix is inflectional, derivational, or formative. The recognition engine returns a base history of the input word, wherein the base history contains morphological information about the input word. The base history includes a stem record for each stem found within the input word and, for each stem record, one or more continuation class records identifying the suffixes added to that stem to produce the input word, wherein each of the continuation class records identifies a part of speech associated with the corresponding suffix.

The morphological analyzer also includes a generation engine for generating words that are lexically related to the input word by using information returned through the base history supplied for the input word by the recognition engine. The generation engine generates the lexically related words by proposing lexical nulls at certain points during the generation of the lexically related words. The morphological analyzer also includes a lexicon containing a listing of stems and, for each stem, an associated continuation class tree. Each continuation class tree controls which suffixes the generation engine adds to the stem with which it is associated. The morphological analyzer also includes a table identifying equivalent suffixes. The equivalent suffixes are those which form similar words when added to a base word. The generation engine uses that table to identify which suffixes are added to a given stem to produce lexically related words.

In general, in another aspect, the invention is a method of analyzing the morphology of an input word. The method includes first finding a stem within the input word; and then identifying all suffixes attached to that stem. The suffix identifying step involves inflectional and derivational analysis, the derivational analysis using more than two derivational suffixes.

Preferred embodiments include the following features. The method further includes a step of returning a morphological history of the input word. It also includes a step of generating words that are lexically related to the input word by adding suffixes to the input word, the addition of suffixes being based upon information supplied by the morphological history.

One advantage of the invention is that it is capable of performing full inflectional and derivational analysis of an input word. Also, the invention is capable of recognizing multiple suffixes that are attached to a stem word to produce the input word.

Another advantage of the invention is that it substantially improves the completeness of results in document and/or text searches. Furthermore, the invention automatically expands keywords in a search to include lexically related words, synonyms of certain of said lexically related words, and words that are lexically related to the synonyms. In addition, the invention gives a user the ability to search text and other documents for concepts without knowing the exact form in which the concepts are discussed. Furthermore, the invention is capable of analyzing and expanding a keyword to include synonyms even when the keyword is not in a thesaurus.

Another advantage of the invention is that it can be used to substantially reduce this overhead in document indexing by identifying the words that are important to the content of the document and generating an index containing this subset of words. This not only saves disk space but also processing time, since the search operations can be performed on a much smaller index. The invention generates a list of topic words from text, each of which is informative about the content of the text, and it excludes words from text that do not convey much information. Using linguistic information to perform this task provides several principled ways of distinguishing words with high information content from words with low information content.

Another advantage is that the invention helps eliminate additional redundancy in an index of concepts found within text by identifying words that are related by inflection or derivation (e.g., "category" and "categories," "subject," "subjects," and "subjectness"). Instead of representing each instance of a word that differs slightly from previous instances, a base of the word is stored and used to represent all forms that can be derived from it. Thus, for example, "category" may be stored once in the list and it can represent "category," "categories," and even "categorical." This greatly reduces the storage required for indexes to text.

The filtering procedures described in this application were applied to a number of text samples for evaluation, including a 153-word paragraph from a linguistics article, a 447-word financial memo, and a page from a functional specification containing 550 words. The resulting lists for these three contained 23%, 25%, and 17% of the words in the original text, respectively. The results obtained by testing other text samples were consistent with these numbers. The filtering mechanisms of the invention can identify 75% to 80% of the text as irrelevant to the topic of the text.

Other advantages and features will become apparent from the following description of the preferred embodiment and from the claims.

DESCRIPTION OF THE PREFERRED EMBODIMENT

Figure 5:
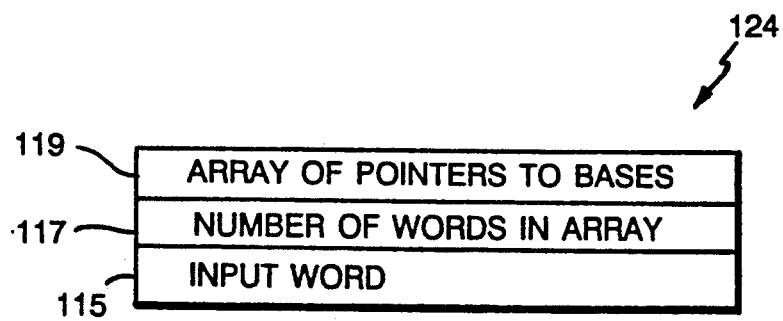
Figure 7:
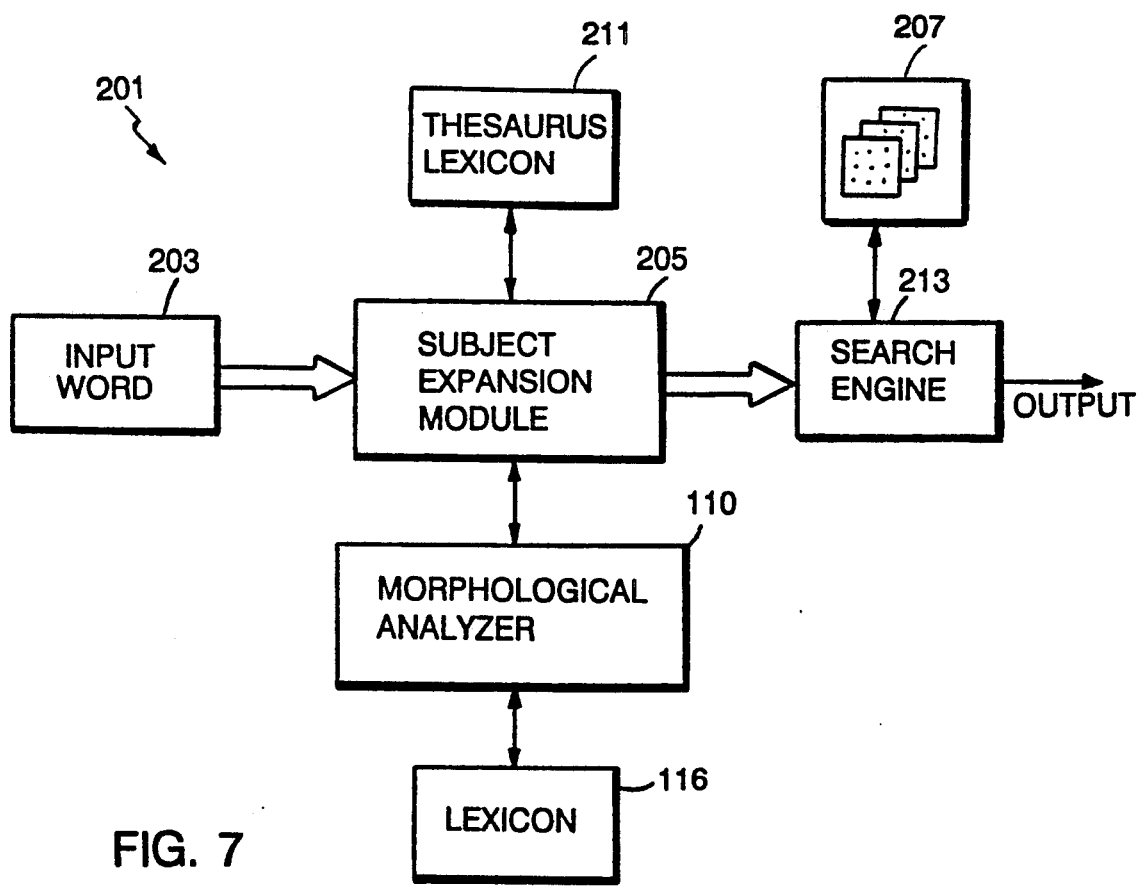
Figure 8:
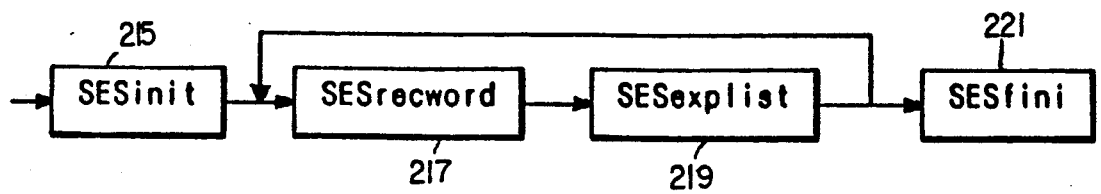
Figure 12:
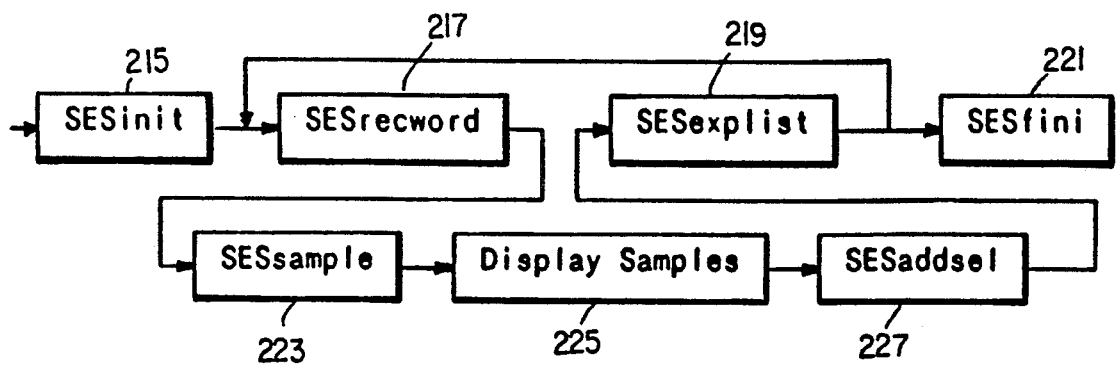
Figure 10:
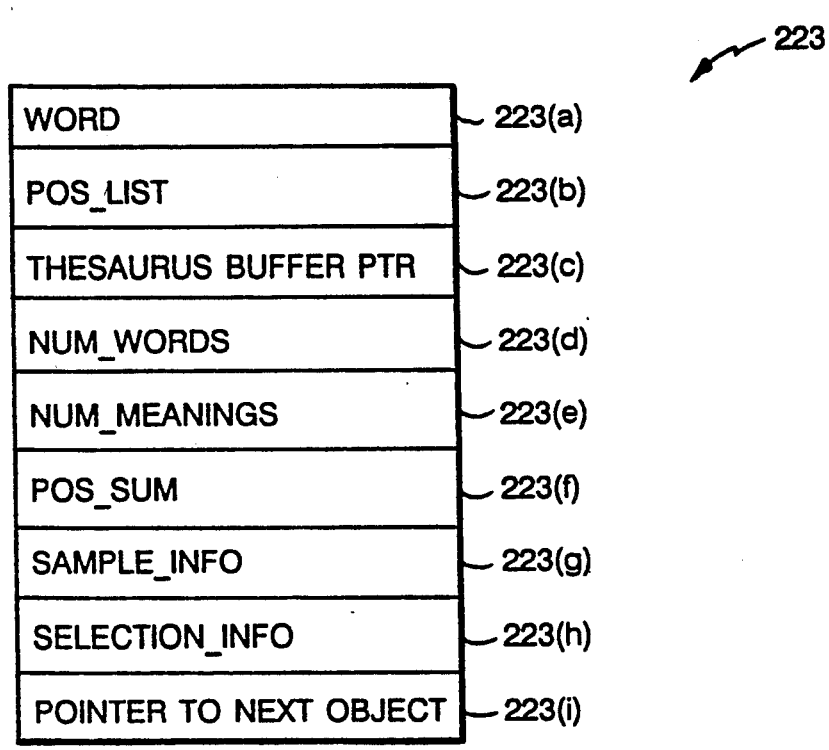
Figure 15:
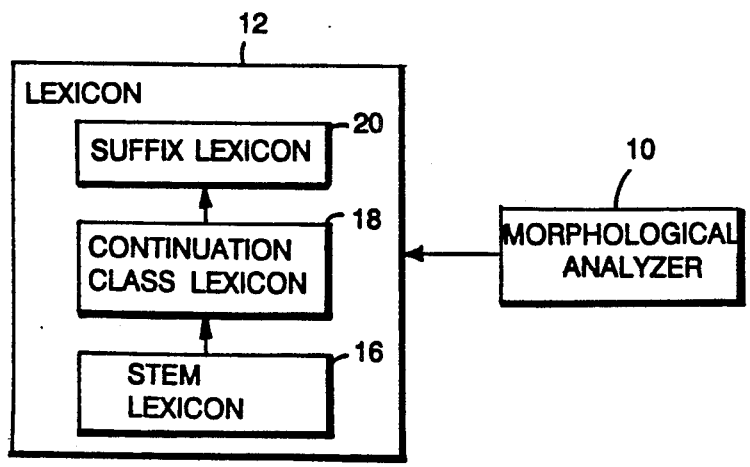
Figure 16:
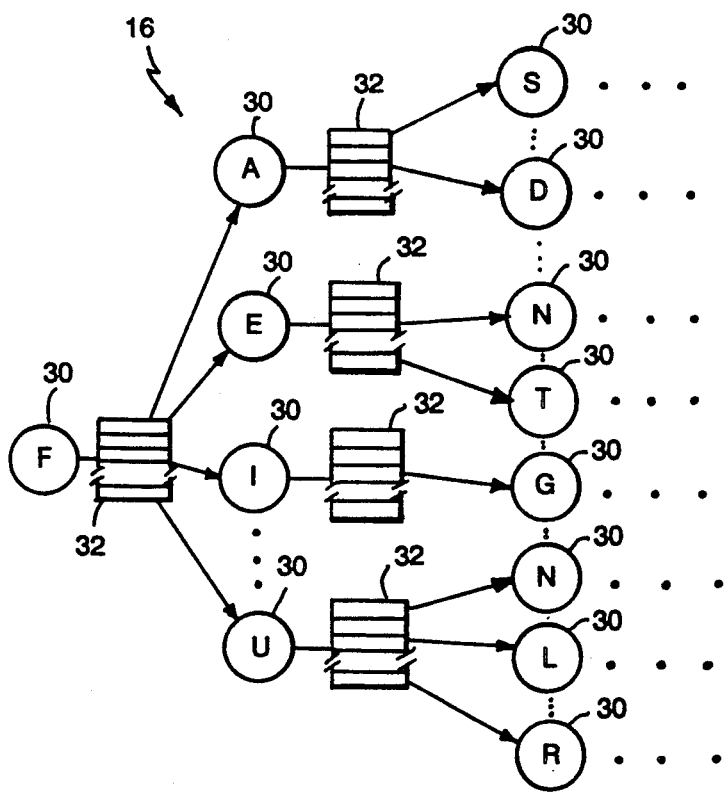
Figure 17:
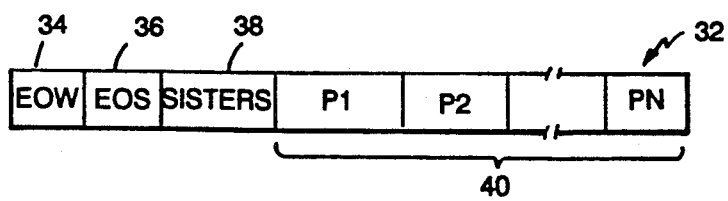
Figure 18:
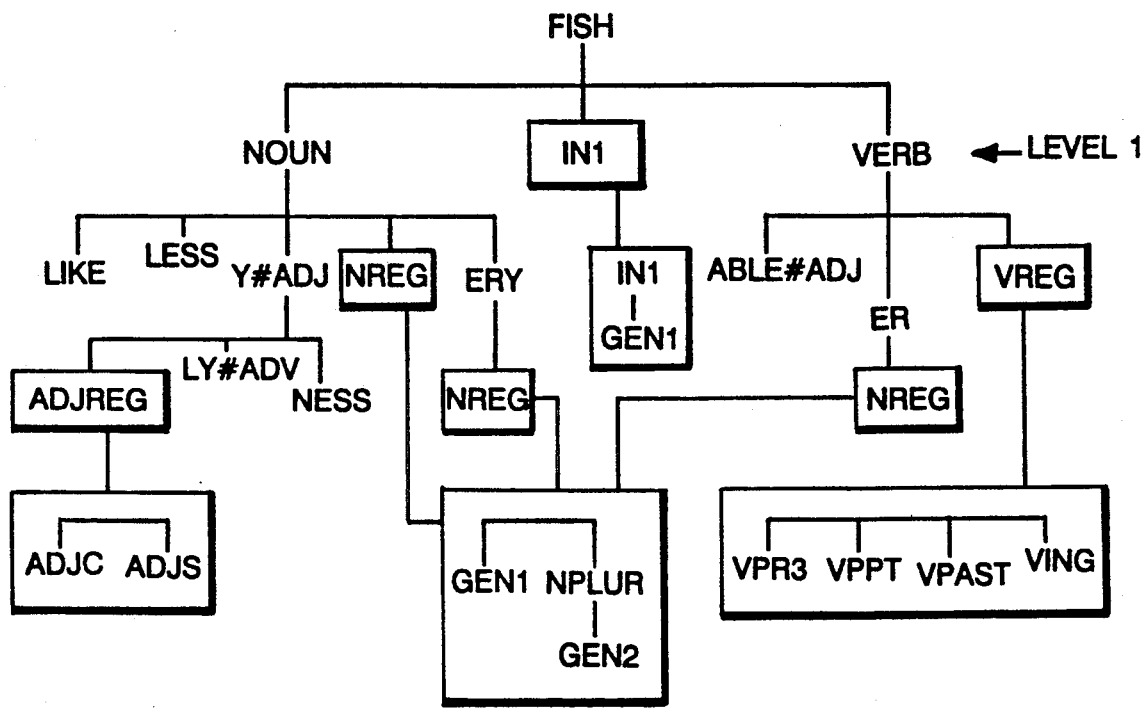
Figure 19A:
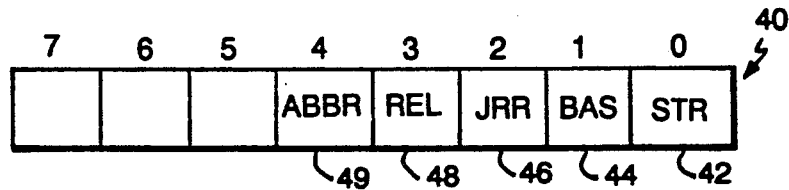
Figure 19B:
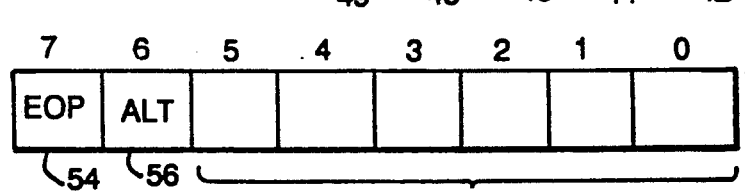
Figure 19C:
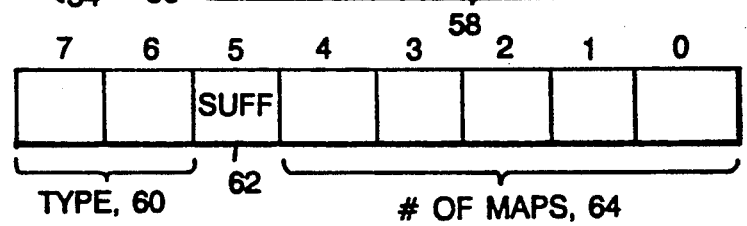
Figure 19D:
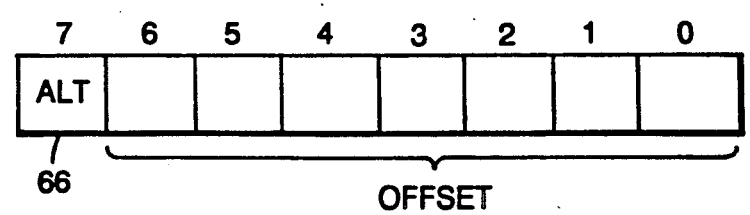
Figures 20A, 20B:
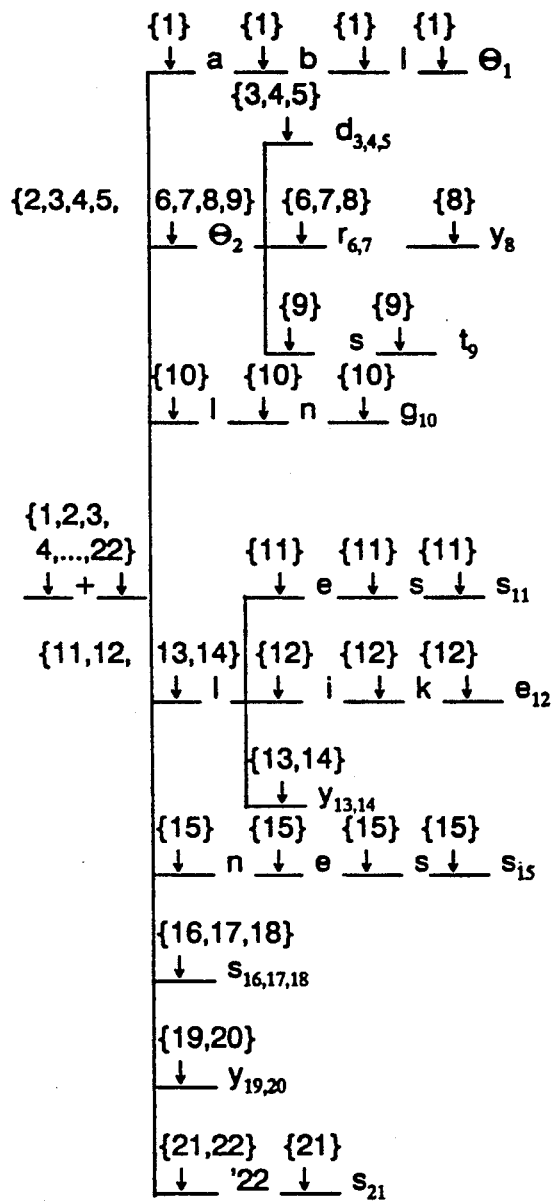

FIGS. 4a–h present a pseudo-code description of the operation of the intelligent filter;

FIG. 5 is a topic data structure used by the intelligent filter to pass topic information back to the application;

FIG. 6 illustrates the use of the intelligent filter to analyze text, one block at a time;

FIG. 7 is a block diagram of a text searching system including a subject expansion module;

FIG. 8 is a block diagram of the subject expansion module shown in FIG. 7;

FIGS. 9a–b present a pseudo-code description of the operation of SESrecword;

FIG. 10 is an information object which is a member of the information list data structure created by SESrecword;

FIG. 11 is a list of suffixes which can be added to a word and a list of suffixes which can be stripped from a word without significantly changing the meaning of the word;

FIG. 12 is a block diagram of another embodiment of the subject expansion module shown in FIG. 7;

FIG. 13 is a pseudo-code description of the operation of SESexplist;

FIG. 14 is a pseudo-code description of the operation of SESgen;

FIG. 15 is a block diagram showing the morphological analyzer and the lexicon;

FIG. 16 illustrates the structure of the stem lexicon;

FIG. 17 illustrates the form of the data structure associated with each node in the stem lexicon;

FIG. 18 is a continuation class tree for 'fish';

FIG. 19a is the structure of the property byte portion of a continuation class lexicon entry;

FIG. 19b is the structure of the continuation class node portion of a continuation class lexicon entry;

FIG. 19c is the structure of the <type/suff-flag-maps> portion of a continuation class lexicon entry;

FIG. 19d is the structure of the <alt/offset> portion of a continuation class lexicon entry;

FIG. 20a illustrates a portion of a suffix lexicon;

FIG. 20b relates the continuation class numbers used in FIG. 20a to corresponding continuation classes and the associated suffixes;

FIGS. 21a-c show parse trees for 'satisfy', 'satisfaction' and 'revolution', respectively;

FIGS. 22a-d present a pseudo-code description of the operation of WFSrecognize;

FIG. 23 is a stem__record data structure;

FIG. 24 is a CC__node data structure;

FIG. 25 is a stem__node data structure;

FIGS. 26a-d present a pseudo-code description of the operation of Lookup__stems;

FIGS. 27a-f present a pseudo-code description of the operation of Lookup__suffixes;

FIG. 28 is a base history record data structure;

FIG. 29 is a base history for 'fishiness';

FIGS. 30a-c present a pseudo-code description of the operation of Make__base__history;

FIGS. 31a-d present a pseudo-code description of the operation of Base__history__loop;

FIGS. 32a-o present a pseudo-code description of the operation of WFSgenerate;

FIGS. 33a-c present a pseudo-code description of the operation of Get__records;

FIG. 34 presents a pseudo-code description of the operation of Quickgen; and

FIGS. 35a-b present a pseudo-code description of the operation of Genloop;

STRUCTURE AND OPERATION

Figure 1:
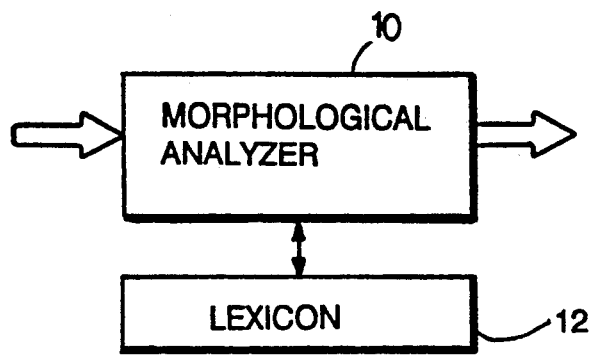
FIG. 1 is a block diagram showing a morphological analyzer and a lexicon.

Referring to FIG. 1, two principal components of the embodiments described herein are a morphological analyzer 10 and a lexicon 12. To provide a basis for describing the embodiments which employ these components, only a brief description of these two components will be presented at this time. For the operation of the embodiments which employ these components as described herein, the particular details of construction and operation of morphological analyzer 10 and lexicon 12 are not important. Nevertheless, after describing the embodiments which employ these components, a more detailed description of the design and operation of the particular morphological analyzer and lexicon used in the embodiments is presented later.

The Lexicon

Lexicon 12, contains information about the underlying (lexical) forms or all the words that can be generated or recognized (in their surface form) by morphological analyzer 10. Lexicon 12 is not simply a listing of all these words in their underlying form, but instead contains morphological items, referred to as morphemes, that are combined to build the lexical forms of words. For example, the morphemes 'success'+-'ful'+'ly' for the word 'successfully'. Associated with each morpheme is information that can include the part of speech the morpheme forms, related forms, and a list of what kinds of morphemes can follow the current one.

The Morphological Analyzer

The main functions of morphological analyzer 10 are recognition and generation. An internal function, referred to as WFSrecognize, implements the recognition capabilities of morphological analyzer 10. Another internal function, referred to as WFSgenerate, implements the generation capabilities of morphological analyzer 10. WFSrecognize analyzes a word to determine its morphological structure, and WFSgenerate generates the correct spelling of a word given its underlying morphological structure. Each of these internal functions will be described in greater detail later.

Figure 2:
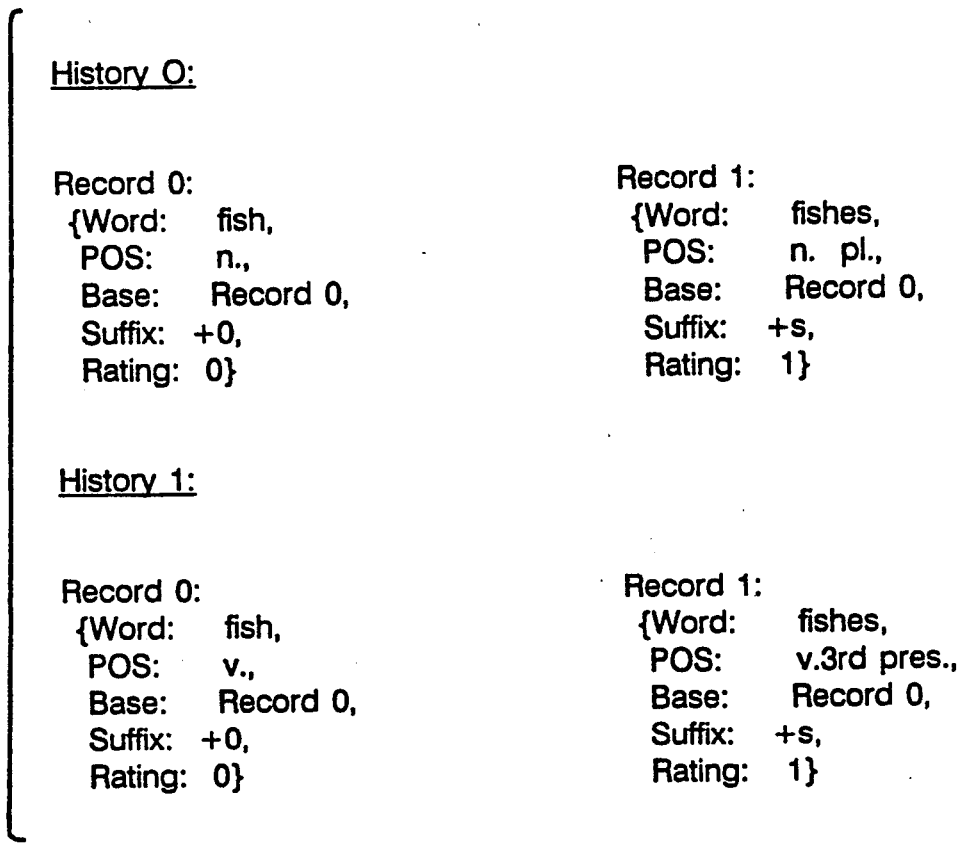
FIG. 2 is a base history for 'fish'.

When performing recognition, morphological analyzer 10 analyzes an input string, identifying its root (or roots), any intervening words in its derivational history, any suffixes it may contain, and the lexical categories of all words in the derivational history. If the input string is successfully parsed (i.e., if a stem and the associated suffixes required to form the input word are found), morphological analyzer 10 returns a base history. If the input word has more than one parse, a base history for each is returned, each history (or path) presenting a listing of each form of the input word as each successive suffix is stripped. Thus, for example, in the case of 'fishes', two histories, shown in FIG. 2, are returned.

Each base history includes one or more records showing the bases that result from successively stripping off suffixes. Note that the word left after a suffix has been removed is called the base of the word with the suffix added. If no more suffixes can be stripped off a word, the word is the root of the other words. Each record contains the word from which a suffix is stripped, the part of speech of that word, an index referring to the record in the history that contains the base that is formed after the suffix is stripped, the suffix which is added to the base to make the word and the rating of the suffix which was added. The suffix rating is a number that is used to classify a suffix and the word it forms. Suffixes are grouped according to the closeness in meaning before and after the suffix is added. For example, inflectional endings, which simply change grammatical features of the original word, have a rating of 1. Derivational endings, which usually change the part of speech of the original word and generate a word more distant in meaning, have a rating of 2.

When performing generation, morphological analyzer 10 synthesizes words that are lexically related to a given word, adding suffixes, if appropriate, using any restrictions specified with the input regarding suffixes or lexical category to control the size and content of the set of words returned. Generation involves the following sub-tasks. Morphological analyzer 10 first does recognition on the input string to find out: how many parses the input string has; its stem or stems; and if it already contains suffixes. Morphological analyzer 10 then identifies the stem which is to be used for synthesis. Next, morphological analyzer 10 determines what suffixes can be added to it and returns all surface strings that can be synthesized from the lexical input word.

Text Management Functions

In accordance with one aspect of the invention, the morphological analyzer is used to aid text management functions, such as indexing and searching. Embodiments for carrying out this text management function will now be described.

Figure 3:
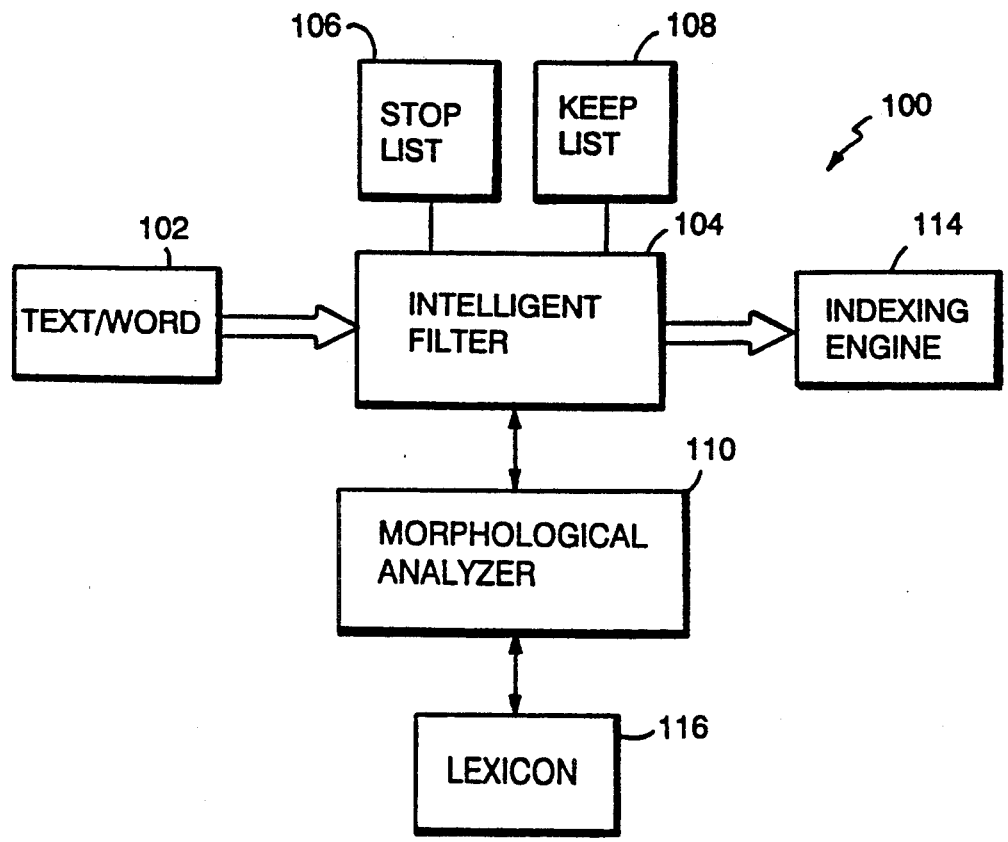
FIG. 3 is a block diagram of an indexing system which includes an intelligent filter.

Referring to FIG. 3, in an indexing system 100, input words 102 from a block of text are passed to an intelligent filter 104 that automatically identifies which of the input words are topic or concept words, i.e., words which describe the meaning of the text in which the words appear. Intelligent filter 104 uses several mechanisms to identify the topic words, including a stop list 106, which lists words that are automatically rejected as topic words, a keep list 108, which lists words that are automatically accepted as topic words, and a morphological analyzer 110, which analyzes the input word to identify its morphological structure. Morphological analyzer 110 makes use of a lexicon 116 to perform the morphological analysis of the input words that are passed to it. Intelligent filter 104 uses the morphological information derived for the input words that are sent to morphological analyzer 110 to determine which of the input words are most likely to be topic words. The list of topic words generated by intelligent filter 104 then passes to a conventional indexing engine 104, which uses the topic words to generate an index for the text from which the input words were extracted. Indexing engine 114 may use any one of a number of known indexing techniques to either produce index cards for the text being indexed or to generate an index identifying the location of the topic words within the body of the text.

Stop list 106 contains a list of words that typically do not convey topic information, such as articles, prepositions, conjunctions, and other function words. A substantial number of the words in this list can be identified from a dictionary on the basis of their part of speech. The value of adding all of such words to a stop list is that intelligent filter 104 need not waste time and computational resources of morphological analyzer 110 to analyze those words. Stop list 106 also includes words that were identified by running samples of text through intelligent filter 104 and then analyzing the results to identify words that appear at the output but clearly do not convey topic information. Thus, another value of stop list 106 is that it serves to catch those few words that are not caught by the analytic component of the intelligent filter 104.

Keep list 108 serves the opposite function to that of stop list 106. It specifies words that the analytic component of intelligent filter 104 might tend to reject even though they convey topic information. Keep list 108 may be empirically generated by running several sample documents through intelligent filter 104 and then identifying those words which were rejected but which the user feels should be included among a list of topic words. In this way, keep list 108 provides a mechanism for fine tuning the system and for customizing the system to the particular needs and the unique vocabulary of particular users.

The operation of intelligent filter 104 will now be described with the aid of the flow diagram presented in FIGS. 4a–e. When a text indexing application program needs to index a block of text, it first calls an initialization function to open up the functions and lexicons (i.e., the reference works) that will be used by intelligent filter 104 to analyze the words passed to it. The application which calls intelligent filter 104 also allocates space for a topic structure 124 (see FIG. 5), which is used by intelligent filter 104 to pass topic information back to the application. Topic structure 124 includes a field 115 for the input word which was analyzed, a field 119 for an array of pointers to the bases that were found in the input word, and a field 117 for the number of bases within the array.

In its call to intelligent filter 104, the application passes an input word 102, i.e., the current word. Referring to FIGS. 4a–d, intelligent filter 104 first determines whether the current word qualifies for morphological analysis by checking whether it contains alphabetic characters (step 130). If it does not have alphabetic characters, filter 104 rejects the current word as a topic word and requests the next word from the application program (step 132). If the current word does have alphabetic characters, filter 104 checks whether there are quotation marks around it (step 134). If the current word is a quoted string, filter 104 identifies it as a topic word and passes this information to indexing engine 114 using topic data structure 124 so that indexing engine 114 can index the current word (step 136). Then filter 104 requests another word. On the other hand, if the current word is not a quoted string, filter 104 looks up the word in keep list 108 (step 138).

If the current word appears in keep list 108, filter 104 indexes the word and moves on to the next word (step 140). If the current word does not appear in keep list 108, filter 104 compares it against stop list 106 (step 142). If the current word appears in stop list 106, filter 104 rejects the word and requests the next word (step 144). If the current word does not appear in stop list 106, filter 104 calls upon the recognition capability of morphological analyzer 110, namely, WFSrecognize, to obtain a morphological analysis of it (step 146).

WFSrecognize identifies the stems within the current word and determines which suffixes have been added to those stems to create the current word. The analysis begins with the first character in the current word and proceeds one character at a time until each stem and any suffixes which have been attached to that stem are found. That is, WFSrecognize parses the input word. When the analysis is complete, WFSrecognize returns a base history for the current word. The base history consists of a list of history arrays, each of which contains the records of a corresponding one of the successful parses which were found.

It is possible that WFSrecognize will not find the current word or any base words for the current word within lexicon 116. In that case, WFSrecognize indicates that the word was not recognized. This occurs for words such as some proper names (e.g., Nixon). When WFSrecognize reports that the current word was not recognized, filter 104 treats the current word as a topic word, indexes it and then requests the next word (step 148).

It is also possible that the current word contains a character that cannot be processed by WFSrecognize. In such cases, filter 104 indexes the word and then moves onto the next word (step 150).

If WFSrecognize succeeds in parsing the current word, intelligent filter 104 uses the returned base history information to evaluate whether the current word is a topic word. First, filter 104 checks whether the current word has only one part of speech associated with it (i.e., was there only one successful parse of the word?) (step 152). If only one part of speech was returned, filter 104 checks what the part of speech is. If the part of speech is a noun, filter 104 indexes the current word and moves on to the next word (step 154). For example, the current word might be 'history' or 'science', both of which are nouns, in which case, filter 104 indexes the word.

On the other hand, if the part of speech is an adjective, such as 'historic' or 'scientific', filter 104 obtains the base of the current word and checks its part of speech (step 156). (Recall that the base is identified in the base field of the history record for the current word.) If the part of speech of the base of the current word is a noun, filter 104 indexes the base and then moves onto the next word (steps 158-160). If the part of speech of the base is an adjective, filter 104 obtains the base of the base and checks its part of speech (steps 162-164). For adjective bases, filter 104 indexes the base only if the base of the base is a noun (step 168). Otherwise, it rejects the word and moves on to the next word (step 170). For example, if the current word is 'historical', i.e., an adjective having a noun base of 'history', filter 104 indexes 'history'. If the base is neither a noun nor an adjective, filter 104 also rejects the current word and moves on to the next word.

If the current word is an adverb, filter 104 performs a similar analysis to that which it performed for an adjective (steps 174-202). That is, filter 104 gets the base of the current word and checks its part of speech. If the base is a noun, filter indexes the base and moves on to the next word. However, if the base is an adjective, filter 114 looks at the next level, i.e., the base of the base. If the base of the base is a noun, as in the case of 'scientifically', filter 104 indexes the base of the base (i.e., 'science') and moves on. If the base of the base is an adjective, however, filter moves to the next level of the history for the current word and looks at the base of the base of the base, if one exists. If the base of the base of the base is a noun, filter 104 indexes that base, otherwise, it rejects the word and moves on.

If the current word has only one part of speech and if it is not a noun, an adjective or an adverb, filter 104 rejects it. Similarly, if the current word is an adverb but its base is neither a noun nor an adjective, filter 104 rejects it.

For the cases in which the current word has two (and only two) parts of speech (i.e., it is ambiguous), filter 104 indexes the word only if one part of speech is a noun and the other part of speech is not an adverb (steps 206-212).

For the cases in which the current word has three parts of speech (and only three), filter 104 indexes the word only if one of its parts of speech is a noun (steps 214-220).

Finally, for those cases in which the current word has more than three parts of speech, filter does not index the word (steps 222-224).

In the above description, it should be noted that if the current word is ambiguous (e.g., 'leaves' may be the plural of 'leaf' or the third person singular of the verb 'leave'), filter 104 will output more than one base for the word.

After filter 104 has processed all of the words in the text, the application frees up any allocated tables that were used and it closes the reference work.

After the application has used the information in the topic structure that was passed to the application, the application also frees the memory allocated for it.

In the above-described embodiment, text is processed one word at a time. That is, the application program asses each word to intelligent filter 104, one word at a time, and generates an index using whatever is returned. It is also possible for the application to pass a block of text to intelligent filter 104, in which case filter 104 generates an array of topic structures, one structure for each topic word identified in the block of text. In that case, the application program calls a text analysis program which operates as shown in the flow diagram of FIG. 6.

The application program first initializes the text analysis program, and the appropriate data structures and it opens the reference work containing the text that is to be indexed (step 225). Then, the application program fills a buffer with a first block of text to be analyzed and passes this to the text analysis program which, in turn, tokenizes the text to identify the individual words within it (steps 229 and 231). Known techniques may be used to tokenize the text, using, for example, spaces and/or quotation marks as indicators of word boundaries. The text analysis program calls intelligent filter 104 for each word found within the block of text (step 233). Intelligent filter 104 processes the words passed to it and builds a topic structure array including the individual topic structures produced for each of the topic words found among the words from the block of text. After the topic structure array for the entire block of text is complete, the application program retrieves the individual topic structures within the array and checks each topic word to see if it has already been identified for the text. If it has not, the topic word is added to a list of concepts associated with the text (steps 235-237).

The application program continues in this fashion through the text, one block at a time until the entire text has been indexed (step 239). After processing all of the text, the application program frees up the memory which was used during the text analysis operation and closes all relevant files.

Note that intelligent filter 104 tends to compress the size of the index required for any given text for at least two reasons. First, it identifies words that qualify as topic words and rejects other words which do not relate to content of the text. In addition, for many text words it supplies a word that is lexically related to the text word and the indexing engine indexes the lexically related word. As a consequence, a group of lexically related words within the text tends to be represented by a single word selected from the group of lexically related words.

The approach of using a single word to represent a group of lexically related words in a text index may be employed by itself. In that case, the user might manually select a word from text which is to be represented in the index and then use the recognition capabilities of the morphological analyzer to produce a group of words that are lexically related to the selected word. As the indexed word, the indexing engine would then use a word selected from the set of words formed by the original word and its lexically related words. In other words, each word in the resulting index represents a set of lexically related words within the text. In that case, each of the lexically related words in the text does not appear as a separate word in the index.

FIG. 7 illustrates a system 10 in which morphological analyzer 110 assists in searching text. In text search system 201, an input word 203, which is part of a search request generated by a user, is passed to a Subject Expansion Module (SES module) 205 where it is expanded into a list of related subjects. A search engine 213 uses the expanded list generated from the input word to search text stored in a memory 207 and to return as output the identity of those documents which refer to any of the items appearing on the expanded list. To perform its subject expansion functions, SES module utilizes morphological analyzer 110 to generate a list of words lexically related to the input word. Morphological analyzer 110 relies upon the information stored in a lexicon 110 to perform a morphological analysis of the input word and generate a corresponding base history. The history contains the different bases found within the input word and the suffixes that are attached to those bases to generate the input word. Using the information developed by morphological analyzer 110, SES module 205 uses a thesaurus lexicon 211 to expand certain of the lexically related words into a list of synonyms for those words. In general, the expansion is done for each of the definitions that are found for the input word, i.e., for each part of speech. However, since synonyms are not available for all words, in the cases when synonyms are not found for the input word, SES module 205 uses lexically related words that are found within the base history generated for the input word.

The operation of SES module 205 is generally illustrated by the block diagram shown in FIG. 8. When an input word is passed to SES module 205, it calls an SESinit function 215 to initialize the data structures, functions and lexicons which will be used during its operation. After initialization, a SESrecword function 217 uses morphological analyzer 110 to construct a base history for the input word and, using the information available in the base history, generates a list of synonyms from thesaurus lexicon 211. For each of the words and the synonyms generated by SESrecword, a second function SESexplist 219, takes the words and synonyms generated by SESrecword 217 and generates a set of lexically related words and synonyms and lexically related synonyms, which it passes along with the input word and its lexically related words to search engine 213 as an expanded list to be used for searching. After the expansion task is completed, a SESfini function 221 frees up the memory that was initialized for this operation and closes the lexicons. SESrecword 217 and SESexplist 219 will now be described in greater detail.

SESrecword 217 operates as shown in FIGS. 9a–b. When the function is first called, it uses WFSrecognize to analyze the input word that is passed as part of the function call (step 230). For each successful parse of the input word WFSrecognize returns a history. Each history contains, among other things, the stem, the suffixes which are attached to the stem to form the input word and the part of speech of the input word. Since it is possible that more than one definition of the word exists, WFSrecognize may find more than one successful parse.

After WFSrecognize completes its recognition function and returns the information, SESrecword 217 loops through each definition (i.e., path in the history) that is returned (step 232) and for each path, it performs the following operations. First, it checks whether the current path has the same part of speech as any other path which it has processed thus far (step 254). If the current path has the same part of speech as a previously processed path, SESrecword 217 skips the current path and moves on to the next one (step 236). Note that the expansion of a path that yields the same part of speech as a previously expanded path will also yield the same expansion.

If the part of speech for the current path is new, SESrecword 217 checks whether the current part of speech is inflected (step 236). If it is inflected, there is the possibility that the base for the current path has already been found for a previous path. For example, the past tense and the past participle of a verb have the same base and, therefore, yield the same expansion. To avoid duplicating previous work and in the case of inflected words, SESrecword 217 checks the base of the current path against other bases that have been found for other paths (step 240). Information about the other paths is stored in an information list that SESrecword 217 is building during this process to return its results to the application program. The information list, which is a collection of different forms that are recognized for the input word, is a linked list of information objects 223, as illustrated in FIG. 10. If the base is found within the information list, SESrecword 217 skips the current path. Otherwise, it checks whether the base form is in thesaurus lexicon 211. If the base form is in the thesaurus lexicon, SESrecword 217 builds a new information object 223 for the base and adds the new object to the information list. The new object contains all of the synonyms that were found in the thesaurus lexicon associated with that base.

Referring back to FIG. 10, each object 223 includes a field 223(a) containing the word for which synonyms were found, a pos_list 223(b) identifying the parts of speech associated with the word, a thesaurus buffer (TH buffer) 223(c) which contains all of the synonyms for the word, and a pointer 223(i) to the next object in the list. Each information object also includes a num_words field 223(d) for specifying the number of synonyms in TH buffer 223(c), a num_meanings field 223(c) for the number of different meanings or connotations that were listed for the word, and a pos_sum field 223(f) for predetermined statistics about the average number of generated forms that will typically result from expanding the word as a function of its part of speech. In other words, pos_sum provides a basis for estimating how many words an expansion of the list of words in TH buffer 223(c) will produce. Experience indicates that the number of words that an expansion will produce depends on the part of speech of the word. For example, a noun typically results in three words when expanded, a verb results in seven words and an adjective results in four words. This information is used later by the expansion function to determine how many words of the TH buffer to expand.

Each information object 223 also includes a sample information (sample_info) field 223(q) containing an array of pointers to each of the possible samples within TH buffer 223(c) and a selection info field 223(b). A sample is defined as a possible meaning or connotation of the word. In the case of the College Thesaurus, synonyms are organized into different meaning categories. The pointers in sample_info field 223(g) identify the beginning of each of the categories within TH buffer 223(c). As will be explained in greater detail shortly, in some embodiments, the user is offered the option of selecting which samples to include within the expansion performed by SESexplist 219. The user's indications are recorded in selection_info field 223(h) for later use.

Referring again to steps 238–248 in FIG. 9a, after constructing the information object for the base or after determining that the base form is not found in the thesaurus lexicon, SESrecword 217 also checks whether the input word is in the thesaurus as an inflection (step 246). If it is, SESrecword builds another information object for the input word (step 248).

For the cases in which the part of speech for the current path is not inflected, SESrecword 217 checks if the word is in the thesaurus lexicon (step 252). If the word is in the thesaurus lexicon, an information object is built for the word and added to the information list (step 256). On the other hand, if the word is not in the thesaurus, SESrecword 217 examines its history to determine whether a suffix can be stripped from the word to form a base having substantially the same meaning (steps 258-260). The words have substantially the same meaning means, for example, if the function of the words created by stripping the suffix is semantically the same as the function of the word from which the suffix is stripped. Only certain suffixes can be stripped without significantly changing the meaning of the word. A list of those suffixes appears in FIG. 11. (Note that '+' and '#' are boundary characters or markers following Aronoff, Mark (1976) *Word Formation in Generative Grammar*. Linguistic Inquiry Monograph 1, MIT Press, Cambridge, Mass.) Such a list is stored in a table which SESrecword accesses to determine whether it is permissible to strip the current suffix so as to create a word from which synonyms may be generated. If the suffix can be stripped, SESrecword 217 tries to find the resulting base in the thesaurus lexicon. If the base is found, the function builds a word information object for the base. If it cannot be found, however, the function builds a word information object for the input word without any thesaurus data.

After SESrecword has looped through each path and performed the operations described above, it returns the completed list of information objects to the application program.

As shown in FIG. 12, in another embodiment, SES module 205 is modified to permit the user to skip over information objects for expansion or to select the synonyms within an information object for which expansion will be performed (an operation referred to generally as sampling). In the modified version of SES module 205, the application passes the output of SESrecword 217 to a SESsample function 223 which selects a subset of words from each category (i.e., from each meaning) and the application displays these subsets of words to the user. In the present embodiment (i.e., with the College Thesaurus), SESsample 223 selects the first two words in each category for display. The user then selects which information objects are to be skipped and the categories within information objects for which expansion is desired. Another function, namely, SESadd_sel 227, stores the user's selections in selection_info field 223(b) of the appropriate information object 223 (see FIG. 10).

In both embodiments described above, the actual expansion of the words returned by SESrecword 217 is performed by two other functions, namely, SESexplist 219 and SESgen 221 and illustrated in the flow diagrams of FIGS. 13 and 14, respectively. Each of those functions will now be described.

SESexplist 219 takes the information list returned by SESrecword 217 and expands it to include lexically related words generated from the recognized forms of the input word and the synonyms found by SESrecword 217. Referring to FIG. 13, when SESexplist 219 is first called, it loops through the list of information objects (step 270) and computes the total number of words in the TH buffers from the numbers in num_words fields 223(d) (see FIG. 10) (step 272). Then, using the information stored in pos_sum field 223(f), SESexplist 219 estimates the total number of words likely to result from expanding all of the sampled categories obtained through the thesaurus (step 274). (If the sampling feature is not present, it is assumed that words from all categories will be expanded.) The total number is then scaled to reflect an limitations that might exist on available memory. In a DOS environment, for example, the memory space limitations can be quite severe; whereas, in other environments, such as virtual memory systems, it may not be necessary to limit the number of words that are generated. Using the scaled number, SESexplist 219 computes the number of words that can be safely chosen from each sampled category for expansion without exceeding the available memory. The distribution of words chosen from the categories is performed so as to fairly represent all of the sample categories in the TH buffers 223(c). That is, some number is chosen from all selected categories with the larger categories receiving larger representation than the smaller categories.

After SESexplist 219 determines the number of words that can be expanded from each category, it loops through the list of information objects again to perform the actual expansion operations (step 276). For the current information object, SESexplist 219 first checks whether it was selected to be skipped (step 278). If the current object is marked to be skipped, SESexplist 219 moves on to the next information object. If the current object is not selected to be skipped, SESexplist 219 checks whether it has been sampled by examining the contents of its selection_info field 223(h). If the object has been sampled and selections were made, SESexplist calls SESgen 221 on those selections. In this phase of operation, SESgen 221 expands the permitted number of words within the sampled category based upon the computations performed in steps 272 and 274, above.

If the object has neither been skipped nor sampled, SESexplist 219 calls SESgen 221 on all of the data present in the object (step 282). During this step, SESgen only expands the number of words in each category that are permitted by the limitations computed in steps 272 and 274, above.

When SESexplist 219 is done expanding the word in a given information object, it frees up any space associated with that object (step 284). After SESexplist has looped through all information objects, it returns the results of the expansion to search engine 213, which constructs a search based upon the information in the expanded list. In other words, search engine 213 conducts its search using the input word, words that are lexically related to the input word, synonyms of the input word and of the words that are lexically related to the input word (if any such synonyms exist), and words that are lexically related to the synonyms. Search engine 213 uses any one of a number of known techniques to use the expanded list to conduct the search for all documents or locations within documents that refer to any words on the expanded list.

The repeated calls to SESgen 221 generate the result list that is returned. As shown in FIG. 14, when SESgen is called, it first identifies the input word and its part of speech from the information found within the appropriate fields of the information object (step 290). For the input word, SESgen calls a generation function, WFSgenerate, which causes morphological analyzer 110 to produce all inflections and derivations that can be generated from that word by the addition of one suffix. It also produces any inflections of the derivational forms. WFSgenerate returns an output_history data structure, which is an array of histories for all of the expansions that were found. The first record in each history contains the input word, and the last record contains an inflected form, a derivational form, or an inflection of a derivational form. In this last case, a middle record will contain the derivational form, i.e., the input word with one derivational suffix attached.

From among the histories that were produced, SESgen 221 selects all inflectional forms and adds those to a result list (step 294). If derivational forms are also included within the output_history data structure, SESgen 221 selects only those derivations that have a suffix which can be attached to the current part of speech of the input word without significantly changing the meaning of the word. Only certain derivational suffixes may be attached to a base without significantly changing its meaning. As in the case of stripping suffixes words formed by adding suffixes will have substantially the same meaning as the base word, for example, if the function of the words created by adding the suffix is semantically the same as the function of the word to which the suffix is added. A list of those suffixes appears under the appropriately labelled column in FIG. 11. Such a list of suffixes is stored in a table which SESgen accesses to determine whether any derivations have a suffix that can be attached to the current part of speech. It adds only those entries to the result list.

After SESgen has processed the input word of the information object, it loops through the synonyms found within the TH buffer in the information object (step 296). For the current synonym, SESgen 221 compares its part of speech with that of the input word (step 298). If the parts of speech are the same, SESgen 221 performs the same expansion as was described above. That is, it generates all inflections and derivations of the synonym which have only one suffix added to the synonym and it adds the inflections and only those derivations that have a suffix which can be attached to the current part of speech of the synonym to the result list for the information object (steps 300 and 302).

After SESgen 221 has looped through all of the synonyms for which expansions are to be generated, it returns the result list to SESexplist 219 (step 300).

Note that a limited form of subject expansion can be employed which does not use a thesaurus. In that case, the search is conducted using the input word plus the group of lexically related words that are generated by the morphological analyzer.

Having described the text management systems which employ the morphological analyzer, further details regarding the described emobidments of the morphological analyzer and the lexicon will now be provided.

The Lexicons

In the described embodiment, the morphemes have been divided into two main categories which are handled differently: the root morphemes (stems) and the ending morphemes (suffixes). The ending morphemes are attached to the root morphemes and to each other. Referring to FIG. 15, lexicon 12 is divided into two sub-lexicons based on these two categories of morphemes: a stem lexicon 16 containing the stem forms, and a suffix lexicon 20 containing the suffixes from all the different continuation classes. A third lexicon, referred to as continuation class lexicon 18, contains a continuation class tree for each stem. Each continuation class tree identifies all of the suffixes which may be added to the associated stem and, thus, it represents a set of links into suffix lexicon 20 for that stem.

Stem and suffix lexicons 16 and 20 are stored in compacted letter tree form with any information associated with the stem or ending accessed from the last character of that stem or ending. As will become apparent in the following discussion, however, the information associated with a stem differs from that associated with an ending.

The Stem Lexicon

Stem lexicon 16 is made up of two types of entries: (1) valid English words (e.g., "permit"), and (2) abstract stems, which are not valid words but to which suffixes can be added to form complete words (e.g., "permission" which serves as a stem for "permissive" and "permission"). Referring to FIG. 16, stem lexicon 16 includes compacted letter trees including nodes 30, each one representing a different character of a stem found within the trie. Associated with each node 30 is a data structure 32 (shown in greater detail in FIG. 17) which contains information about that node and the nodes which are connected to it on the next lower level of the tree. Each data structure 32 has a character and at least three flags, namely, an end-of-word (EOW) flag 34, an end-of-stem (EOS) flag 36 and a sisters flag 38, and it may include a pointer array 40. EOW flag 34 indicates whether that node represents the end of that branch. EOS flag 36 indicates whether the node represents an end of a valid stem. And, sisters flag 38 indicates whether another branch extends off of the parent node. If a stem ends at a node, its pointer array 40 contains an index which identifies that stem's entry into continuation class lexicon 18 where all of the continuation class information for the stem is stored.

The Continuation Class Lexicon

A continuation class is associated with a single suffix and/or a single lexical category, which is the category of the word derived by adding that suffix. Stems do not themselves have lexical category information associated with them. Stems that are legitimate words (i.e., not abstract) have a continuation class that represents a null suffix but assigns a part of speech to the stem. A stem that is lexically ambiguous has such a continuation class for each lexical category to which it belongs.

When words of more than one lexical category can be derived by adding a single suffix, a separate continuation class is assigned for each lexical category. For example, '#s' is an inflectional suffix that forms plural nouns and also third person singular verbs; '#er' is an inflectional suffix that forms comparative adjectives and a derivational suffix that forms nouns from verbs. (Note that inflectional endings simply add inflection to the part of speech of the original word; whereas, derivational endings change the part of speech of the original word and form words that are more distant in meaning.) For each of these suffixes, there are two distinct continuation classes. By requiring each continuation class to be associated with no more than one lexical category, the system can take advantage of constraints on the possible sequence of suffixes, since most suffixes attach to words of a particular lexical category.

The system makes use of over 140 continuation classes, two thirds of which are associated with a suffix and a lexical category. There are 13 continuation classes associated with other affixes such as '+fac' in 'satisfaction'. Since the addition of these formatives does not produce a complete word, they have no lexical category associated with them. Another 36 continuation class are associated with a lexical category but no affix and are used to assign a part of speech and grammatical features to roots (e.g., NOUN assigns noun singular; VPAST assigns verb past tense) and to irregular inflectional forms that do not contain a suffix.

Appendix A1 identifies all of the top level classes (level 1 classes) represented in the continuation class lexicon. Appendix A1 identifies the class (e.g. VERB), the numerical code used to represent that calls (in the case of VERB, it is 3c); and the part of speech (POS) for that class, which in the case of VERB is 'verb tenseless'.

Every stem has its own unique tree of continuation class symbols that represent the valid combinations of suffixes that can be attached to the stem. Besides this tree, there are fields for the exceptional cases, i.e., ones that cannot be included in the continuation class tree. These exceptional case fields contain a cross-reference to another stem in stem lexicon 16 which represents an irregular form.

Here 'irregular forms' means words which cannot be related to their base through the continuation classes because of spelling changes too significant to be handled by the spelling change rules of the morphological analyzer. Such irregular forms include: irregular verbs (forgive-forgave-forgiven); nouns with irregular plurals (index-indices); and irregular comparative and superlative forms of adjectives (good-better-best). The irregular forms are given separate entries in the lexicon, where they refer back to their bases. The base entry is linked to the irregular form entries by the <IRR> label and the irregular form entries are linked to the base entry by the <BAS> label.

Associated with the continuation class for the irregular stem form is a corresponding field cross-referencing back to the stem the irregular form is based on. Besides the continuation class tree and the exception fields, there is a flag that appears when the last syllable of a stem, even if it is just one syllable, is stressed or when the last character of a stem should be doubled. This is called a gemination mark which will cause the automaton to double the last character if other conditions allow it.

Stress is represented in the continuation class lexicon for all words that exhibit primary stress on the last syllable including monosyllabic words. Because stress information is used solely by the gemination rule, secondary stress is not represented in the lexicon at all, and no stress information is represented in abstract stems or in continuation class lexicon 18. Consequently, stress is not represented for derived or inflected forms. Words that do not bear final stress but undergo gemination are also marked in the lexicon.

Table I following gives examples of the entries in continuation class trees associated with the stems 'fish' and 'shoot'.

Stem: fish
Gemination Mark: true
Continuation Classes:

| Class | Corresponding_Word(s) |
|---|---|
| <1> NOUN - | fish (n.) |
| <2> LIKE - | fishlike |
| <2> LESS - | fishless |
| <2> Y#ADJ- | fishy |
| <3> ADJREG - | fishier, fishiest |
| <3> LY#ADV - | fishily |
| <3> NESS - | fishness |
| <2> NREG - | fish's, fishes, fishes' |
| <2> ERY - | fishery |

-continued

| | |
|---|---|
| <3> NREG - | fishery's, fisheries, fisheries' |
| <1> IN1 - | fish (n. pl.) |
| <1> VERB - | fish (v.) |
| <2> ABLE#ADJ - | fishable |
| <2> ER - | fisher |
| <3> NREG - | fisher's, fishers, fishers' |
| <2> VREG - | fishes, fished, (have) fished, fishing |

Stem: shoot
Gemination Mark: true
Continuation Classes:

| Class | Corresponding_Word(s) |
|---|---|
| <1> VERB - | shoot (v.) |
| <2> VPR3 - | shoots |
| <2> VING - | shooting |
| <2> ER | shooter |
| <3> NREG - | shooter's, shooters, shooters' |

Irregular form: shot
Part of speech of irregular form: (v.p.t.)
Irregular form: shot
Part of speech of irregular form: (v.p.p.)

FIG. 18 displays the same continuation class information for 'fish' but in tree form. Note that there is no part of speech information associated with the stem itself. Part of speech is associated with suffixes only. Because of this, all symbols on the first level of a continuation class tree (identified as LEVEL 1 in FIG. 18) are special. They represent null suffixes which contain no characters, but they assign the different possible parts of speech to the stem form to which they attach.

An inflection or derived word that cannot be generated by merely concatenating a root and affixes and applying spelling-change rules is linked to its real root by a pair of cross-references, one leading from the root to the derived form, and one leading from the derived form to the root. This mechanism is used to link words represented with abstract stems to roots (e.g., the 'clar' entry with 'clarify,' 'clarification,' etc. to 'clear'), irregular inflections to their root (e.g., 'made' to 'make'), and to link roots with words whose derivation violates spelling-change rules.

The layout of a continuation class lexicon entry is as follows: entry. → <property><cc node><BAS><IRR><REL>. As shown in FIG. 19a, the property byte 40 includes a five bits which identify the properties of the entry. There is a STR bit 42, a BAS bit 44, an IRR bit 46, a REL bit 48 and an ABBR bit 50. STR bit 42 indicates whether the stem for this entry geminates. BAS, IRR and REL bits 44, 46, and 48 indicate if any of each type of field appears after the listing of the continuation classes. ABBR bit 50 indicates if the current entry belongs to an abbreviation (1 if it does and 0 it does not). If ABBR bit 50 is set to 1, there are no continuation classes for the entry.

Referring the FIG. 19b, a continuation class node 52 (i.e., <cc node>) is a one or two byte entry. The first byte includes an EOP bit 54, an ALT bit 56, and 6 bits 58 which encode the class for that node. EOP and ALT bits 54 and 56 are used for navigation through the continuation class tree. EOP bit 54 indicates whether the current node is the end of the path. ALT bit 56 indicates whether the current node has a sibling. If the encode continuation class in the first byte is all zeros, the next byte contains the actual class.

The irregular field information is stored in the following form: {BAS, IRR, REL} → <alt/offset> <type/-suff-flag/maps> [<suff>] <map/class> <pos> <entry>. As shown in FIG. 19d, the <alt/offset> portion is a 1 byte entry which gives the length of the irregular string (i.e., <entry>) found at the end of the irregular field information entry. It also includes an ALT bit 66 which indicates whether another irregular field follows the current entry. The <type/suff-flag-maps> portion is a 1 byte entry having the structure shown in FIG. 19c. It includes two type bits 60, a SUFF bit 62 and a five-bit portion 64 which specifies the number of map fields associated with this particular irregular field. Type bits 60 indicate the type of irregular field; it specifies the bit position of this type as found in the property byte. SUFF bit 62 indicates whether or not there is a suffix byte following this entry. If a suffix byte is present, it is represented by the <suff> portion which is also a 1 byte entry containing a hash number for the suffix associated with the irregular field.

The <map/class> portion is a 1 byte entry for each class associated with the irregular field. Each top level class associated with the irregular form is listed here.

Finally, the <pos> portion is a 1 byte entry which encodes the part of speech associated with this node.

The Suffix Lexicon

Suffix lexicon 18 contains 78 distinct inflectional and derivational suffixes and formatives. Appendix A2 is a complete list of affixes, including both true suffixes and formatives, and it gives examples of words in which the suffixes appear. Note that a formative is a suffix that cannot end a word but must be followed by another. All suffixes are associated with a boundary marker, either '+' or '#' following Aronoff, Mark (1976) *Word Formation in Generative Grammar*, Linguistic Inquiry Monograph 1, MIT Press, Cambridge, Mass. Assignment of one boundary or the other to a suffix is based on the phonological and orthographic processes (e.g., vowel shift, stress shift, gemination) observed to occur when these suffixes are added to words. For example, all inflectional suffixes are associated with '#'. The boundary distinction is exploited by the spelling-change rules. Information associated with suffixes includes part of speech and basic grammatical features (e.g., number for nouns and tense for verbs), a suffix rating which indicates whether the suffix is inflectional, derivational, or formative in the sense explained earlier.

The information associated with a suffix morpheme includes a part of speech and a suffix rating. The suffix rating is a number that is used to classify a suffix and the word it forms. Suffixes are grouped according to the closeness in meaning before and after the suffix is added. For example, inflectional endings, which simply change grammatical features of the original word, have a rating of 1. Derivational endings, which usually change the part of speech of the original word and generate a word more distant in meaning, have a rating of 2. A derivational ending is one that derives a new word from the original, usually by changing the part of speech. There are two other kinds of endings that are discussed in other sections. These are formative endings, which are given a rating of 16, and REL endings, which are given a rating of 4. Suffix lexicon 18 further differs from stem lexicon 16 in that it contains continuation class vectors.

As mentioned above, all the endings that can follow a stem form are stored together in suffix lexicon 18, and any information about a particular ending is accessed from the last character of that ending Each node within suffix lexicon 18 specifies: the character represented by the node; a continuation class vector, which specifies the continuation classes found below that node; a vector identifying all continuation classes that terminate at that node; an entry for each continuation class that terminates at that node giving the part of speech and a rating for that suffix and continuation class. The information is stored as a tree of sequential bytes with navigations bits for controlling navigation through the tree.

A hash algorithm determines a unique number for each suffix that can be used as an index into an array containing that suffix. The hash algorithm has two parts. The first part of the algorithm classifies the suffix into a particular category by computing an index for the suffix. In essence, the suffix is classified according to its length, its boundary character, and the first character other than the boundary character. Each category is, in turn, associated with a unique constant which is used to determine an index for the suffixes within the category. The second part of the algorithm distinguishes a suffix from the others in its category. A suffix is distinguished by the summation of its characters.

The algorithm is as follows. First, set the initial value of the index to 0 if the boundary character is '#' or to 1 if the boundary character is '+'. Then, multiply the length of suffix minus 2 by 10 and add the result to the index. For example, if the suffix is '+ety', its length is 4 and the result of the multiplication operation is 20 and the index at this point within the algorithm is 21. Finally, another constant is added to the index based upon the first character of the suffix. The constant which is added is determined by the following chart:

| | |
|---|---|
| 'a' | 0 |
| 'e' | 2 |
| 'i' | 4 |
| 's' | 6 |
| other | 8 |

For '+ety', which has 'e' as its first character, the index becomes 23. The algorithm uses this index to look up a constant in the constant array shown in Appendix B.

Each entry in Appendix B is headed by two numbers separated by a colon. The number before the colon identifies the category and the number after the colon is the constant that is added to each suffix that falls within that category. Under each entry is a list of suffixes which fall within the category. In other words, the index that is computed for each of those suffixes according to the above-described first part of the algorithm is the same.

In the second part of the algorithm, the sum of the values in ASCII code (mod a) of each character in the suffix (excluding the boundary characters) is computed. That is, with 'a'=0, 'b'=1, etc., sum the characters of the suffix other than the boundary character. There are two exceptions to this summation: 'p' is not added to avoid a collision of '#ship' with '#some' and 'z' is given the value '29' instead of '25' to avoid a collision of '+ize' with '+ify'. Finally, add the summation of characters just computed to the constant retrieved from the array. This yields the hash result for the suffix.

Continuing with the '+ety' example, the characters 'e', 't' and 'y' have values (mod a) of 4, 19, and 24, respectively. The sum of these values is 47. The constant associated with category 23 is 22. Thus, the resulting has value is 69 (i.e., 49+22).

Each continuation class has a unique number. The continuation class vector contains the numbers of the continuation classes which appear below the current node. That is, it indicates which continuation classes can be found by searching the children of the current node. Thus, when searching for the ending associated with a continuation class, the search algorithm can know which branches in the letter tree to search. Also, when trying to determine what continuation class corresponds to a given suffix, those classes which are not in a vector while traversing the suffix lexicon tree can be eliminated from further consideration. (See Barton Jr., G. Edward, (1985) "The Computational Complexity of Two-Level Morphology," A.I. Memo No. 856, M.I.T. Artificial Intelligence Laboratory, Cambridge, Mass.: 33-35 for more details.)

FIG. 20a illustrates the general structure of the suffix lexicon. The numbers listed in braces { } represent the continuation class vectors which show what classes are found down that branch. The subscripted numbers show what continuation classes end at that point. The continuation classes and their respective numbers for this particular example of a tree are shown in FIG. 20b.

A more complete specification of the suffix lexicon used in the described embodiment is presented in Appendix A3. The information is in the form of a suffix letter tree. The symbols appearing in Appendix A3 have the following interpretations:

Alt = indicates whether there is a sister node in the trie or whether another entry follows the current one at a node;
EOS = stands for end-of-suffix and it indicates whether a suffix ends at that node;
EOB = stands for end-of-branch and it indicates whether the current node has any children;
POS = Part of speech;
DER = Derivational rating;
FORM = Formative rating;
INF = Inflectional rating; and
REL = REL rating.

True and false are represented by 1 and 0, respectively. In addition, numbers, which are shown in hexadecimal notation, are used to identify the continuation classes. A translation of the numbers into corresponding literal symbols identifying the continuation classes is shown in Appendix A4. In the suffix letter tree, when there is an EOS flag, the entire suffix is also printed beside that node. The entire suffix does not actually appear in the suffix lexicon, however.

The interpretation of the information in Appendix A3 will now be described using the first node as an example. The first node represents the '+' boundary character. The state of the flags for this node are: Alt: 1, EOS: 0, EOB: 0. Since the Alt flag is true, the node has a sister node elsewhere in the lexicon. In this case, the sister node represents the other boundary character, namely, '#'. Since both the EOS and EOB flags are false, this node does not represent the end of any suffix or of a branch. The node for '+' also indicates that there are 57 continuation classes which extend from this node and they are identified by the 57 numbers listed for the node. Since no suffixes end at this node, the list of continuation classes which end at this node is empty.

The Morphological Analyzer

When performing generation, morphological analyzer 10 synthesizes words that are lexically related to a given word, adding suffixes, if appropriate, using any restrictions specified with the input regarding suffixes or lexical category to control the size and content of the set of words returned.

The design of these functions is based on a "two-level" model for morphological analysis developed by Kimmo Koskenniemi. (See Kartunnen, L. (1983) "KIMMO: A Two Level Morphological Analyzer") The following is a brief overview of the model.

The two-level model is based on a set of transformational (i.e., spelling) rules. These rules translate the surface string of a word, which is the appearance of the word in text, directly into its lexical string or the underlying morphological structure of the word. This is done character by character based on the context of a character. For example, the following rule, (n . m) <—> P, means that a lexical 'n, becomes a surface 'm' before a surface 'P'. Each such rule is translated into a finite-state transducer, and the set of these rule-automata is then used by both the recognition and generation algorithms.

The transducers operate on lexical/surface pairs of characters, using one as input and the other as output, depending on whether analyzer 10 is performing recognition or generation. In recognition, a transition means that the transducers read a surface character for input and the corresponding lexical character is output; whereas, in generation, the lexical character becomes the input and the surface character is the output. Because this model is two-level (i.e., it translates directly from the surface to the lexical or vice versa), there are no intermediate stages in the process. This allows a transducer to produce the effects of a rule in just a single pass over the input.

Both generation and recognition involve finding a valid correspondence between the input and a representation that can be constructed using lexicon 12 and the above-mentioned rule set. Thus, morphological analyzer 10 cannot generate or recognize new words, i.e., words that are not already in lexicon 12.

Recognition involves the following sub-tasks. Morphological analyzer 10 looks for all the possible stems in an input string. Each stem identifies all suffixes which may be attached to that stem. For each candidate stem, morphological analyzer 10 looks up the possible suffixes. If the input string is successfully parsed, morphological analyzer 10 returns a base history such as was illustrated in FIG. 2 previously.

Thus, for example, the base history of 'successfully' is as follows: (('successfully', adverb, 'successful', adjective, '+ly', 1), ('successful', adjective, 'success', noun, '+ful', 2), ('success', noun, 'success', noun, +0, 0)) where 'success' is the root form of the words 'successful' and 'successfully'.

The root form is generally the same as the stem form found in stem lexicon 16. This is not the case if that stem is not a valid word. For example, in words like 'satisfy' and 'liquefy' where there appears to be a common ending morpheme '+fy', the respective stems are 'satis' and 'lique'. Neither of these stems, however, is a real word. Such a stem is said to be "abstract".

If a stem form is abstract, the root form will consist of either an irregular form that is in a cross-reference field or the abstract stem plus an ending which constitutes the best common morpheme to build from to form the rest of the family of words associated with that stem. 'Satisfy', for example, which has the abstract stem 'satis', is the root for 'satisfied', 'satisfactory', and 'satisfaction'. The suffixes '+ed', '+ion' and '+ory' attach to verbs, and since satisfy, is a verb that cannot be further reduced, among other reasons, it was chosen as the root form.

As noted previously, each record in the base history also includes a suffix rating. Including the suffix rating in the base history aids in the filtering of words returned from the generation function. By including this in the information passed to the generation function, only those words with the suffixes of that rating will be generated. Or, if all the words related to an input word are generated, a user/application can use the rating to filter those words by itself as needed.

In morphological analyzer 10, an internal function of the suffix rating is to denote endings that form words that are "distantly related" to a root word but can be recognized as root forms in and of themselves. The suffixes that form such words are referred to as REL endings. The relationship between the word with the REL suffix to the smaller root form will only be seen when a user/application causes all related forms of a word to be generated. The "distantly related" words will then be included in that generated list. Another internal function of the rating is to identify a formative, i.e., suffix that cannot end a word but must be followed by another.

Parsing an input word consists of matching the letters in the input word against a sequence of letters in lexicon 12 in such a way that the conditions defined by the spelling rules are met. To do this, morphological analyzer 10 takes the following steps. It traverses the lexicon tree, checking all possible interpretations of each character in the input string (i.e., all the lexical characters that could be paired with the surface character) against letters in lexicon 12. For each interpretation, it moves the rule automaton (i.e., the transducers) to a new state and it keeps those interpretations that do not cause the automaton to block. Before the next character, it checks for all possible pairings of a surface null with a lexical character, i.e., it checks for possible elision. Morphological analyzer 10 retains those pairings for which the automaton does not block. If the end of the input string is reached at the same point that the end of a stem or suffix is reached in lexicon 12, and the automaton is in a final state, then the input word has been successfully parsed.

Through generation, morphological analyzer 10 can also provide all the words lexically related to a given word, and its output can be restricted if certain parameters are specified. If the input word is lexically ambiguous, the output can be restricted to just those words derived from one lexical category of the word. The output can also be restricted to words derived by inflection only or by derivation only, to words of a particular lexical category, or to words derived by adding a particular suffix to the input word.

Generation involves the following sub-tasks. Morphological analyzer 10 first does recognition on the input string to find out: how many parses the input string has; its stem or stems; if it already contains suffixes; and if it is a root associated with an abstract stem. Morphological analyzer 10 then identifies the stem which is to be used for synthesis. If the word is associated with an abstract stem, that abstract stem will be used to generate related words. Next, morphological analyzer 10 searches the continuation class tree associated with the stem to determine what suffixes can be added to it. If the output is to be constrained by the lexical category of the input or output (i.e., suffix rating or part of speech), morphological analyzer 10 checks lexicon 12 to see if the constraints are valid with the given stem. If the output is to be constrained by the addition of a specific suffix, morphological analyzer 10 gets all equivalent suffixes (which are defined and described in greater detail later) from a table of equivalent continuation classes and loosens the constraint to include all suffixes equivalent to the one specified. Morphological analyzer 10 returns all surface strings that can be synthesized from the lexical input and that meet any restrictions specified with the call to generation.

Synthesizing a surface string consists of pairing the characters and symbols in the lexical representation with allowed surface characters in such a way that the conditions specified by the spelling rules are met. To do this, the following procedure is used on each parse of the input word. For each character in the string, morphological analyzer 10 determines all possible interpretations of that character, i.e., all the surface characters that could be paired with it. For each interpretation, analyzer 10 moves the automaton to a new state and keeps those interpretations that do not cause the automaton to block. At specific points, analyzer 10 checks for all possible pairings of a lexical null with a surface character, i.e., it checks for possible epenthesis. Analyzer 10 retains those pairings for which the automaton does not block. If there are no more characters in the input string, and if moving the automaton over the end-of-word marker puts it in a final state, then an acceptable word has been synthesized.

The Recognition Algorithm

Before exploring the details of how the recognition and generation functions operate, an overview of the operation of morphological analyzer 10 will be given using recognition as an example. There are two primary tasks involved in the recognition algorithm (i.e., WFSrecognize); they are: manipulating the automaton and traversing the lexicon. At each step, the recognition function moves the automaton and checks the current states. It then moves down the lexicon tree, checking for entries and, in the suffix lexicon, the current continuation classes.

Manipulating the Automaton

The automaton is built for recognition and generation, accepting surface characters and producing underlying ones. The machine moves from one state to another on pairs of surface and lexical characters and the new state reflects the changes in the automaton as a result of accepting a particular pair of characters. As each of the characters of an input word is processed, all the possible lexical interpretations of an input character are checked. The only combinations of surface and lexical characters that can be used are those that are allowed by the automaton. As a result, (e, s) will not be accepted as a valid pair if there is no change from a lexical 's' to a surface 'e' in the automaton.

Also, before each character, a guess is made that a null character (a character deleted on the surface of the word) needs to be inserted corresponding to a lexical character in the output. Note that all possible interpretations of a character or null character are accepted. Checking, as far as the automaton is concerned, means determining that the automaton does not block after an interpretation is accepted. If the automaton does not block, this is a valid configuration of the recognition machine. When the end of an input word is reached, the recognition machine must also be checked to see that it is in a final configuration. A final configuration is one in which the automaton is in a final state, meaning that all the conditions for any spelling changes that occurred have been met and that any spelling changes required by context were made.

Traversing the Lexicon

As mentioned above, there is a stem lexicon 16 and a suffix lexicon 20. Two functions are used to manipulate these lexicons, namely, Lookup_stems and Lookup_suffixes. Lookup_stems searches for each possible stem that occurs in the input word using stem lexicon 16, and Lookup_suffixes tries to identify the suffixes that have been added to a stem using suffix lexicon 20 and the continuation class tree accessed from the end of a stem. Each subroutine is a recursive function that is called on every valid interpretation of a character in the input word. Using these lexical interpretations, the lexicon (either the stem or suffix lexicon) is traversed character by character until either a valid parse is found or failure is returned.

There are only four possible situations which may occur at any point when traversing either lexicon 18 or 20 and each situation is dealt with in a similar manner in both lexicons. One of the main differences between the two lexicons, however, is the existence of continuation classes and continuation class vectors in suffix lexicon 20. These add extra checks when traversing suffix lexicon 20. Therefore, Lookup_suffixes has one more argument than Lookup_stems and that is the list of continuation classes that are being searched out for the current call to Lookup_suffixes. The four possible situations and the corresponding actions will now be described.

In one situation, there are no more characters left in the input word and there is no end to a stem or valid suffix at the current location in the lexicon. This means the current branch of the parse tree is unsuccessful, so failure should be returned. A valid suffix is one that belongs to a class in a continuation class list which is passed to Lookup_suffixes. Even if there are classes at this point in the suffix lexicon, if none match a class in the list, then failure is returned.

In the second situation, there are no more characters in the input word and there is an end to a stem or valid suffix at the current location in the lexicon. At this point, if the automaton is in a final state, then a valid stem or suffix has been found. The information found at this point in the lexicon is returned as a node in the parse tree of the input word.

In the third situation, there are more characters in the input word, but the end of a stem or valid suffix has been found at the current location in the lexicon. At this point, there is a split in the parsing of the input word. If the algorithm is searching for stems, then, to allow for ambiguity and more than one possible stem, the algorithm will go on looking for more stems in the rest of the word and combine the results with the stem found at this point. In the suffix lexicon, any suffixes found must have children in the continuation class tree in order to be considered. Since there are more characters in the input word, they must be used up by children suffixes. Any continuation classes in the list that end here and do not have children are discarded. For any that do have children, Lookup_suffixes is called with the class numbers of the children. If this call succeeds, then this suffix is part of the input word and is combined with the information returned. Also, another call is made to Lookup_suffixes with any continuation classes whose suffixes are only partially completed at this point. Any parse found down this path is combined with the parses for the finished suffixes and returned.

Finally, in the last situation, there are more characters in the input word and there is no end of a stem or valid suffix (but there are still continuation classes that can be found below this point). In either stem lexicon 16 or the suffix lexicon 20, the program simply continues searching with the next character in the input word. Any parses that are found are simply passed back. In suffix lexicon 20, there may be some continuation classes which have no suffixes down the current branch of suffix lexicon 20. These are discarded from the list of classes being searched for.

Special Considerations

Some of the special considerations and issues that are involved in the recognition and generation algorithms will now be discussed. This includes such things as how backtracking is accomplished, how ambiguities are processed, how abstract stems are handled, and other issues. In the following paragraphs and in the pseudocode outlines described later, certain terms appear in angle brackets such as <BAS> or <SUF>. These terms are labels denoting specific fields in the entries of continuation class lexicon 18.

The <SUF> label indicates which derivational suffix ends the form. It must be used for irregular derivational entries but cannot be used for irregular inflections.

WFSrecognize uses recursion, modeling a decision tree in its processing. Each of the characters in the input word that is passed to the function presents a possible decision point. The choices at each character include different interpretations of that character, the guess of a null character being inserted, and the different possible continuation classes for a suffix. At a decision point, each possible choice forms a branch from that point and each branch is explored successively. Those that eventually return information are merged and the results are passed back up the tree. If a branch should fail along the way, that is passed back to be discarded by the next higher level as being an invalid branch. If all the possible branches are invalid, then the decision point fails and failure is returned. This type of processing takes care of both backtracking and the case of multiple interpretations, i.e. ambiguity. Since all branches are explored at any level and those that fail are simply rejected, there is no need to backtrack. Also, all possible interpretations at a given decision point are returned, not simply the best choice. As a result, more than one answer can be returned. For example, the word 'leaves' will be recognized as both the 3rd-person present form of the verb 'leave' and the plural form of the noun 'leaf'.

Irregular words are stored as stems in stem lexicon 16 with cross-references to their base forms found inside the corresponding entries for the irregular stem in continuation class lexicon 18. In continuation class lexicon 18, the base form is placed in a field with a <BAS> label. For example, 'forgive' is stored as the base form, <BAS>, of 'forgave' and 'forgiven'. There can be more than one possible base form and, therefore, more than one <BAS> field. The word 'more' has three <BAS> fields, one for 'much' as an adjective, one for 'much' as an adverb, and one for 'many'. When the recognition algorithm builds the base history of the input word, it uses the <BAS> fields as the bases of an irregular stem and then builds the rest of the base history with the suffixes that were stripped from the irregular word.

When recognizing or generating an irregular form, it is sometimes useful to know the suffix that was "added" to the base to produce the irregular form. For example, if a thesaurus application took the 'ed' suffix from a word such as 'donated' and tried to attach it to 'give' to generate the same tense, rather than receiving an error it should receive the words 'gave' and 'given'. In reverse, if trying to retrieve the suffix of 'gave' in order to place it on another regular verb, it should be able to retrieve the implied 'ed' suffix. In the case of inflectional endings, this implied suffix can be determined from the tense of the irregular form as in the example above: the past tense of a verb is formed by an 'ed' suffix. In the case of derivational suffixes, however, such a mapping from part of speech to suffix is not one to one. There are several suffixes which form nouns from verbs, for example, and it cannot be determined from the part of speech which it was. Therefore, a field with a <SUF> label is used to store the suffix that was "added" to create the irregular form, if such a suffix exists. If there is no such suffix, as in the relationship between 'succeed' and 'success', then the <SUF> field will be empty, and no suffix will be returned.

As mentioned above, there can be more than one <BAS> field associated with a stem form. Also, a stem can be its own base. For example, the word 'lay' can be the past tense form of to 'lie', or a tenseless verb in itself, or a noun. If it is the past tense form, its base is 'lie'. If it is a tenseless verb or a noun, it is its own base. The following is a listing of the base history for the word 'lay', which shows how the different base forms should map to the different parts of speech.

| History 0: | | History 1: |
|---|---|---|
| Record 0: | Record 1: | Record 0: |
| {Word: lie, | {Word: lay, | {Word: lay, |
| POS: v., | POS: v. past, | POS: v., |
| Base: Record 0, | Base: Record 0, | Base: Record 0, |
| Suffix: +0, | Suffix: +ed, | Suffix: +0, |
| Rating: 0} | Rating: 1} | Rating: 0} |
| History 2: | | |
| Record 0: | | |
| {Word: lay, | | |
| POS: n., | | |
| Base: Record 0, | | |
| Suffix: +0, | | |
| Rating: 0}, | | |

When processing such a word that is ambiguous and whose definitions have different bases, it is necessary to know which base goes with which definition. In order to perform the mapping from base to definition (i.e., part of speech or level 1 continuation class), another type of field with a <MAP> label is included within the <BAS> field. The different definitions of a stem are reflected in the top level classes of its continuation class tree. Whenever there is a need to know which base goes with which definition of a stem, for each <BAS> field, there is a set of <MAP) fields containing the top level classes to which their <BAS> field belongs.

The <MAP> field provides a map between a cross-reference and a level-1 node (level-2 node for abstract entries). The value of the <MAP> field is a continuation class to which the cross-reference corresponds. Note that formatives are valid values in the <MAP> field but they occur only for the abstract stem entries (see below). Entries that have more than one level-1 node and at least one cross-reference (i.e., <BAS>, <IRR>, or <REL>) require <MAP> fields.

Sometimes an entry that requires a <MAP> value for some of its level-1 nodes has nodes that are their own bases. For example, in the entry for 'found' three nodes on level-1 (i.e., IPAST, IPPT, and ADJP) require <MAP> to 'find', but one node (i.e., VERB) 'found' is its own base and does not require a <MAP> to 'find'. These nodes are referred to as implicit bases.

There is another kind of stem that requires special consideration. These are the abstract stems discussed earlier. Because abstract stems are not valid words, they cannot appear by themselves in the output of the recognition function but must be replaced either by the contents of <BAS> fields or by a word formed by combining the abstract stem with a root suffix. Level 1 continuation classes are those that contain no suffix, but assign part of speech information to the stem. A special level 1 class is the ABS class which denotes an abstract stem. This class has no suffix and no part of speech information. If there are no <BAS> fields associated with the abstract stem, then the suffix in the first second level class under the ABS class is used to build the root form for all the words based on this abstract stem. Also, the part of speech given by this suffix becomes the part of speech of root form. During processing, the ABS class is filled in with this suffix and part of speech so that they are available when building the base history of any words based on that abstract stem. If there are <BAS> fields associated with the abstract stem, then the ABS class is not changed but continues with no part of speech or suffix. It points to the other suffixes that have been attached. FIGS. 21a–c give examples of the data structures formed for words with abstract stems, namely, 'satisfy', 'satisfaction', and 'revolution'.

For abstract stem entries implicit and explicit bases never co-exist. If there is no <BAS> field, the first node appearing on level-2 by convention is considered to the base (called the implicit base). Abstract entries that have more than one level-2 node and more than one explicit base (i.e., <BAS>) require <MAP> in the cross-references (<BAS>, <IRR>, or <REL>) if cross-references do not relate to all nodes at level-2.

As noted earlier, the gemination mark is stored with the other information associated with a stem form. This is a flag that generally denotes that the last syllable of the stem form is stressed, and that the final consonant might be doubled before certain suffixes, as in the word 'begged'. There are cases, such as in compound words, where the final consonant should be doubled even though that syllable is not stressed. The gemination flag will appear in these cases as well. There are a very few words that meet the conditions for gemination but should no be geminated, as in 'buses'. The gemination flag will be FALSE for these words. If the recognition algorithm finds that the last syllable is stressed, it can proceed as though it has just seen an underlying accent mark with a null character on the surface. The function will move the automaton and the lexicon as though this had taken place and continue with the evaluation. Gemination information has to be inserted before any continuation classes are investigated so that the automaton will take it into account when processing the suffix.

There are two types of ending morphemes that are not handled the same as most suffixes. The first type is the formative ending. It is given a rating of 4, but this rating, and the formative, are never seen by the user application. They are solely for internal purposes. A formative ending is a morpheme that is used as a building block in forming a suffix and does not actually form a new word when added all by itself. For example, 'academically' is a valid word, but 'academical' is not. The 'al' morpheme, although a valid ending in other words, only helps in building the ending 'ally' made up of 'al' and 'ly'. When a formative ending is encountered in the recognition or generation function, it is noted and a base is not generated that ends with that formative ending. If no further endings are given, then that is an invalid parse and failure is returned.

The other type of ending that is handled differently than other suffixes is a suffix with a rating of 3. This rating signifies that when this type of suffix is attached to a word, the resulting word is only "distantly related" to the original form. In such a case, in recognition, the suffix will not be stripped because the resulting word is considered to be a root form in and of itself even though related to the word without the suffix attached. In generation, however, when all the related forms of a stem are desired, these related words will be included with the other words returned.

When stripping a suffix off of one word and adding it to another, another complication arises. Although there is a form of the other word with this suffix, the form of the suffix may be slightly different when used with the new word. For example, some words end in 'tion'; whereas, others end in 'ation' or just 'ion', depending on their structure. The user application of these functions may not know which form of a suffix to use in the different cases. Therefore, when the continuation class of a suffix does not match those belonging to a particular stem, a table is consulted that lists the equivalent suffixes to the one given. The equivalent suffixes are then compared to the continuation class tree to see if there is a valid equivalent for the new word. Appendix C contains a table of suffixes, the continuation classes that they belong to, and the continuation classes that could be substituted for them, i.e., the equivalent classes.

Generally, a continuation class is used to represent a specific suffix. For example, the continuation class ERY refers to the suffix 'ery'. Special subsets of these specific continuation classes have been defined for every major part of speech (like noun or verb) to contain the regular endings of those parts of speech. For example, the continuation class set VREG, the set defined for regular verbs, contains the continuation classes for the present third person ending '#S', the past tense ending '#ed', the past participle ending '#ed', and the progressive ending '#ing'. These sets each have their own symbol that looks just like other continuation classes in the continuation class structure associated with a stem in the lexicon. When processing these symbols in the recognition process, however, they are seen as macro classes and they are replaced with the subtree of classes they actually represent. There are three examples of such macro classes, namely, VREG, NREG, and ADJ-REG.

Some very common abbreviations are cross-referenced to the full forms they are derived from. For example, "Dr., Jan., Mon., Mass., lb., gr." are cross-referenced to "Doctor, January, Monday, Massachusetts, pound, gram" through the use of the <IRR> field. In this case, the <IRR> is not a bi-directional link, because the full forms are not cross-referenced to the abbrviations. The expanded for of the abbreviation is given a REL rating to indicate that the expanded form and the abbreviation are interchangeable.

During the processing of a word, guesses must be made after each character to determine whether or not a null character should be inserted at that point. For example, when generating the word 'begged' from 'beg#ed', an extra 'g' is inserted on the surface which does not appear in the lexical form. This inserted 'g' corresponds to a lexical null character. A guess consists of inserting a null character in the input, pairing it with every possible character it could be interpreted as, and for each such pair, continuing to parse until failure or success is reached. In other words, these null/real character pairs introduce several new branches of the parse tree to be explored for every character in the input word. Exploring all these branches can consume a good deal of time, and most of them are useless.

In recognition, there are 8 lexical characters that can be paired with a surface null and each of these 8 characters must be tried. (See Appendix D for a list of all possible pairings that are permitted.) If one is allowed to be inserted by the rules, then another 8 guesses must be made to see if another one is to be inserted, and so on. In generation, there are 17 pairings of a surface character to a lexical null, and thus, 17 guesses to be made between characters and then another 17 if one succeeds, etc. If no other constraints are put into the system, this sort of guessing can grow exponentially and be very costly to sort out.

There is contextual information, however, not available to the automaton when this processing is going on that can be used by the morphological analyzer to help control this guessing. For instance, a null constraint function can be used to indicate to the morphological analyzer that a lexical boundary symbol paired with a surface null will only occur between morphemes and not between each character and thus it need only try those types of pairs when the end of a stem or suffix is found. Such a null constraint criterion will reduce the number of guesses between characters by two. The different constraints that the null constraint function imposes on the morphological analyzer for null characters are given below.

(1) In between the stem and suffixes: In recognition, this is a very special place where only certain things can happen. This is the only place where a stress mark paired with a surface null will be guessed at because this is the only location where stress matters. After the optional stress mark, three scenarios could take place, namely, a suffix may follow, one character may have been inserted before the suffix (on the surface) or two characters may have been inserted. Thus, each suffix boundary is guessed at followed by an analysis of the rest of the characters in the input string. Then, a lexical null character paired with the next input character is "guessed" and if this is allowed by the rules, each boundary character is again tried followed by the rest of the input string. Finally, a second lexical null is tried and if this is allowed by the automaton, each boundary character is tried a third time followed by the remaining characters in the input string.

(2) In between suffixes: When one suffix has finished and another is about to be started, this is the only other place besides after the stem where a boundary character should be tried. Boundary characters are not "guessed" at any other places.

(3) In between each character: In between each character all interpretations of a null character (except those mentioned in preceding paragraphs (1) and (2) for recognition, the stress mark and the boundary characters) can be "guessed" to be inserted. The number of guesses between each character for recognition is reduced to 5 because of the constraints in (1) and (2). In generation, the special characters of (1) and (2) are already present in the input string and are not guessed at. As a result, the number of guesses for generation is not reduced by (1) and (2). However, another constraint is used for both recognition and generation. By looking at the rules in their entirety, it can be determined before which characters a null character will be allowed. With this information, instead of trying a null character and then trying the next one and then having the automaton block, the next character can be used to determine if a null should be "guessed". The set of characters that allow nulls is different depending on whether recognition or generation is being done. In the described embodiment, there are two functions that are called to quickly check if the next character allows a null to be inserted: rec_nullcheck and gen_nullcheck. The characters that allow this are as follows:

Recognition: t,l,y,a,e,i,o,p
Generation: +, #, 1

The Internal Routines of the Morphological Analyzer

The internal routines which perform the recognition and generation functions of the morphological analyzer will now be described. As noted above, the recognition function is performed by WFSrecognize and the generation function is performed by WFSgenerate. WFSrecognize calls two functions which manipulate the lexicons, namely, Lookup_stems and Lookup_suffixes, to parse the input word and to generate a corresponding parse tree that identifies all of the successful parses of an input word. WFSrecognize then calls two other routines, namely, Make_base_history and Base_hist_loop to produce a base history for the resulting parse tree.

The WFSrecognize Function

WFSrecognize takes the surface form of a word and returns a history identifying the different stems found within that word along with the suffixes required to generate a successful parse of the complete word for each of the stems. Using the surface form of the word passed, WFSrecognize (by calling another function referred to as Lookup_stems) searches for stems within the word by beginning at the first character and moving to the end of the word one character at a time. After the stems are identified, WFSrecognize (by calling another function referred to as Lookup_suffixes identifies all suffixes that are attached to those stems and which result in a successful parse of the word. The recognition process yields a parse tree identifying all of the successful parses of the word. WFSrecognize converts the resulting parse tree into a history which is passed back to the user or the application which called WFSrecognize.

Two parameters must be passed to WFSrecognize when it is called, namely input_word and WFS_info. Input_word is a text string for which a parse tree history is desired. Since WFSrecognize only operates on a single word at a time, input_word must have no spaces within it. WFS_info is a parameter containing pointers to a number of data structures, including a pointer to the automaton, a pointer to the stem lexicon (stem_lexicon), a pointer to the suffix lexicon (suf_lexicon) and a pointer to the continuation class lexicon (cc_lexicon).

Referring to FIGS. 22a-b, when first called, WFSrecognize determines whether input_word satisfies this single word requirement by searching for spaces within input_word (step 500). If a space is found, WFSrecognize returns an error to the user indicating that it has received a phrase (step 502). If there are no spaces found within input_word, WFSrecognize scans it for illegal characters (step 504). If any are found, it notifies the user that input_word is an illegal word and then terminates further processing of that word (step 506). Once it is determined that input_word is a valid word, WFSrecognize checks whether it is an abbreviation (step 508). To do this, WFSrecognize checks the word form for the presence of capitalization at the beginning and/or a period at the end of the word. If these indicators of an abbreviated word are found, WFSrecognize looks input_word up in the stem lexicon to find its entry point in the continuation class lexicon. The entry point identifies a data structure within the continuation class lexicon which contains a flag indicating whether the word is an abbreviation. If input_word is an abbreviation, the words for which it is an abbreviation are also identified through a cross reference. For each of the cross references identified for the abbreviation, WFSrecognize generates a corresponding base record and returns control to the program which called it (step 510).

If input_word is not an abbreviation, WFSrecognize initializes the stem lexicon in preparation for a search for the stems of input_word (512). Since the entire stem lexicon is too large to have the entire contents of the file in memory at the same time, only one block of the file is kept in memory at any one time. This is the block for the word most recently accessed.

A table is kept in-memory that gives the first four characters of the first word of each block. The first four characters of an input word are compared with the table to determine which block needs to be brought in from the file which may be stored on disk. The morphological analyzer, however, does its analysis on a character by character basis in order to find stems and perform any spelling changes that might occur before or during a the processing of a character. A spelling change or end-of-stem could occur anywhere after the first character of the input word. If it does occur before the fourth character, it may turn out that the word is not in the block that was retrieved and it will be necessary to retrieve a different block.

After initialization, WFSrecognize takes up to three characters of input_word and calls a function referred to as move_interp to obtain the state resulting from applying those characters to the automaton (step 514). At this stage, each of the characters selected from input_word is interpreted as itself and no spelling changes are allowed. If the automaton blocks on the first set of characters passed to it, WFSrecognize notifies the user that the word was not found (step 516).

Selecting up to three characters of input_word is done to optimize the look up of stems in the stem lexicon and to reduce the number of disk accesses. Typically, the first few characters of any word will not experience any spelling change during the recognition process. Thus, it is unnecessary to try all possible interpretations for each of those characters. The number of characters for which this rule applies generally depends upon the size of input_word and the particular language. Analysis was performed to see how many characters could be moved over at the beginning of a word based on its length and still avoid missing a stem or a possible spelling change. The analysis resulted in the following formula.

If the word only has one character—skip the one character

If the word has two to six characters—skip two characters

If the word has seven or more characters—skip three characters

Although there are a few exceptions (i.e., spelling changes occur within the skipped characters for a few words), these are handled by cross-references.

If the automaton does not block upon receiving the first set of characters from the input_word, WFSrecognize calls another function, referred to as Lookup_stems, to find all of the stems for the word within the stem lexicon (step 518). WFSrecognize passes the following categories of arguments to Lookup_stem: input_string; current_interp; current_stem; automation state; and a group of stem_lexicon_variables. In this case, input_string is the remainder of the word or string of characters which is being analyzed, omitting the characters for which interpretations have been chosen. Current_interp is the lexical interpretation of the first character of input_string, and, in this case, is simply the surface character interpreted as itself. Current_stem is a string identifying the lexical stem that has been processed thus far. Automation_state is the current state of the recognition automaton based upon the surface characters accepted so far. And stem_lexicon_variables is a set of variables passed to and updated by the functions which handle the stem lexicon. Lookup_stem is a recursive function, the details of which will be presented below.

At this time, suffice it to say that for each stem found, Lookup_stem returns a stem_record such as is shown in FIG. 23. The stem_record includes a pointer into the input_word to mark the last character processed; the lexical form of the stem; a pointer to the continuation class information associated with the last character of that stem; and the state of the automaton at that point.

If no stems are found, Lookup_stem notifies the calling function that no stems exist for that interpretation of the input character and returns control to the calling function (step 520).

If stems are found, WFSrecognize loops through each stem_record returned (step 521). For the current stem_record, WFSrecognize determines whether there are any characters after the stem (step 522). If there are no characters after the stem, WFSrecognize checks the continuation class data structure to identify the top level classes which belong to the stem. If the top level class is ABS (i.e., abstract), indicating that the current stem does not form a valid base word and that it requires a suffix, WFSrecognize returns a not found indication for that stem_record and moves on to the next stem_record (step 524). For example, if the input_word was "satis", WFSrecognize would discover that it is listed in the stem lexicon and that its continuation class identifies it as an abstract stem. In order to be a legitimate word, however, it must have a suffix (e.g. "fy"). Since there are no characters after the string, it cannot be a valid stem for the input_word.

If the stem is not abstract, WFSrecognize loops through each top level class in the continuation class tree (step 525) and for each top level class found, WFSrecognize constructs a continuation class node data structure (referred to as a CC_node) such as is shown in FIG. 24 (step 526). Each CC_node contains the symbol identifying its corresponding level one class; the part of speech (POS) for that level one class as identified in the continuation class tree for that stem; a suffix for this node; a suffix rating; and a set of pointers identifying all children of this CC_node.

For a top level class, there is no suffix so the entry in that field is null and the rating is set to zero. In addition, since there are no more characters in the string, there are no children of this node so the children field contains a null pointer.

After WFSrecognize constructs all of the CC_nodes for the current stem, it checks whether the stem has more than one top level class and if the stem has associated <BAS> fields (step 528). Such a situation creates potential ambiguity among the base forms. For example, when a <BAS> field is the proper base form for only a subset of the possible meanings of the stem as represented by the different level 1 continuation classes, the correct base form must be mapped to the proper top level classes. If such potential for ambiguity exists, WFSrecognize loops through the top level classes. For each top level class (i.e., for each CC_node created in step 526), WFSrecognize looks up each <BAS> field associated with the current stem (step 529A). For each <BAS> field which either has no <MAP> fields (and thus is a base form for all of the top level classes) or has a <MAP> field that matches the current top level class, WFSrecognize saves this information for the next step.

During the next step, WFSrecognize creates a stem_node for the current stem, for the current CC_node, and for any <BAS> fields that map to this level 1 class (step 530). The stem_node is a data structure containing the information shown in FIG. 25. A stem_node contains a stem field for the stem form as identified in the relevant stem_record; a base info field for identifying any <BAS> fields, their parts of speech and their associated <SUF> fields; and a top CC_nodes field for a pointer to the level one CC_nodes that start the parse tree for this stem. A separate stem_node is created for each of the CC_nodes generated in step 525 and the current stem.

After this sequence of steps is performed for each level 1 continuation class, all of the stem_nodes that are created during this phase of operation are added to the list of stem_nodes being formed in step 521 above.

If there is only one level 1 continuation class or if there are no <BAS> fields, WFSrecognize simply builds a stem_node for the current stem with pointers to each of the CC_nodes created in step 525 (step 532). In the event that there is only one level 1 continuation class which has <BAS> fields, the <BAS> fields are stored in base info field of the stem_node. Then, this stem_node is added to the list of stem_nodes being formed in step 521, after which WFSrecognize moves onto the next stem_record (steps 534 and 536).

If there are more characters in input_word after the current stem, wFSrecognize conducts a search for all suffixes that are attached to the current stem (step 538). First, WFSrecognize checks the stem_lexicon for a gemination mark associated with the current stem (step 540). As noted earlier, the data structure associated with each valid stem in the stem_lexicon contains a gemination flag announcing the presence or absence of a gemination mark. If a gemination mark is present, WFSrecognize moves the automaton from the state associated with the current stem to a new state by accepting the gemination mark (step 542). If the automaton blocks, WFSrecognize rejects that stem and goes onto the next stem_record (step 544). If the automaton does not block, WFSrecognize adds a stress mark to the end of the current stem (step 546).

After accepting the stress mark, WFSrecognize identifies each level 1 continuation class having children (step 548). Note that since there are more characters after the stem, there must be a suffix. Level 1 continuation classes, by definition have no characters in them, so only those which have children in the continuation class tree can be considered. For each class having children, WFSrecognize first checks whether it is the ABS class (step 550). If it is and there are no <BAS> fields, WFSrecognize saves the symbol of its first child class as the root suffix symbol to be used later (552). This symbol represents the suffix that creates the root form for all of the words based on this abstract stem and is stored in the suffix field of the top level CC_node if the subsequent analysis results in a valid parse for this stem.

Then, WFSrecognize tries each interpretation of a surface null character as a boundary symbol (i.e., + and #) by moving the automaton with that interpretation (step 554). For each interpretation that does not block, WFSrecognize calls a Lookup_suffixes function to identify all suffixes which result in valid parses of the input_word for the current stem. WFSrecognize passes the following arguments to Lookup_suffixes: a pointer into the cc_lexicon where the children of the current level 1 class are located (i.e., identifying a list of continuation class numbers for that level); a pointer to the next character in input_word after the current stem; a pointer to the suf_lexicon; the state of the automaton resulting from moving over the current interpretation; the current interpretation of the character before the first character in the input_string; and a string containing the current interpretation (i.e., the lexical suffix processed thus far). For each continuation class in the continuation class list provided to Lookup_suffix that results in a successful parse, Lookup_suffixes returns a CC_node containing the part of speech associated with the continuation class, the suffix that was added, the rating of the suffix, and pointers to the rest of the CC_nodes, if any, that completed the successful parse of the input_string. If no continuation results in a successful parse, then an empty list, which means failure, is returned. Lookup_suffixes is a recursive function, the details of which are presented later.

After trying each of the boundary characters, WFSrecognize moves the automaton to accept the next character after the stem paired with a lexical null interpretation (step 558). If the automaton does not block but yields a valid state, WFSrecognize returns to step 554 and tries a surface null paired with each of the boundary characters again using the ne state returned by the automaton (step 560). Among other things, this phase of the processing takes into account gemination occurring after the stem.

Notice that at this point in the processing, in between the stem and the suffixes, constraints have been introduced to limit the amount of "guessing" about what comes next. Essentially, there are only two types of guesses that are possible at this point. Either a boundary character occurs followed by the beginning of a suffix or up to two characters are inserted before the boundary character followed by the suffix. In the latter case, lexical null interpretations must first be tried before inserting the boundary character. Steps 554 and 558 represent these two types of guesses. An example of a word which requires two lexical nulls paired with a surface character before the boundary character is 'gasses'. The stem is 'gas' followed by an 's' paired with a lexical null, an 'e' paired with a lexical null and then a boundary character.

For any of the child classes of the current level that resulted in a valid parse of the input_word, WFSrecognize generates the appropriate CC_nodes in the next phase of processing beginning at step 562. First, WFSrecognize checks whether the current level 1 class is abstract (step 564). If it is not, WFSrecognize creates a CC_node for that class (step 568). Within the newly created CC_node, it stores the appropriate class symbol identifying the current level 1 continuation class; the part of speech as determined by looking up the class in suflexicon; a null suffix; a suffix rating of zero and pointers to the CC_nodes returned earlier for the substring after the stem.

On the other hand, if the current level 1 class is abstract and there are no <BAS> fields associated with it, WFSrecognize obtains the root suffix symbol previously stored in step 554 and generates a CC_node for the level 1 ABS continuation class (step 572). First, WFSrecognize checks the CC_nodes that were returned as the children of the current class. If one of the child CC-nodes contains the root suffix symbol, WFSrecognize creates a CC_node and stores within it the ABS class symbol, the part of speech obtained from the root suffix CC_node, the root suffix, a suffix rating of zero and pointers to the CC_nodes returned from steps 554 and 558. In this case, WFSrecognize replaces the suffix and the part of speech in the root suffix CC_node with blanks and leaves that CC_node as a place holder which serves to link the level 1 ABS CC_node to any other CC-nodes which might exist further down that branch of the parse tree (step 574).

If the WFSrecognize can find no CC_nodes that contain the root suffix symbol, it locates the root suffix symbol in the suffix lexicon (step 578). Then, it creates a level 1 CC_node and stores within it the ABS symbol, the part of speech and the suffix found in the suffix lexicon, a rating of zero and a pointer to each CC_node returned from steps 554 and 558 for the current continuation class (step 580).

If the current level 1 continuation class is the ABS class and there are <BAS> fields (step 582), WFSrecognize creates a CC_node containing the ABS symbol, no part of speech, a null suffix, a suffix rating of zero and a pointer to each CC_node returned from steps 554 and 558 (step 583).

After the above sequence of steps is completed (i.e., commencing with step 548) for each level 1 continuation class having children and for each child of a level 1 continuation class resulting in a valid parse of the input_word, WFSrecognize identifies the resulting level 1 CC_nodes in preparation for constructing the appropriate stem_nodes for the collection of CC-nodes that have been constructed (step 584).

In the event that no level 1 continuation class had any children or that no child of a level 1 continuation class succeeded (step 586), WFSrecognize moves on to the next stem_record and repeats the above-described steps to generate a parse tree for the next stem (step 588).

If the current stem has more than one level 1 continuation class and has <BAS> fields (step 590), WFSrecognize creates a stem_node for each successful level 1 continuation class. It does this by first looking up each <BAS> field associated with the current stem (step 594). For each base that has no <MAP> fields or that has a <MAP> field that matches the current top level class, WFSrecognize saves this information for use in the next step. Then, WFSrecognize constructs a stem_node for the current stem with one top level CC_node for the level 1 continuation class and uses the <BAS> information saved in the previous step (step 596). That is, it stores any <BAS> fields that map to that level 1 class in the base info field of this new stem_node. After WFSrecognize has created all the required stem_nodes for these top level classes, it adds these stem_nodes to the other stem_nodes previously generated for the other stem_records and then moves onto the next stem_record (steps 598 and 560).

In the case when the current stem has only one level 1 class or it has no <BAS> fields (step 502), WFSrecognize constructs a stem_node for the current stem that contains any <BAS> and <SUF> fields associated with the stem and a pointer to each level 1 CC-node previously constructed for the continuation classes (step 604). This stem_node is then combined with any others previously constructed for the stem_records (stem 606).

The above sequence of steps commencing with step 522 is repeated for each stem_record until complete (step 605). After the last stem_record is processed, WFSrecognize calls a make_base_history function which generates a base history from the parse tree that was created for the input_word (step 612). The details of the make_base_history function are described later. Before terminating, WFSrecognize returns the history created (step 614).

FIGS. 21a-c are examples of parse trees that are constructed during the recognition process for 'satisfy', 'satisfaction', and 'revolution'. Each of these examples involves an abstract stem and the last two examples involve formative endings, namely, '+fac', '+t' and '+ut'. Note that the stem of 'satisfy' is the abstract stem 'satis'. A valid root is formed for this word by adding 'fy' to the abstract stem. In contrast, 'revolution' has an abstract stem 'revol' which does not have a root suffix. Instead, a valid stem is formed by replacing 'revol' with either of the <BAS> forms that are identified.

The Lookup_stems Function

Referring to FIGS. 26a-d, Lookup_stems, which is initially called by WFSrecognize, is a recursive function which analyzes a character string for all stems that it contains. It conducts a search for stems beginning at a location in the stem_lexicon that is identified by the calling program and it returns a list of all of the stem forms found for the character string from that location. Each stem form is returned to the calling program as a stem_record such as is illustrated in FIG. 23, described earlier. The parameters which must be passed to Lookup_stem when it is called include input_string, current_interp, current_stem, automaton_state and stem_lexicon variables. Input_string is the substring of the input word that Lookup_stems is being called upon to analyze. Current_interp is the lexical interpretation of the first character in input_string, i.e., the next character in the word after the characters which have been processed thus far. Current_stem is a string showing the lexical stem that has been processed thus far. Automaton_state is the current state of the automaton, i.e., the state of the recognition automaton after having accepted all characters of the word before the input_string. Stem_lexicon_variables are variables that are passed to and updated by the word recognition functions, including a stem_lexicon_location variable that identifies the current location within the stem_lexicon after having processed the word characters preceding input_string.

When Lookup_stems is called, it determines its current location in the stem_lexicon as identified by stem_lexicon_location. Then, it attempts to move to a next point in the stem_lexicon identified by current_interp, if current_interp is not a lexical null character (step 620). If there is no such location within the stem_lexicon, Lookup_stems returns to the calling program without making any stem_records, thereby indicating failure for the proposed lexical interpretation of the surface character (step 622). If the new location exists, stem_lexicon_location is updated to become the new location (step 624).

If the move occurs without failures, Lookup_stems determines whether there are any remaining characters in input_string after the first character and if there is an end_of_stem flag at the stem_lexicon_location (step 626). If there are no more characters and there is no end_of_stem flag, Lookup_stems returns without making any stem_records (step 628).

If there are no more characters but there is an end_of_stem flag, Lookup_stems determines whether it is permissible to insert a surface null at the end of the word (step 652). In the case of English, surface nulls may not be inserted at the end of a word, so Lookup_stems moves directly to step 638 in which it moves the automaton to accept the end-of-word character ($). However, in the case of other languages which permit a surface null at this location, and for each interpretation of a surface null, Lookup_stems calls itself to continue the search for valid stems (steps 634 and 636). In this call the input_string is empty, current_interp is the current lexical interpretation of the surface null, current_stem is the current_stem from before plus the current interpretation, and automaton_state is the state resulting from accepting the current interpretation.

After checking each interpretation of the surface null and generating any stem_records where appropriate, Lookup_stems goes to step 638 and moves the automaton to accept the end-of-word character. If the automaton is not in a final state or if current_interp is a lexical null character, Lookup_stems returns with only those stem_records, if any, for a null inserted at the end of the word (steps 640 and 642).

On the other hand, if the automaton is in a final state, Lookup_stems creates a new stem_record for current_stem (step 644). The new stem record contains the last character of the input word (which, in this case, will be the first character in input_string); the identity of the stem (which will be current_stem); a pointer to the continuation class identified in the stem_lexicon at stem_lexicon_location; and the automaton state.

At the end of this section of code, Lookup_stems returns the stem_record as an output parameter and ends (step 646).

In the case where there is an end_of_stem flag and there are more characters, Lookup_stems identifies each possible interpretation of the next character (i.e., the second character in input_string) which does not cause the automaton to block (steps 648 and 650). For each interpretation of the next character, it calls itself to identify the rest of the stems that may be formed with the remaining characters (step 654). During this call to itself, it uses the new state generated by accepting the interpretation. Note that Lookup_stems may repeatedly call itself as it moves down the string of characters until it reaches the end. These repeated calls will generate additional stem_records when they yield valid stems from the added characters. After obtaining the stem records for the rest of the characters, Lookup_stems tries each possible interpretation of a surface null character inserted after the current_stem, if permitted by the language (step 656). It then calls Lookup_stems using each possible interpretation (step 660). Note that during this phase of operation, inserting a surface null does not use up a surface character so that input_string remains the same throughout this phase. Finally, Lookup_stems also generates a stem_record for the current_stem, if appropriate (i.e., where the current_interp is not null) (steps 662 and 664).

After Lookup_stems has generated all stem_records for the case in which there is an end_of_stem flag and additional characters, it appends the stem_records to any stem_records generated earlier and returns the combined list to the calling program (steps 666 and 668).

For the remaining possibility in which there is no end_of_stem flag at stem_lexicon_location and there are more characters, Lookup_stems follows a similar procedure to that which was followed for the case in which an end_of_stem flag was present (steps 670-684). That is, for each interpretation of the next character (i.e., the second character in the input_string) that does not block the automaton, Lookup_stems calls itself for each interpretation to identify the rest of the stems that may be formed with the remaining characters (steps 672 and 676). As before, Lookup_stems calls itself using a new state generated by accepting the interpretation. After obtaining the stem_records for the rest of the characters, Lookup_stems tries each possible interpretation of a surface null character inserted after the current_stem, if permitted by the language (steps 678-682). Finally, Lookup_stems appends the lists of all stem_records returned from this phase of operation and returns the combined list to the calling program (steps 684-686).

The Lookup_suffixes Function

Referring to FIGS. 27a-e, Lookup_suffixes, which is also initially called by WFSrecognize, is a recursive function which searches for and identifies all of the successful parses of a substring of characters supplied to it and based upon a list of continuation classes which is also supplied to it. For each continuation class that results in a successful parse, Lookup_suffixes returns a CC_node (see FIG. 24) that contains the part of speech associated with the continuation class, the suffix that was added, the rating of that suffix, and pointers to the rest of the nodes, if any, that completed the successful parse of input string. If no continuation class results in a successful parse, then an empty list, which means failure, is returned.

In the call to Lookup_suffixes, the following set of parameters must be passed to it: cont_class_list; input_string; suf_lexicon_location; automaton_state; current_interp; and current_suffix. Cont_class_list is a list of continuation class numbers identified by a pointer into appropriate location in the cc_lexicon. It identifies all of the valid continuation classes for the stem down a particular branch and at a given level within the continuation class tree for the stem being analyzed. Input_string is a substring of the word which was input to WFSrecognize. More specifically, it generally contains the characters at the end of the string for which no interpretations have yet been assigned. Suf_lexicon_location identifies a location within the suffix lexicon. Automaton_state is the state of the automaton after accepting current_interp, which is a possible interpretation of the character before the current first character in input_string. And current_suffix is the lexical suffix processed so far.

After being called, Lookup_suffixes checks whether the lexical character of current_interp is null (step 700). If current_interp is not null, Lookup_suffixes moves to current_interp in the suffix lexicon and sets suf_lexicon_location equal to that new location (step 702). However, if there is no branch within the suffix lexicon corresponding to current_interp, a failure is returned (i.e., an empty list is returned) (step 704).

After checking whether current_interp is a lexical null, Lookup_suffixes checks whether there are more characters left in input_string (step 708). If input_string is empty and if current_interp is a lexical null, then Lookup_suffixes again returns a failure (steps 710-712). This step 712, however, is an English specific feature and may not be true for other languages. Thus, its appropriateness should be reexamined for languages other than English.

Next, Lookup_suffixes determines whether a surface null can be inserted at the end of the word (note that this is not permitted for English) (step 714). If inserting a surface null is permitted, then for each interpretation of the surface null, Lookup_suffixes calls itself to identify the valid parses which result from inserting the surface null (steps 716-718).

After trying surface nulls where permitted or if surface nulls are not permitted, Lookup_suffixes moves the automaton to accept the end-of-word (EOW) character (step 720). If the automaton is not in a final state after accepting the EOW character, Lookup_suffixes returns with whatever CC_nodes, if any, might have been generated in steps 714-718.

However, if the automaton is in a final state after accepting the EOW character, then Lookup_suffixes compares the cont_class_list with the classes that end at suf_lexicon_location in the suffix lexicon. Recall that each node of the suffix lexicon contains a vector identifying all of the continuation classes that end at that location and a vector of all_continuation classes that can be found along branches extending from that location in the suffix lexicon. For each class that ends at that location and is not a formative ending (and thus represents a valid parse), Lookup_suffixes creates a corresponding CC_node containing the continuation class symbol for the class, the part of speech for the class, the current_suffix, the rating for the suffix and an empty set of children pointers (steps 726-728). After constructing the appropriate CC-nodes, Lookup_suffixes then returns the list of CC_nodes to the program which called it.

In the event that there are more characters in input_string and the input character (i.e., current_interp) is either a boundary character or a lexical null, Lookup_suffixes determines the possible interpretations of the next character in input_string (step 734). Since the word cannot end with a boundary character, rather than checking the continuation classes here, as is done later, Lookup_suffixes "skips" over the boundary character to the next one. The classes at the next character are fewer and more discriminatory. Because no move in the suffix lexicon is made if the current interpretation is a lexical null character, the continuation classes are not checked here either but only after a real move is made.

For each interpretation of the next character in the input word, Lookup_suffixes calls itself to analyze the rest of the characters in the input word (steps 734-736). For this call, it passes the current list of continuation classes, the rest of the input_string after the first character, the suf_lexicon_location, the new automaton state resulting from accepting the current interpretation (i.e., the interpretation of the next character of the input word), and the current_suffix plus the current interpretation. If this call of Lookup_suffixes results in any successful parses, the corresponding CC_nodes are returned with any formed in the succeeding calls before it.

After exploring each interpretation of the next character in the input word, Lookup_suffixes determines whether a surface null can be inserted at this time (step 738). This determination is made by referencing a table containing the null constraint information which was previously described. If guessing a surface null is appropriate at this point, Lookup_suffixes inserts the null in the surface string and then examines all of the possible lexical interpretations (except special symbols) of the surface null by calling Lookup_suffixes for each interpretation (steps 738-740). Each interpretation of the surface null becomes the current interpretation that is passed to Lookup_suffixes during these function calls. Similarly, the remainder of the parameters passed to Lookup_suffixes take into account the guess of a surface null and the particular interpretation given to it. If any of these calls to Lookup_suffixes is successful, the corresponding CC_nodes are returned with any formed above.

After trying all interpretations of the inserted surface null or, if a surface null is not appropriate at this point in the input word, Lookup_suffixes combines the two lists of CC_nodes that are returned in steps 734 and 738. This combined list is returned to the program which originally called Lookup_suffixes (step 742).

If the input character is neither a boundary character nor a lexical null and if the input string is not empty, Lookup_suffixes identifies each of the classes in the continuation class list which extends into the suffix tree beyond the current suf_lexicon_location (steps 748-758). To make this determination, Lookup_suffixes first identifies any class among the current set of classes that represents a set of classes. If any such class exists, it is replaced by the members of the set and Lookup_suffixes then goes through each member of the set (step 750). For each member of the current continuation class list, Lookup_suffixes looks for that continuation class in the continuation class vector found at suf_lexicon_location in the suffix lexicon (step 752). If the current continuation class is neither among those which end at this location or those which continue from there, Lookup_suffixes skips to the next class in the continuation class list (step 756). A continuation class which neither ends at suf_lexicon_location nor continues from there can no longer be considered because it cannot be found in the current branch of the lexicon. Continuing with the next class avoids any further investigation of the current class.

In the case when the current continuation class of step 748 ends at suf_lexicon_location and it has children classes, as evidenced by the continuation class tree previously identified for the stem, Lookup_suffixes prepares to identify additional suffixes by first examining each boundary symbol interpreted as a surface null character at this point. It does this by calling itself with the following values for its required variables: (1) a list of the children of the current class, (2) input_string the same as in step 746, (3) a pointer to the top of the suffix lexicon, (4) a new automaton state resulting from accepting the surface null paired with the boundary symbol, (5) a current_interp set equal to the boundary symbol, and (6) a current_suffix containing the boundary symbol (steps 760-762).

After trying the boundary symbols at this point, Lookup_suffixes moves the automaton to accept the next character in input_string paired with a lexical null interpretation (step 764). Then, Lookup_suffixes repeats step 760 above in which it successively inserts each boundary symbol paired with a surface null, but using this time the state resulting from accepting the next character in the input string paired with a lexical null.

If either step 760 or step 764 results in a successful parse, Lookup_suffixes creates a CC_node for the current class of step 758 and the suffix that ends here with pointers to children nodes returned by calls to Lookup_suffixes and appends it to the list of CC_nodes created in step 748 (steps 770-772).

If the current continuation class of step 748 does not end at suf_lexicon_location but continues on from there, Lookup_suffixes collects this class into a list of classes that continue from suf_lexicon_location (steps 774-776). In this way, it keeps track of continuation classes for parsing the rest of input_string.

After looping through the continuation class list of step 748, if no CC_nodes were created and no classes continue from suf_lexicon_location, Lookup_suffixes returns a failure (step 780).

In the event that any classes do continue on from there, Lookup_suffixes processes each interpretation of the next character in the input word by calling itself for that interpretation (steps 782-784). In the function call to itself, Lookup_suffixes passes the required parameter values, including the list of continuation classes that was collected in step 776; the rest of input_string after the first character as the new input_string; the current interpretation; and the current_suffix, which is the lexical suffix processed so far.

After trying all interpretations of the next character, Lookup_suffixes tries each lexical character (except boundary symbols) that can surface as a null character if characters can be inserted here (step 788). Lookup_suffixes uses the previously mentioned null constraints to determine whether the insertion of a surface null at this point is appropriate. For each lexical character that can surface as a null, Lookup_suffixes calls itself (step 790).

At the conclusion of the preceding step, Lookup_suffixes merges the lists of CC_nodes that were returned in steps 784 and 788 (step 792). Then, it appends this merged list with the list of CC_nodes created in step 748 (step 794). Finally, it returns the complete list to the calling program and terminates at this point (step 796).

The Make_base_history Function

Make_base_history is a subroutine used by WFSrecognize to build a base history recursively from a parse tree. A base history consists of a list of arrays called histories, each of which contains the records of a corresponding path in the continuation class tree. Referring to FIG. 28, each record in a base history shows the base forms of the word with successive suffixes stripped off of the word. A record contains a word, a part of speech, an index referring to the record in the current history that contains the base of this word, the suffix which was added to the base to make the word, and the rating of the suffix added. Recall that an example of a base history for "fishes" is shown in FIG. 2.

At the top level of the parse tree, Make_base_history creates the first base_records and then calls a recursive function Base_hist_loop for the rest of the nodes in the parse tree. For each node in the parse tree, a base_record is created and Base_hist_loop is called for each child of that node. If the base index field of a record refers to itself, that signifies that the record is the top of the tree for the current word; it cannot be reduced further.

A base index can also have a value of −1. WFSrecognize does not use this value. However, in generation, it is possible to filter the output by part of speech. In that case, the base of a word may be omitted in the base history because it does not have the proper part of speech. This will create "holes" in the list of records containing the successive suffixes attached to a word. FIG. 29 illustrates a history of nouns taken from a base history of "fish". Because the base "fishy" of "fishiness" is an adjective, it is not present in the history and a base index of −1 is placed in the base field of the record for "fishiness" to indicate that its base record is missing.

Referring to FIGS. 30a-c, the call to Make_base_history includes a stem_node_list, which is a list of the stem nodes that were formed during the recognition process. When Make_base_history is called, it loops through all of the stem nodes in stem_node_list, one at a time, setting a current_node variable equal to the stem node being processed during that loop (step 800). For the current_node, the function then loops through the top level classes identified in the top CC_node field of the stem_node (step 802). If there are <BAS> fields in the current_node, the function loops though those <BAS> fields (step 804). For each <BAS> field, the function allocates memory for a history and then generates a record for that base (steps 806-808). In the record that is generated, the word field contains the current base (i.e., the contents of the current <BAS> field); the POS field contains the part of speech of the base field as found in the stem_node; the base index equals zero; the suffix field contains a null suffix; and the rating equals zero.

For the current base, the function also checks whether current_node is identified as an abstract node (step 810). If it is an abstract node, a separate record is not created for it. On the other hand, if it is not an abstract node, the function generates the next record for the current top level CC_node of step 802, using the part of speech associated with the current CC_node, a base index of zero, and a suffix taken in the current <BAS> field (step 812). The suffix is determined as follows. If there is no suffix field, the relationship from <BAS> to stem is determined to be inflectional and the inflectional suffix is determined by the part of speech of the current CC_node. Otherwise, the number found in the suffix field is translated into an actual suffix string. The function establishes the rating stored in this record by comparing the parts of speech of the current <BAS> field and current_node to determine whether the relationship is inflectional (rating of 1) or derivational (rating of 2).

While still on the current base, Make_base_history then moves on to the second level child nodes for the current top level class and it loops through the child nodes at that level (step 814). For the each second level child node, Make_base_history checks whether the child is the first second level child (step 816). If it is not the first second level child, the function constructs a new history from the records formed thus far. In other words, a separate history is generated for each path through the tree. However, since each of the histories generated for the second level children share a path to the top of the parse tree, the records before the second level are the same.

Make_base_history than calls another function, namely, Base_hist_loop, to complete the base history for the nodes below the second level of the parse tree (step 818). In the call to Base_hist_loop, the function passes the following parameters: the current stem; the current child node; a base index of 0, if the stem is abstract, or 1 otherwise; the identity of the history of records being formed; and the output structure in which the results are to be returned. The operation of Base_hist_loop is described later.

After Base_hist_loop returns its results, Make_base_history updates an output base history data structure to identify its current position within the base history structure being generated. The output base history data structure identifies the current record, the number of histories (also known as paths) within the base history being constructed, and the current history being worked on.

After completing the loop for all of the second level children, Make_base_history checks the results returned by Base_hist_loop to determine whether all results indicated that a REL ending was found (step 822). Recall that REL endings form their own roots so the current base fields are not needed for the histories formed in the call to Base_hist_loop. For example, the parse tree for "kingdoms" and the resulting base history that is returned appears as follows.

Below is given the parse tree of the word 'kingdoms' and then the resulting base history that is returned to the user/application:

| The parse tree: | | The base history: | |
| --- | --- | --- | --- |
| Stem_node: | | History 0: | |
| {Stem: | king, | Record 0: | |
| Base Info: | None, | {Word: | kingdom, |
| Top CC_nodes: | CC_node 1} | POS: | n., |
| CC_node 1: | | Base: | Record 0, |
| {CC_symbol: | NOUN, | Suffix: | +0, |
| POS: | n., | Rating: | 0} |
| Suffix: | +0, | Record 1: | |
| Suffix Rating: | 0, | {Word: | kingdoms, |
| Children: | CC_node 2} | POS: | n. pl., |
| CC_node 2: | | Base: | Record 0, |
| {CC symbol: | DOM, | Suffix: | +s, |
| POS: | n., | Rating: | 1}, |
| Suffix: | +dom, | | |
| Suffix Rating: | 3, | | |
| Children: | CC_node 3} | | |
| CC_node 3: | | | |
| {CC_symbol: | NPLUR, | | |
| POS: | n. pl., | | |
| Suffix: | +s, | | |
| Suffix Rating: | 1, | | |
| Children: | None} | | |

If a REL ending was found for all second level children, Make_base_history breaks the loop for the base fields since they are not needed for the REL forms found (step 824). Base_hist_loop will have overwritten the initial records of any histories already created with the REL forms and their suffixes.

After processing the current <BAS> field, the function moves onto the next <BAS> field and repeats the above described procedure for that base. This continues until all <BAS> fields are processed.

In the event that there were no <BAS> fields associated with the current top level node, Make_base_history allocates memory for a history and then fills in the first record in that allocated memory with the information from the current top level node (steps 828-832). The information includes: the current stem; the part of speech of the current CC_node; a base index of zero; a null suffix; and a rating of zero. If the current CC_node is abstract, meaning the current stem is not a valid stem on its own, Make_base_history attaches the suffix from the top level node to the abstract stem to generate the current stem. To convert the lexical string to its surface form, Make_base_history calls another function, namely, Quickgen, to perform the conversion. (The details of Quickgen are presented elsewhere.)

During this phase of processing, after filling in the record for the top level node, Make_base_history loops through all of the second level child nodes (step 834). For each node, the function extends the base history by calling the Base_hist_loop function. The processing during this phase is similar to that which occurred in steps 814 through 820 above. One difference, however, is that in this case the base index in all of the calls to Base_hist_loop is zero, referring all records generated through this call to the previously created, first record in the current history.

The above described steps are repeated for all second level nodes, all top level nodes, and all stem nodes. When completed, the complete output structure thus generated is returned to the calling function and Make_base_history terminates.

The Base_Hist_Loop Function

Referring to FIGS. 31a-c, Base_hist_loop is called by Make_base_history to finish the base history for the nodes beneath the top level of a parse tree. It builds a record for the current node, attaching the suffix of that node to the base passed to it. It then calls itself on any children the current node has using the new word formed as the base for the next level. If there is more than one child, then the split in the parse is signified by creating a new history for each of the other parses and copying the current history formed thus far into the new one.

In the call that is made to this function, the following parameters are also passed: base, cur_cc_node, base_index, cur_history, and output_struct. Base is the stem with any suffixes above this node attached. Cur_cc_node is the current child node to be processed. Base_index is the index of the current child's base record. Cur_history is the current history of records being filled. And output_struct is the data structure used to return the output structure generated.

Upon being called, Base_hist_loop constructs a new word by calling Quickgen to produce a surface string corresponding to the lexical string formed by combining the base word, which was passed to it by the base variable, with the suffix from cur_cc_node (step 850). The function then assigns the resulting new word to a new_word variable.

Before proceeding, Base_hist_loop checks whether the cur_cc_node used to contain the root suffix (step 852). If it did, the function revises new_word to be the word form found in the record identified by the base_index (step 854). Recall that if there are no explicit <BAS> fields associated with an abstract stem, the root of the tree is formed by attaching the suffix from the first second level class below the top node. This section of code checks for the cc_node that the root suffix came from. That node is identified by the fact that it is a place holder (i.e., it has null entries in its suffix part of speech fields). Unlike the other 2nd level nodes, any children below this node must use the root suffix as well as the abstract stem as a building block. Therefore, the root form is recovered via the base_index and used as the base argument to build the records for the children of this node. This node is otherwise ignored.

For the case involving a root suffix and after revising the value for new_word, the function loops through each child of the cur_cc_node (step 856). For the first child, the function sets a new_history variable equal to cur_history (step 864). In the event that more than one child is involved, on each pass through the loop for the other children, the function duplicates the current history for each of the additional children (steps 858-862). It does this by first allocating memory for a history for the additional child and assigning the allocated memory to new_history. Then, for that child it copies cur_history into new_history and proceeds to build the rest of the history for this branch from this new_history.

To construct the rest of the history, whether for the first child or the additional children, the function calls itself at this point (step 866). In this call, the base variable is set equal to new_word; the cur_cc_node variable is set equal to the current child CC_node; and the cur_history variable is set equal to new_history. If every call to Base_hist_loop during this section of the code returns an indication that a REL ending was found, the function indicates this fact and returns the resulting output_struct (steps 868-870). Otherwise, the function returns success along with the resulting output_struct (step 872).

In the event that the suffix in the cur_cc_node originally passed to this function is a formative ending (as indicated by the fact that it has a rating of 4), the function loops through all children of the cur_cc_node and, for each child, generates another separate history by recursively calling Base_hist_loop (steps 874-886). This phase of the program operates similarly to that previously described for the root suffix situation.

In the event that the suffix rating of the cur_cc_node originally passed to this function denotes a REL ending, the function executes the code beginning at step 894. If the current CC_node has a REL ending, then the word it forms is considered to be its own root form and should not be broken down. Therefore, the record built for this CC_node becomes the root node at position 0 in the current history array. The previously built records are no longer required and are overwritten by any child records.

Thus, when filling the record history with information for a CC-node having a REL ending, the function goes back to the base record with the $0^{th}$ index and writes into that record, overwriting whatever information had been placed there previously (step 896).

If a REL ending is not found (and the node contains neither a root suffix nor a formative ending), Base_hist_loop fills in the next available record in cur_history with information from the current node (steps 898-900). Then, it determines whether the CC_node has any children (step 902). If it has children, the function loops through all children of the cur_cc_node and, for each child, generates another separate history by recursively calling Base_hist_loop in a manner similar to that previously described (steps 904-918). One difference in this portion of code is that base_index is set to identify the record that was generated in step 894.

If Base_hist_loop reaches the end of its code without exiting and determines that only REL forms were created, during the course of its execution, it returns the resulting output_struct and an indication that only REL forms were found (step 920). Otherwise, the function returns success along with the resulting output_struct and terminates execution (step 922).

The WFSgenerate Function

Referring to FIGS. 32a-1, the WFSgenerate function generates the surface forms related to a given base by suffix, part of speech, and/or rating. If a suffix is supplied, only the valid words with that suffix attached to the given base are returned. If the base form is given a part of speech, this will constrain the output to be words related to that definition of the base. If an output part of speech is given, only those words with that part of speech that are based on the input word will be generated. Finally, different ratings can also be given to filter the output. Ratings 1 to 5 yield the following: 1) words based on the input base that have an inflectional suffix attached, 2) words based on the input base that have a derivational suffix attached and also any inflections of those words, 3) words based on the input base that have a REL ending attached and their inflections, 4) combination of 1 and 2, 5) combination of 1, 2, and 3. A rating of −1 signifies that no filtering by rating is to be done and any word based on the input base will be generated that has the proper output part of speech if that was given. Because it is possible to still filter by part of speech with a rating of −1, there could be "holes" in a list of records when the base of a word does not have the proper part of speech and is therefore not present. If a base is not present in the base history, a −1 index is placed in the record whose base is missing.

The function calling WFSgenerate passes a template and an output_history data structure as part of the call. The arguments of the template that are accessed by WFSgenerate include: (1) input_base, which is the string to be used as the base to generate from; (2) base_pos, which specifies a part of speech for input_base, clarifying ambiguity, if desired; (3) output_pos, which is the part of speech field of the template that can be set to no part of speech; (4) suffix, which specifies the suffix and can be an empty string, if desired; and (5) suffix_rating, which is used to control the types of words generated. Output_history is the data structure used to return the results.

Other variables used in this function include automaton, which identifies the set of spelling change rules initialized and prepared for generation; steam_lexicon, which identifies the stem lexicon that was opened and retrieved during initialization; suf_lexicon, which identifies the suffix lexicon; and base. The default value of the base variable is generally input_base. However, when input_base is the root form of an abstract stem, then this is the abstract stem.

When WFSgenerate is called, it performs a number of checks on the variables passed to it to confirm that they meet requirements for those variables. First, WFSgenerate checks whether there are any spaces in input_base and, if there are, it indicates that there are no derivations available for input_word (steps 930-932). Next, WPSgenerate checks whether the suffix variable contains information. If it is not empty, the function looks the suffix up in the suffix lexicon and it saves each class symbol that the suffix belongs to, each part of speech it can have and each rating (steps 934-936). If the suffix is not found in the suffix lexicon, the function reports that it has received an invalid suffix (steps 938-940). And, if the suffix is only a formative ending, the function reports that it yields an invalid word (steps 942-944).

Next, WFSgenerate examines output_pos. If output_pos is not empty, the function verifies that it is a proper part of speech. If output_pos is not valid, the function reports that it has received an invalid part of speech (steps 946-952). If the suffix variable was determined to not be empty, the function compares the possible parts of speech that were returned for that suffix to the part of speech identified by output_pos. If there is no match, the function reports that there is a mismatch in data it has received (steps 954-958).

Next, WFSrecognize checks the base_pos variable. If it is not empty, the function verifies that it is a proper part of speech and reports any adverse finding (steps 960-962).

Finally, the function checks whether the suffix rating is a valid number (i.e., between 1 and 5 inclusive or −1) and reports any invalid ratings (steps 964-966). If it is a valid rating, the function checks whether it agrees with the output_pos selected by the user. If those two disagree, a mismatch is reported (steps 968-970). A mismatch could occur, for example, if the user selected a suffix rating of 1 (i.e., inflectional) but supplied a noun from which the user wants to generate another noun, a verb or an adjective, each of which implies a derivational change.

After the input variables have been checked, WFSgenerate calls an internal function to recognize the various parses of input_base that agree with base pos, if it is given (step 972). Note that input_base may or may not be a root form. Recognition must be done on input_base in order to find out what its stems are and also to find out if any suffixes have already been added. WFSgenerate will add suffixes after the ones already attached. The internal function which performs this recognition process must also note whether input_base is the root form of an abstract stem. If it is, the variable base should be set to the abstract stem and the pointer into the continuation class tree should point to the ABS node. The base variable can then be used to produce the words associated with the abstract stem while the root is preserved to be returned in the root records. Using the base_pos argument, the number of valid parses of input base can be controlled. The internal function which performs these functions is similar to WFSrecognize except that it does not return a history, as does WFSrecognize. Its primary purpose is to call both Lookup_stems and Lookup_suffixes to generate all successful parses of input_base so as to identify the stems within input_base and any suffixes which have already been added to those stems. It returns each stem identified and, for each stem, the locations in the continuation class tree where each successful parse ended.

If the input_base is not recognized by the internal recognition function, this is reported to the user (steps 974-976). Also, if input_base does not have an interpretation that agrees with base_pos, a data mismatch is reported to the user (steps 978-980).

In the event that the internal recognition function determines that input_base is the root form of an abstract stem, WFSgenerate lets the base variable be that abstract stem (step 982).

The subsequent sections of code for WFSgenerate apply the different filters that were specified by the user in the call of WFSgenerate.

If the suffix variable is not empty, indicating a restriction on the suffixes which may be used to generate lexically related words from input_base, WFSgenerate collects all of the equivalent classes for the suffix specified (steps 984-986). Then, WFSgenerate loops through all of the valid parses that were generated in step 972. For the current parse, WFSgenerate fills in the top record of a temporary history with input_the part of speech for the current parse, a base index of zero, no suffix and a rating of zero (step 992). If the current parse of input _base shows that input_base is a root form, then WFSgenerate identifies each irregular form of the current stem by examining the information stored in the continuation class lexicon (step 994).

For each irregular form identified, WFSgenerate determines the suffix in the irregular form (steps 996-1002). If the irregular form has no <SUF> field and if the part of speech of the irregular form is inflectional, the function determines the suffix that is implied by the part of speech (step 998). On the other hand, if the part of speech is not inflectional and there is an empty <SUF> field, the function leaves the suffix of the irregular form blank (step 1002). Otherwise, the suffix is determined by the contents of the <SUF> field for the irregular form. It can be determined whether an <IRR> field is an inflection of input_base by comparing the part of speech associated with the <IRR> field to the part of speech for the current parse of input_base. (Note that during generation (see, for example, the description of WFSgenerate), this information is determined in another way. In particular, WFSqenerate uses the fact that no <SUF> field is present to decide that the suffix rating is inflection. The <SUF> field may be present but blank, indicating that the rating is derivational but there is no suffix to relate the forms.)

Once the suffix for the irregular form is determined, the function compares it to the suffix variable passed in the function call and all of its equivalents, as determined in step 986 (step 1004). If there is a match, WFSgenerate copies the temporary history into the next available history in output_history step (1008). Then, the function fills in the next record in the new history that has been started in output_history with the information about the irregular form that was found (step 1010). That is, WFSgenerate places into the next record the part of speech for the irregular form, the index for the input_base record, the suffix of the irregular form, and a rating based upon whether a <SUF> field is present or not. The rating is 1 if the irregular form is an inflection; it is 3 if the irregular form is a <REL> form; and it is 2 for all other cases.

After all of the irregular forms of the input_base have been processed in the manner just described, WFSgenerate compares the continuation class symbols that were saved in step 936 (i.e., the continuation class symbols for the suffix and all of its equivalents) to the children of the last continuation class of the current parse of input_base (step 1012). In other words, WFSgenerate determines which children may be used for generation. For each child that has a match, WFSgenerate starts a new history by copying the temporary history into the next history in output_history (steps 1014-1016). WFSgenerate then stores information about the matching suffix into the next record of the new history (step 1018). To obtain the word stored in the next record, WFSgenerate passes the input_base along with the matching suffix to Quickgen. The part of speech is determined when the suffix is returned from suf_lexicon via the matching class. The base variable is the index of the input_base record for this history. The suffix variable is set equal to either the input suffix or its equivalent, whichever is appropriate. And the rating is obtained from the suf_lexicon.

After completing the above procedure for all matching children of the last continuation class, WFSgenerate moves on to the next parse of input_base and repeats the above sequence of steps until all parses are processed (step 1020). At the conclusion of this section of code (i.e., the portion which applies to the suffix filter), if no base records were formed, WFSgenerate reports that there are no derivations of input_base with the specified suffix.

If base records were formed, WFSgenerate returns output_history containing all of the base histories that were generated (step 1026). Note that each record in the base history returned contains a surface string for the lexical string generated from input_base. Also note that if the suffix variable is not empty, then the above-described portion of code either returns an error (i.e., no word found) or a base history. Therefore, the rest of the code after this section will not be executed. For each of the following sections of code, each of which applies to a different filter, the same is true. That is, it will either return an error or a base history that has been filtered with th appropriate filter.

The next section of code applies the suffix_rating of 1 filter (steps 1028-1060). That is, it generates all derivations of input_base with an inflectional suffix attached. In this section of code, WFSgenerate loops through each valid parse of input_base and executes the following steps (step 1030). For the current parse of input_base, WFSgenerate compares output_pos with the part of speech for the current parse. If output_pos is not the same or an inflection of the current part of speech, WFSgenerate rejects the current parse and moves onto the next valid parse (steps 1032-1034). Otherwise, WFSgenerate fills in the top record of a temporary history with information relating to the current parse of input_base (step 1036). The temporary history will be used to generate the first records of each new history (i.e., each branch) that can be extended off of the current parse of input_base.

Next, the generation function copies the temporary history into the next available history in output_history and then calls Get_records to complete this new history (steps 1038-1040). Get_records, which is described in greater detail below, searches the continuation class tree below the current continuation class. The types of records returned and the depth of the search is dependent on its inputs which act as filters. Note that Get_records continues to fill the history selected in step 1030 with any child that satisfies its inputs. If no children match the inputs, the history started before calling Get_records becomes the next available history to be used below or by the next parse of input_base.

In its call to Get_records, WFSgenerate passes a ratings list of 1, the base to which the suffixes will be added, the index of the record for input_base, a pointer to the children of the last class processed in the current parse of input_base, output_pos and output_history. Get_records returns any records that it generates in output_history.

After Get_records returns its results, WFSgenerate checks whether input_base is a root form (step 1042). If it is, WFSgenerate creates the records for all irregular forms which satisfy the filter conditions. More specifically, records are created for any irregular form for which the <IRR> field is an inflectional form of input_base, it has the same part of speech as specified by output_pos, and it either has a <MAP> field which matches the current parse of input_base or it has no <MAP> fields at all (steps 1044-1046). In each base_record created during this portion of the code, WFSgenerate uses the information in the <IPO> portion of the <IRR> field (i.e., the portion of the data structure which identifies the part of speech of the irregular form) to obtain the part of speech entry for the record; and it uses the inflectional suffix corresponding to that part of speech for the suffix entry.

After all of the irregular forms are processed in this manner, WFSgenerate moves onto the next parse of input_base and repeats the above described steps (step 1054). As soon as all parses are processed, WFSgenerate returns the results.

The next section of code applies the filters required for a suffix_rating of 2 or 3 (steps 1062-1088). That is, it generates all surface forms of input_base with a derivational suffix attached or a REL ending attached, plus inflections of those words. In general, code is similar to that previously described for suffix_rating equal to 1 with the following exceptions. WFSgenerate does not begin with code for screening the valid of parses of input_base based upon output_pos, as was done earlier, since such screening is not appropriate for suffix__ratings of 2 or 3. Recall that screening was done for a rating of 1 because inflectional suffixes do not change the part of speech of a word. If the output part of speech does not match a part of speech of input_base, then adding an inflectional suffix will not change that. In this case, however, a derivational suffix (of rating 2 or 3) will possibly change the part of speech of the input_base and the resulting part of speech may equal the output_pos; thus, th screening cannot be performed for these ratings.

When WFSgenerate calls Get_records in step 1070, it passes a list of all ratings specified in suffix_rating. In addition, during the examination of irregular forms, the function applies different criteria from those used in the previous section of code. In this case, WFSgenerate is interested in another set of irregular forms, namely, all derivational irregular forms, if suffix_rating is 2, or all REL forms, if suffix_rating is 3. Among these, WFSgenerate proceeds only with those irregular forms whose parts of speech match output_pos, if given, and which either have a <MAP> field that matches the current parse or have no <MAP> fields (step 1074). In the records generated for such cases, WFSgenerate uses the information in the <IPO> field to specify the part of speech, it uses the information in the <SUF> field to specify the suffix and uses the appropriate rating.

The section of code beginning at step 1090 applies the filter applicable to a suffix_rating of 4, which signifies that suffixes with either a 1 or 2 rating on the next level should be generated. This section of code is similar to the code which implements the suffix_rating of 1 filter with the following exceptions. As with the code for suffix_ratings of 2 or 3, WFSgenerate does not screen the parses of input_base using output_pos. In addition, in the case of root forms, the only <IRR> irregular forms which are processed during this phase are those whose parts of speech is equal to output_pos and which either have a <MAP> field that matches the current parse or have no <MAP> fields. The suffix listed in any records created for the irregular forms is either obtained from the <SUF> field, if present, or it is the suffix found by the part of speech.

If a suffix_rating of 5 is specified, WFSgenerate executes the section of code beginning at step 1118. In this case, everything on the next level of the continuation class tree from where the current parse node left off is returned. The code in this section is similar to the previously described section of code for suffix_rating of 4, with the following exceptions. When WFSgenerate calls Get_records to generate the histories, it passes a rating list of 1, 2, and 3 to Get_records. This causes Get_records to search only the next level of continuation classes for only those suffix ratings. Also, in the case of root forms, the only irregular forms which are processed at this time are the <IRR> and <REL> forms whose part of speech is the same as output_pos, if given, and which either have a <MAP> field that matches the current parse or have no <MAP> fields. The rating that appears in the records generated for the irregular forms reflects whether it was an <IRR> form (a rating of 2 for derivational or a rating of 1 for inflectional) or a <REL> form (a rating of 3). The suffix listed in any records created for the irregular forms is either obtained from the <SUF> field, if present, or it is the suffix found by an inflectional part of speech.

Finally, if a suffix_rating of −1 is specified, WFSgenerate executes the section of code beginning in step 1146. In this case, all possible forms BELOW the current continuation class of input_base are returned. This requires an exhaustive search of the subtree below the current node. Get_records does this recursively, filling the current history and creating any others that are necessary. The code in this section is similar to the previously described section of code for suffix_rating of 4, with the following exceptions. When WFSgenerate calls Get_records to generate the histories, it passes a rating of −1 to Get_records, thereby causing Get_records to search the entire tree below this level. In the case of root forms, the only irregular forms which are processed at this time are the <IRR> and <REL> forms whose part of speech is the same as output_pos, if given, and which either have a <MAP> field that matches the current parse or have no <MAP> fields. The rating that appears in the records generated for the root forms reflects whether it was an <IRR> form (a rating of 2 for derivational or a rating of 1 for inflectional) or a <REL> form (a rating of 3). The suffix listed in any records created for the root forms is either obtained from the <SUF> field, if present, or it is looked up using the part of speech of this form.

The Get_records Function

Referring to FIGS. 33a-b, Get_records searches the continuation class tree below the current continuation class. For any ratings other than −1, just the next level is searched for the specified ratings and those forms are returned along with any inflections of those forms. A −1 rating causes Get_records to search the tree to its leaves below the current location and return records for each form below the current location. Formatives are skipped by Get_records, except to add the formative suffix to the base. The function is recursive and calls itself to search the next levels.

The parameters which can be specified for Get_records include: (1) suffix_ratings, which is a list of ratings between 1 and 3 or −1; (2) base, which identifies the base to which the suffixes are added; (3) base_index, which contains the record index of the base for this current level of classes; (4) cc_list, which is a pointer into a continuation class tree that points to the children of the continuation class where base ended; (5) output_pos, which specifies the part of speech given by the user application to filter the types of words returned; and (6) output_history, which is the history structure being filled in for this call from WFSgenerate.

When Get_records is called, it loops through the continuation classes that were passed to it (step 1180). If any of the continuation classes is a macro class (i.e., it represents a set of continuation classes, as in the case of NREG or VREG), Get_records expands the macro class into its constituent classes and adds these to the list of classes through which it loops step 1182). For the current continuation class in the Get_records looks up its suffix in the suffix lexicon and saves it for future reference (step 1184). Then, it checks whether the class is a root suffix class by ascertaining its position within the current continuation class tree and by checking the entry's property byte (step 1186). (Note that a "root suffix" is only used if there are no <BAS> fields associated with the abstract stem. The property byte specifies if there are <BAS> fields.)

The root suffix is the first continuation class on the second level to be reached in a left-to-right depth first search of the children of an abstract stem. If the current class represents the root suffix of an abstract stem, Get_records calls itself using the word found in the word field of the base_index of the current history and a pointer to the children of the current class (step (1188). The values of the other parameters passed to this internal call of Get_records remain the same as were specified in the original call to Get_records. Through this recursive call, Get_records generates the records based on the base form that is generated by using the root suffix.

If in step 1186, it is determined that the current continuation class is not a root suffix class, Get_records checks whether it is a formative ending (step 1190). If it is a formative ending, Get_records calls itself specifying the base as the surface form of the current base with the formative ending added (step 1192). For the value of the cc_list parameter, it passes a pointer to the children of the formative class.

After checking for root suffixes and formative endings, Get_records begins creating the rest of the records for the current continuation class. The first record that is created for the level builds upon the current history within output_history. For all subsequent continuation classes on this level, Get_records copies the current history up to this level into the next available history in output_history, which then becomes the new history for the current continuation class (steps 1194-1198).

If the current continuation class produces a part of speech which equals output_pos and its suffix has a rating which matches one of the ratings in suffix_ratings, then Get_records fills in the next record in the current history with the word that is generated by adding the suffix found in the suffix lexicon (in step 1184) onto the base and processing the result with Quickgen to obtain the corresponding surface representation (steps 1200-1202). After generating the next record for the current level, Get_records checks if the suffix_rating is just −1 (step 1204). If it is, Get_records calls itself to generate the rest of the records for all branches extending from the current node of the current level (step 1206). In the call to itself, the function sets the base parameter equal to the surface representation of the current base plus the suffix of the current continuation class. The function also sets the value of the base_index to either the record filled for the current continuation class, or −1 if none was filled for the current continuation class.

In the case that the suffix_rating is not just −1, Get_records checks whether a record was filled in step 1200 and if one of the suffix ratings matches the rating of the current class (step 1208). If both of these conditions are satisfied, Get_records calls itself to generate the appropriate records for children of the current continuation class (step 1210). In this call, Get_records sets the suffix_rating equal to 1, it uses a base equal to the current base plus the suffix of the current continuation class, and it sets the base_index equal to the index of the record created in step 1200.

The above process is created for each continuation class in the cc.list and when completed all records that were generated are returned.

These recursive calls to Get_records collect the next level of records. If the rating in suffix_ratings is −1, then all records below this point are retrieved. Otherwise, just the inflected forms of the current continuation class are searched for. Inflected forms are automatically included in a rating other than −1 definition Inflections are not included with irregular forms because this would require accessing their separate entries in the stem lexicon.

The above-described process is repeated for each class and all records constructed are returned.

The Quickgen Function

Referring to FIG. 34, Quickgen is a procedure that generates a surface string from a lexical string by passing it through the automaton prepared for generation to make any spelling changes that are necessary. This function does NOT consult the lexicons and therefore performs NO checking on the validity of the generated word. It takes a string that is in lexical form, already containing a base form and any suffixes to be attached concatenated together as in 'success!#ful#ly'. Note that if a stress mark occurs after a stem and before a suffix to be attached in this call to Quickgen, it must be included in the input string. However, if at least one suffix has already been attached to the stem, the stress mark is no longer required as in 'successful#ly'.

The calling function passes a lexical string to Quickgen using the variable instring. Quickgen needs to be informed about the location of the automaton and it uses an outstring variable to pass the resulting surface string back to the calling program.

When Quickgen is called, it first reduces instring to all lower case letters so that they can be input to the automaton (step 1220). Then, it initializes the automaton to its initial state in preparation for passing instring to it (step 1222).

After the automaton is initialized, Quickgen begins looping through each interpretation of the first character in instring (step 1224). Within each loop, Quickgen initially places the current interpretation of the first character in outstring (step 1226). If instring was capitalized, the function also capitalizes its interpretation in outstring (step 1228). Then, Quickgen calls Genloop which returns the first successful parse, if any exist, of the string that is passed to it (step 1230). In the call to Genloop, Quickgen passes the string that was reduced in step 1200 less the first character, the state of the automaton as a result of accepting the current interpretation of the first character, and outstring. The details of the operation of Genloop are described elsewhere.

If Genloop is successful, Quickgen returns the resulting outstring and terminates (step 1232).

If Genloop is not successful for the current interpretation, Quickgen moves on to the next interpretation and continues until it finds an interpretation that results in a successful parse (step 1234).

If no interpretations yield a valid parse of instring or if the automaton blocks on every interpretation of the first character of instring, Quickgen returns an indication that the surface string was not found and then terminates (steps 1236-1238).

The Genloop Function

Referring to FIGS. 35a-b, Genloop is the recursive procedure that finishes generating the surface form of the string passed to Quickgen. It returns the first successful parse of the input string. The parse splits on the different possible interpretations of the lexical characters of the input string. It also splits if lexical null characters are inserted. A guess of a lexical null is constrained by a language specific function (described elsewhere) that determines if a null can be inserted.

The variables that are passed to Genloop include: input_string, which is a substring of the string that was passed to Quickgen; current_state, which is the current state of the automaton after having accepted an interpretation of the character just before the first character in input_string; and outstring, a data structure that is being filled with the resulting surface string.

Genloop first checks whether there are any characters left in input_string (step 1240). If there are no characters in input_string, Genloop moves the automaton over the end-of-word (EOW) character (step 1242). If that results in a final state for the automaton, Genloop places a zero terminator at the end of outstring and returns success (steps 1244-1248). On the other hand, if the EOW character blocks the automaton or places it in a non-final state, Genloop returns an indication that the surface word was not found (steps 1250-1252).

In the event that there are more characters in input_string, Genloop begins looping through each interpretation of the first character in input_string that does not block the automaton (step 1254). In this phase of operation, Genloop appends the current interpretation (if not null) to outstring (step 1256) and then calls itself, using the rest of the input_string after the first character and the state of the automaton after accepting the current interpretation (step 1258). If the call to Genloop is successful, the function returns a success along with the outstring containing the surface interpretation of the lexical string (steps 1260-1262).

If the call to Genloop is not successful, the function goes on to the next interpretation of the first character and repeats the above-described process (step 1264). The looping continues until a successful parse is found or until all possible interpretations are tried.

If no interpretations result in a successful parse and if permitted by external null constraints previously mentioned, Genloop inserts a lexical null character at this point and begins looping over each of the possible interpretations of the lexical null (step 1266). Within this loop, Genloop appends the current interpretation of the lexical null to outstring and calls itself (steps 1268-1270). The first interpretation to yield a successful result is returned as the surface representation of the string (steps 1272-1274). If all interpretations of the lexical null block the automaton or no interpretation causes Genloop to succeed, Genloop reports that a valid surface string was not found (steps 1278-1280). Then, Genloop terminates.

Having described the routines which perform the recognition and generation functions of the morphological analyzer, details of the underlying spelling-change rules and the automaton will now be provided.

The Rules

There are 17 different spelling changes handled by the morphological analyzer (assuming that gemination, which affects 14 consonants, is considered to be one rule). A spelling change is represented as a pairing between a lexical character and a surface character. Elision is represented as the pairing of a lexical character with a surface null. Conversely, epenthesis is represented as the pairing of a lexical null with a surface character.

All of the rules are nondirectional; that is, the same rule set is used for generation and recognition. A rule applies whenever its structural description is met. Exceptions to rules are handled by using specific representations in the lexicon that will not trigger the incorrect application of a rule. A complete listing of the spelling-change rules appears in Appendix E.

Restrictions on Rules

A single rule licenses only one lexical-surface pairing. In cases which involve a sequences of changes (e.g., romance+ic→ romantic, gas#s→gasses), a separate rule accounts for each replacement. Rules are not used to account for the deletion or addition of entire morphemes. For example, neither the truncation of 'ate' in 'educate'→'educable' nor the insertion of 'al' in 'drastic'→'drastically' is handled by rule.

Rules may refer to lexical and surface characters, and sets of characters. However, they do not have access to information about morphemes, such as the lexical category associated with stems or suffixes, or abstract morphological features of morphemes (e.g., +Latinate).

The Alphabet

The morphological analyzer has a defined set of characters that it accepts as valid lexical input. The alphabet of surface characters contains 29 characters: 26 letters plus apostrophe, hyphen, and an end-of-word marker. The alphabet of lexical characters consists of the surface alphabet plus the gemination marker, '+' and '#' boundary symbols. The alphabet and rule set together determine the set of possible lexical/surface character pairings. (See Appendix D for all possible pairings.) All pairings of a valid surface character with itself as lexical character are valid. Any other pairings must be sanctioned by rule. In the rule descriptions that follow, lower case letters represent themselves. Upper case letters are used as abbreviations for classes of letters. Rules in this description of an embodiment make use of the following abbreviations:

| | |
|---|---|
| C | any consonant {b c d f g h j k l m n p q r s t v w x y z} |
| V | any vowel {a e i o u} |
| S | any sibilant {ch sh s x z} |
| NOTCG | any consonant except c, g |
| NOTI | any vowel except i |
| θ | null |
| + | + (morpheme) boundary |
| # | # (word) boundary |
| $ | end-of-word marker |
| ! | gemination marker |

The Rule Set

A rule W.X/Y_Z should be interpreted as "lexical W changes to surface X in the environment in which it follows Y and precedes Z." Pairs enclosed in parentheses are optional. Curly braces, "{ }," signify disjunction; hence, {a b}{c d} means "'a' or 'b' followed by 'c' or 'd'." Subscripts are used to indicate identity. For example, the appearance of "$C_i$" more than once in a rule indicates that the consonants must be the same; e.g., "r" and "r," or "b" and "b," but not "b" and "r."

In the morphological analyzer, the rules are represented as a single finite-state transducer (automaton), each state of which represents a unique combination of the results of accepting an input pair given each of the spelling rules. The automaton contains approximately 478 states.

A complete specification of all of the rules used by the morphological analyzer are presented in Appendix F.

Each rule imposes two types of constraints on the occurrence of surface/lexical character pairs in a specified context. The first type of constraint is called licensing. A given rule has the power to license exactly one lexical/surface pair, although it can license multiple occurrences of that pair within a given input string. The pair that a rule can license is called its imperative pair.

Besides the imperative pair, a rule has a left-context and a right-context, which specify the morphological environment in which the rule licenses its imperative pair. Every occurrence of every pair in a string must be licensed by a rule if the string is to be accepted, with one exception: pairs consisting of two identical alphabetic characters, such as (a . a). An alphabetic character is one that can potentially appear in the surface form of some string. Pairs of identical alphabetic characters are called trivial pairs, and are assumed to be licensed by default.

In addition to their power to license occurrences of their imperative pair, rules also have the power to veto occurrences of certain pairs. In particular, let R be a rule and R.imperative its imperative pair. Pairs whose lexical character is identical to that of R.imperative but whose surface character is different from that of R.imperative are said to conflict with R.imperative. Such conflicting pairs are vetoed in the context specified by R.

However, if a pair has a lexical character that is different from that of R.imperative then there is no conflict and no veto, even if the surface characters are identical. The result is that a rule set may accept multiple strings of pairs that differ only in their lexical characters, but no rule set may accept multiple strings that differ only in the surface characters. This asymmetry is practical in the context of the complete morphology system: the process of finding the lexical form of a surface string (called recognition) relies on stored lexicons as well as morphological rules. Even if the morphological rules allow several possible lexical realizations of a surface string, the lexicons themselves determine which ones are real possibilities. The same is not true for the process of constructing a surface string from a combination of lexical morphemes (generation): the morphemes are already given, so the language is expected to provide a unique surface string for them. The possibility of a natural language being systematically ambiguous by allowing multiple realizations of underlying morphological strings is considered unlikely.

Pair Specifications

The next issue about the rules is how they specify contexts. The simplest way is by listing the string of pairs that must appear to the left and right of the imperative pair. For example, suppose that there is a rule that says "accept the pair [i . y] if the pairs [e . e] and then [s . s] follow." More formally, that rule would look like:

left-context: [ ]
imperative: [[i . y]]
right-context: [[e . e] [s . s]] The empty list as the left-context means that there are no restrictions on the left context.

If the rules were required to spell out unique strings for the left and right contexts, however, an enormous number of rules would be needed. For example, several facts about English morphology refer to the consonants or the vowels. If one were limited to the above notation then expressing a context that involved any consonant would require some twenty rules, one for each consonant. In order to avoid this, the rule language allows the definition of special symbols that represent sets of characters. These can be used anywhere that a character can be used. In order for this to be really useful, however, several other features are needed. The first is the ability to represent any pair in which the same character occurs twice. The rule language provides this by allowing one character of a pair to be the special symbol ":as-self". To express "any consonant paired with itself", one would write:

[C . :as-self]

where C has been defined as the set of all consonants. Another important special symbol is the reserved character "=". "=" means any character. For example, [y . =] means any pair with a "y" as its lexical character. Note, however, that special symbols like "=" are allowed only to describe the context, not the imperative. A rule passes no judgment on the pairs appearing in its context—they must be licensed by some other rule if the entire string is to be accepted. As a result, one need not worry about the possibility that using an "=" in the context will permit the imperative pair to occur with some linguistically outlandish pair in its context—that outlandish pair will itself cause the string to be rejected unless someone has included a linguistically outlandish rule permitting it.

Characters, character sets, and the special symbols :as-self and "=" are all ways to specify characters. They can be put together into a variety of ways to specify character pairs. Here are some examples along with a description of the character pairs they specify:

[C . :as-self-]: Any pair consisting of two instances of the same consonant.

[C . C]: Any pair consisting of two consonants. Remember, however, that rules do not legitimize the pairs specified in their contexts, so [C . C] can also be thought of as any pair of consonants that can legitimately appear in some context.

[C . =]: Any pair whose first character is a consonant.

[= . :as-self] Any pair consisting of two instances of the same character.

[= . =] Any pair.

In addition to these, a character specification may consist of a list beginning with the symbol ":or" and containing one or more character specifications. Such a specification is satisfied by any character satisfying any of its constituent specifications. An example is [:or S V], where S is defined to be the sibilants and V the vowels.

In summary, the syntax of character specifications is as follows:

<char-spec>→[:or <char-spec>*]
    <char-spec>→character
    <char-spec>→character-set-symbol
    <char-spec>→:as-self In addition, pairs can be specified by combining any two character specifications:

<pair-spec>→[<char-spec> . <char-spec>].

A pair spec [<char-spec>1 . <char-spec>2] is satisfied by a pair [<char>1 . <char>2 just in the case where <char>1 satisfies <char-spec>1 and <char>2 satisfies <char-spec>2. Just as disjunction is allowed for character specifications, so it is allowed for pair specifications:

<pair-spec>→[:or <pair-spec>*].

Such a disjunction of pair specifications is satisfied by a pair, if and only if, at least one of the disjunction's constituent pair specs is satisfied by the pair.

Context Specifications

A context consists of a sequence of pair-specs and optional pair-specs. This is written formally as:

<context-spec>→[<pair-spec> [:optional
        <pair-spec>]]* where "U" is a syncategorimatic symbol denoting "union" or disjunction. A context specification without optional pair specs is called simple. A simple context [<pair-spec>1 . . . <pair-spec>n] is satisfied by a string of pairs [<pair>1 . . . <pair>n] just in case <pair>i satisfies <pair-spec>i for all i between 1 and n. A small complication is added by optional pair specs. A context spec with optional pair specs is interpreted by constructing an equivalent disjunction of simple context specs. The original context spec is satisfied just in case at least one of the simple context specs in the disjunction is satisfied. The disjoined simple context specs are derived from the original by eliminating the optional pair specs in different says. Each optional pair spec can be eliminated either by removing it altogether or by making it non-optional. The disjunction is constructed by eliminating the optional pair specs from the original in each possible combination of ways. The disjunction resulting from this process is satisfied exactly when the original context specification ought, intuitively, to be satisfied.

Rule Specifications

The syntax and semantics of entire rules are characterized as follows.

<rule>→[<context-spec> <imperative-pair>
        <context-spec>]

<imperative-pair>→[character . character]

Assuming that • stands for string concatenation, a rule R is said to be satisfied a pair P in a pair-string PS=PS1•P•PS2 under the following conditions:

1) Some substring trimmed from the right edge of PS1 satisfies the left context of R and, 2) Some substring trimmed from the left edge of PS2 satisfies the right context of R.

In all other cases, R is not satisfied at P. An input string PS is accepted just in those cases in which, for every pair P in PS,1

1) P is licensed, either
    a) by being the imperative pair of some rule that is satisfied at P, or
    b) by being a trivial pair 2) no rule whose imperative pair conflicts with P is satisfied at P.

There is an additional aspect to the conditions on rule satisfaction. Some morphological rules, such as the consonant-doubling epenthesis rule in English, insert characters. To fit this into a model based on pairs, each inserted surface character must be paired with a special lexical null character. As a result, a rule R such that R.imperative has a lexical null has two chances to veto a string PS=PS1.P.PS2 at P. The first chance is the normal one based on satisfaction of R's context specifications at P and there being a conflict between P and R.imperative. Such a conflict between P and R.imperative occurs when P has a lexical null but a surface character different from that of P—i.e., a surface character was inserted, but it was the wrong one. R's second chance to veto is when no character has been inserted where one should have been. In this case the lexical character of P is not null. Since no pair has been inserted, the R.imperative does not exist in the string. Thus P should not be skipped over when determining whether the right context of R is satisfied. The net result is that when R.imperative has a null lexical character, R vetoes PS at P if:

1) Some substring trimmed from the right edge of PS1 satisfies the left context of R and, 2) Some substring trimmed from the left edge of P•PS2 satisfies the right context of R.

3) P does not have a lexical null.

The Compilation Algorithm

This section describes a compiler for the morphological rules. The compiler takes as input a set of rules written in a relatively high-level language and compiles them into a single finite-state automaton. That automaton can be used to accept or reject input strings in real time, theoretically independent of the rules.

The compilation algorithm simply simulates the behavior of the rules on every possible string of pairs, recording the state of each rule after each pair. The states of the rules become the states of the automaton into which they are compiled. The following is an informal treatment of the meaning of "state".

Suppose that one wanted to decide whether a rule-set RS accepted or rejected a pair-string PS. One way to do that would be to examine PS one pair at a time, starting at the leftmost pair and proceeding to the right. As one advances over each pair P, find all the rules R such that the LEFTMOST pair spec of R's left context is satisfied by P. Add these rules to a list of "active rules", along with a pointer for each one indicating that only the leftmost pair has been satisfied so far. Next, consider all the rules that were already on the active list from previous pairs in PS. For each of those that still have a pair spec in their left context that has not yet been satisfied, check the leftmost such pair spec against the current pair P. If that pair spec is satisfied, move the pointer to the newly satisfied pair spec, to indicate that it has been satisfied, and leave that rule on the active list. If the leftmost unsatisfied pair spec of some rule R on the active list is not satisfied by the current pair P, drop R from the active list.

Recall that if a string PS is to be accepted then every non-trivial pair P in PS must be licensed; that is, P must be the imperative pair of some rule R whose contexts are satisfied by the pairs surrounding P in PS. If PS is to be acceptable, every non-trivial pair must be licensed; however, licensing is not sufficient. The string can still be rejected if, for some pair P =[<lex-char> . <surf-char>1], some rule licenses a conflicting pair, [<lex-char> . <surf-char>2], in the context where P occurs. Note that, for a rule to reject P the lexical character of P must be identical to that of the rule's imperative pair. For each rule R, once it has been determined that the left context of R has been entirely satisfied, there are three possible cases: (1) the next pair P in the input is identical to R.imperative; (2) P conflicts with R.imperative, and (3) neither. The last case is the simplest, for then R can neither license nor veto the occurrence of P. Accordingly, for every rule R on the active list whose left context has been entirely satisfied and whose imperative pair is neither identical to nor conflicting with P, drop R from the active list. The cases of identity and conflict are more complicated: they are treated sequentially below.

Consider the case of a rule R on the active list whose left context has been entirely satisfied, and whose imperative pair is identical to the next pair P of PS. If R.right-context turns out to be satisfied by the pairs following P in PS then R licenses P; if not, then R says nothing about P either way. However, if PS is to be acceptable, P must either be a trivial pair or else P must be licensed by some rule. Thus, if a non-trivial pair P is not to cause rejection of PS, then among all the rules on the active list whose left contexts have been entirely satisfied when P is considered, at least one must eventually have its right context satisfied. Further, it must be a rule whose imperative pair is identical to P. Since the pairs in PS are considered sequentially, it cannot yet be determined whether or not one such rule will be satisfied; however, one can proceed, noting that the input PS will eventually be rejected unless one such rule is satisfied.

The noting of this condition on acceptance is implemented as follows: all the rules on the active list whose left contexts have been entirely satisfied by the pairs to the left of P and whose imperative pairs are identical to P are packaged together in a list. Each rule, along with its pointer to the next unprocessed pair spec, is called an R&P. Each package of R&Ps, one of which must have its right context satisfied, is called an R&P-disjunction. The R&P-disjunction created from processing a single pair in the input is put on a list called *must-not-fail-R&P-disjunctions*. Each R&P-disjunction represents a constraint on the rest of PS which must be satisfied before PS can be accepted. The *must-not-fail-R&P-disjunctions* list is the list of all such constraints required for the licensing of pairs. The *must-not-fail-R&P-disjunctions* list must be maintained as each pair P is considered, not only by pushing the new disjunction needed to license P, but also by updating pointers, removing constraints once they have been satisfied, removing rules from disjunctions when their right contexts fail, an-d rejecting PS if every rule in some disjunction has failed. Details are given in the more formal algorithm presented in Appendix G.

Now consider the last of the three possibilities for a rule R on the active list whose left context has been entirely satisfied: R.imperative conflicts with the current pair P in PS. In this case, if R.right-context is satisfied by the pairs following P in PS then R vetoes P. Again, pairs in PS are considered sequentially, so there is no way to tell immediately whether or not R will veto P—the requirement that the right context of R must not be satisfied is simply noted for future reference. Just as there may be several licensors for P, likewise there may be several potential vetoers. Thus, all the rules whose left contexts have been satisfied and whose imperatives conflict with P are packaged up in a list which is put on another list called *must-fail-R&P-conjunctions*. Each package of potential vetoers is a conjunct, rather than a disjunct, because ALL potential vetoers must fail if PS is to be accepted, whereas only ONE potential licenser must succeed. Similar maintenance concerns apply here as to *must-not-fail-R&P-disjunctions*: as each pair is considered, pointers must be updated, rules that have indeed failed as required must be removed from conjuncts, and conjuncts themselves must be removed from *must-fail-R&P-conjunctions* once they are emptied by removal of failed rules—empty constraints have been satisfied. Finally, whenever a rule in a conjunct succeeds, i.e. has its right context satisfied, then it vetoes a pair and causes immediate rejection of the entire string.

In the above simulation of morphological rules on a string of pairs PS, three lists are maintained: an "active list" which will be called *non-constraining-R&Ps*, *must-not-fail-R&P-disjunctions* to enforce licensing constraints, and *must-fail-R&P-conjunctions* to enforce vetoes. If the two constraint lists are empty when the last pair of PS has been considered, then all constraints have been satisfied and PS is accepted. If, on the other hand, some constraint remains unsatisfied, then PS is rejected. These three lists constitute the only "state" that need be maintained during the simulation of the rules. If these lists are known at some point in the processing of a string PS, and the remaining pairs of PS are specified, then one can decide whether to accept or reject PS without knowing which particular pairs have already been considered, nor even how many have already been considered.

To put it another way, consider the set S of all possible strings whose processing results in the same values on the three lists. Now for any given string PS, if the concatenation of some string in S with PS is accepted by the rules, then ALL such concatenations are accepted by them. If one such concatenation is rejected, then all such concatenations are rejected. This suggests that one need not consider all possible strings separately; rather, the strings can be thrown into bins according to the three lists that their processing results in. If there are a finite number of such bins, then each one can be used as the state of a finite state automaton to accept or reject all pair strings. The ability to store the portion of a pair string that has already been considered is not required, only the bin that it goes in needs to be known.

As it turns out, there are only a finite number of bins, or states, as long as there are only a finite number of rules and each contains a finite number of pair specs.

When the finite state machine is compiled in accordance with the above-described principles, the resulting output file has three components:

(1) A two-dimensional transition matrix TM such that TM[i,j] is the number of the state to go to when pair number i is read while in state j. The correspondence between pairs and indices is given in 3 below.

(2) A one-dimensional finality vector FV such that FV[i] = T just in case the ith state of the automaton is a final (i.e., accepting) state, and FV[i] = nil otherwise.

(3) A one dimensional pair list PL such that if the ith pair of PL is (X Y), then (X Y) is pair number i. Put another way, when pair (X Y) is read in state j, the next state is determined by TM[i,j]. By default, the pairs are specified as the list (<lex-char> <surf-char>).

The pseudo-code for an algorithm which compiles the rules to form the finite state machine is shown in Appendix G.

Other embodiments are within the following claims.

What is claimed is:

1. A morphological analyzer for analyzing the morphology of an input word, the analyzer comprising a recognition engine including:
    a memory for storing said input word;
    a linguistic stem processor for reading said input port and for finding a linguistic stem within said input word; and
    a suffix processor for identifying suffixes attached to said linguistic stem, wherein said linguistic stem finding processor and suffix identifying processor cooperate to conduct morphological analysis of the input word from the root to the affix and wherein said recognition engine performs inflectional and derivational analysis, said wherein each derivational analysis is performed recursively using more than two derivational suffixes within each said input word.

2. A morphological analyzer for analyzing the morphology of an input word, the analyzer comprising a recognition engine including:
    a memory for storing said input word;
    a stem processor for reading said input word and for finding a stem within said input word by starting near the beginning of the input word and proceeding through the input word one letter at a time to find said stem; and
    a suffix processor for identifying suffixes attached to said stem, wherein said stem finding processor and suffix identifying processor cooperate to conduct morphological analysis of the input word from the root to the affix and wherein said recognition engine performs inflectional and derivational analysis, said derivational analysis using more than two derivational suffixes.

3. A morphological analyzer for analyzing the morphology of an input word, the analyzer comprising a recognition engine including:
    a memory for storing said input word;
    a stem processor for reading said input word and for finding a stem within said input word; and
    a suffix processor for identifying suffixes attached to said stem by proceeding through the portion of the input word remaining after the stem one letter at a time to find said suffixes, wherein said stem finding processor and suffix identifying processor cooperate to conduct morphological analysis of the input word from the root to the affix and wherein said recognition engine performs inflectional and derivational analysis, said derivational analysis using more than two derivational suffixes.

4. A morphological analyzer for analyzing the morphology of an input word, the analyzer comprising a recognition engine including:
    a memory for storing said input word;
    a stem processor for reading said input word and for finding a stem within said input word; and
    a suffix processor for identifying suffixes attached to said stem, wherein said stem finding processor and suffix identifying processor cooperate to conduct morphological analysis of the input word from the root to the affix and wherein said recognition engine performs inflectional and derivational analysis, said derivational analysis using more than two derivational suffixes; wherein
    said recognition engine in performing in stem and suffix recognition functions proposes a surface null after at least some of the characters of the input word.

5. A morphological analyzer for analyzing the morphology of an input word, the analyzer comprising a recognition engine including:
    a memory for storing said input word;
    a stem processor for reading said input word and for finding a stem within said input word, wherein the stem finding means starts its recognition task at the $n^{th}$ letter of said input word, skipping the first $n-1$ letters of said input word, n being a variable which takes on different integer values depending upon the size of the input word; and
    a suffix processor for identifying suffixes attached to said stem, wherein said stem finding means and suffix identifying means cooperate to conduct morphological analysis of the input word from the root to the affix and wherein said recognition engine performs inflectional and derivational analysis, said derivational analysis using more than two derivational suffixes.

6. A morphological analyzer for analyzing the morphology of an input word, the analyzer comprising a recognition engine including:
    a memory for storing said input word;
    a stem processor for reading said input word and for finding a stem within said input word, the stem finding means employing a two level morphological model; and a suffix processor for identifying the suffixes attached to said stem, the suffix identifying means also employing the two level morphological model wherein the two level morphological model is derived from a set of spelling change rules which translates a surface string into its lexical string, and is implemented by a single automation, wherein said stem finding processor and suffix identifying processor cooperate to conduct morphological analysis of the input word from the root to the affix and wherein said recognition engine performs inflectional and derivational analysis, said derivational analysis using more than two derivational suffixes and wherein the rules in said set of spelling change rules are of the form W . X/YZ, wherein W is a lexical character, X is a surface character, Y is a first pair string describing an environment preceding W . X and Z is a second pair string describing an environment following W . X.

7. A morphological analyzer for analyzing the morphology of an input word, the analyzer comprising:

a lexicon memory for storing a general lexicon, including a suffix lexicon memory for storing a suffix lexicon and a stem lexicon memory for storing a stem lexicon, a memory for storing said input word; and a recognition engine, including a stem processor for reading said input word and for referring to said stem lexicon for finding a stem within said input word; and a suffix processor for referring to said stem finding processor and suffix identifying processor cooperate to conduct morphological analysis of the input word from the root to the affix and wherein said recognition engine performs inflectional and derivational analysis, said derivational analysis using more than two derivational suffixes wherein said suffix lexicon contains REL suffixes wherein REL suffixes are those suffixes which when added to a root form a distantly related word that is also a root form.

8. The morphological analyzer of claim 7 wherein said suffix lexicon contains formative suffixes.

9. The morphological analyzer of claim 7 wherein said suffix lexicon contains more than one boundary character.

10. The morphological analyzer of claim 7 wherein said stem lexicon contains valid words and abstract words.

11. The morphological analyzer of claim 7 wherein said stem lexicon contains a plurality of irregular words and for each of at least some of said plurality of irregular words, said stem lexicon identifies a cross-reference to one or more corresponding base forms for that irregular word, wherein each of said base forms is a valid word.

12. The morphological analyzer of claim 7 wherein said stem lexicon identifies, for certain of the stems, a cross reference to irregular forms of that stem.

13. The morphological analyzer of claim 7 wherein said stem lexicon contains a plurality of abbreviations and, for each of said plurality of abbreviations, said stem lexicon identifies a cross-reference to a corresponding stem which gives an expanded form of that abbreviation.

14. The morphological analyzer of claim 7 wherein:

said stem lexicon identifies, for each stem within said stem lexicon, a corresponding continuation class tree, wherein the continuation class tree for a given stem represents the valid combinations of suffixes that can be attached to that stem; and, said suffix lexicon contains a plurality of suffixes and each of said plurality of suffixes is represented by a corresponding continuation class.

15. The morphological analyzer of claim 7 wherein said general lexicon further comprises a continuation class lexicon, wherein said continuation class lexicon contains a plurality of continuation class trees, each of said continuation class trees corresponding to a different stem found within said stem lexicon and representing the valid combinations of suffixes that can be attached to that stem.

16. A morphological analyzer for analyzing the morphology of an input word, the analyzer comprising:

a memory for storing said input word;

a lexicon memory for storing a general lexicon, including a stem lexicon memory for storing a stem lexicon; and a suffix memory for storing a single suffix lexicon containing a plurality of suffixes, each of said plurality of suffixes being represented by a corresponding continuation class, said suffix lexicon being shared by all continuation classes; and a recognition engine including a stem processor for reading said input word and for referring to said stem lexicon for finding a stem within said input word; and a suffix processor for referring to said suffix lexicon for identifying suffixes attaches to said stem, wherein said stem finding processor and said suffix identifying processor cooperate to conduct morphological analysis of the input word from the root to the affix and wherein said recognition engine performs inflectional and derivational analysis, said derivational analysis using more than two derivational suffixes.

17. A morphological analyzer for analyzing the morphology of an input word, the analyzer comprising:

a memory for storing said input;

a lexicon memory for storing a general lexicon, including a suffix lexicon memory for storing a suffix lexicon and a stem lexicon memory for storing a stem lexicon; and a recognition engine, including a stem processor for reading said input word and for referring to said stem lexicon for finding a stem within said input word; and a suffix processor for referring to said suffix lexicon for identifying suffixes attached to said stem, wherein said stem finding processor and suffix identifying processor cooperate to conduct morphological analysis of the input word from the root to the affix and wherein said recognition engine performs inflectional and derivational analysis, said derivational analysis using more than two derivational suffixes wherein for each of at least some of said suffixes, said suffix lexicon identifies a corresponding suffix rating indicating the closeness in meaning between a first word and a second word formed by adding that suffix to said first word.

18. The morphological analyzer of claim 17 wherein for each of at least some of said suffixes, said suffix lexicon identifies a corresponding suffix rating indicating whether that suffix is inflectional, derivational, or formative.

19. A morphological analyzer for analyzing the morphology of an input word, the analyzer comprising a recognition engine including:
   a memory for storing said input word;
   a stem processor for reading said input word and for finding a stem within said input word; and
   a suffix processor for identifying suffixes attached to said stem, wherein said stem finding processor and suffix identifying processor cooperate to conduct morphological analysis of the input word from the root to the affix and wherein said recognition engine performs inflectional and derivational analysis, said derivational analysis using more than two derivational suffixes; wherein said recognition engine returns a base history of said input word, said base history containing morphological information about said input word.

20. The morphological analyzer of claim 19 wherein said base history includes a stem record for each stem found within said input word and, for each stem record, one or more continuation class records identifying the suffixes added to that stem to produce said input word, wherein each of said continuation class records identifies a part of speech associated with the corresponding suffix.

21. The morphological analyzer of claim 20 further comprising a generation engine for generating words that are lexically related to said input word by using information returned through the base history supplied for the input word by said recognition engine.

22. The morphological analyzer of claim 21 wherein said generation engine generates said lexically related words by proposing lexical nulls at certain points during the generation of said lexically related words.

23. The morphological analyzer of claim 21 further comprising a lexicon, said lexicon containing a listing of stems and, for each stem, an associated continuation class tree, and wherein each continuation class tree controls which suffixes said generation engine adds to the stem with which it is associated.

24. The morphological analyzer of claim 21 further comprising a table identifying equivalent suffixes, wherein equivalent suffixes are those which form similar words when added to a base word, and wherein said generation engine uses said table to identify which suffixes are added to a given stem to produce lexically related words.

25. A method of analyzing the morphology of an input word, comprising the steps of:
   storing the input word in a memory;
   by operation of a stem processor, first reading the input word and finding a linguistic stem within said input word; and
   then, by operation of a suffix processor, identifying all suffixes attached to said linguistic stem, wherein said suffix identifying step involves inflectional and derivational analysis, wherein each said derivational analysis is performed recursively using more than two derivational suffixes within each said input word.

26. A method of analyzing the morphology of an input word, comprising the steps of:
   storing the input word in a memory;
   by operation of a stem processor, reading the input word and finding a stem within said input word;
   by operation of a suffix processor, identifying all suffixes attached to said stem, wherein said suffix identifying step involves inflectional and derivational analysis, said derivational analysis using more than two derivational suffixes; and
   returning a morphological history of said input word.

27. The method of claim 26 further comprising the steps of storing said morphological history in a morphological history memory and, by operation of a word generation processor, generating words that are lexically related to said input word by adding suffixes to said input word, the addition of suffixes being based upon information supplied by said morphological history.

* * * * *